(12) United States Patent
Hubbard

(10) Patent No.: US 11,939,792 B2
(45) Date of Patent: Mar. 26, 2024

(54) UNDERGROUND SHELTER WITH AIR-INTAKE SYSTEM

(71) Applicant: Atlas Survival Shelters LLC, Sulphur Springs, TX (US)

(72) Inventor: Ronal Hubbard, Sulphur Springs, TX (US)

(73) Assignee: Atlas Survival Shelters LLC, Sulphur Springs, TX (US)

( * ) Notice: Subject to any disclaimer, the term of this patent is extended or adjusted under 35 U.S.C. 154(b) by 35 days.

(21) Appl. No.: 17/400,989

(22) Filed: Aug. 12, 2021

(65) Prior Publication Data

US 2023/0052761 A1 Feb. 16, 2023

(51) Int. Cl.
| | | |
|---|---|---|
| *E04H 9/12* | (2006.01) | |
| *E02D 29/045* | (2006.01) | |
| *E04B 1/24* | (2006.01) | |
| *E04B 1/348* | (2006.01) | |
| *E04B 5/10* | (2006.01) | |
| *E04F 11/022* | (2006.01) | |
| *F24F 7/007* | (2006.01) | |

(52) U.S. Cl.
CPC ............ *E04H 9/12* (2013.01); *E02D 29/045* (2013.01); *E04B 1/24* (2013.01); *E04B 1/3483* (2013.01); *E04B 5/10* (2013.01); *E04F 11/022* (2013.01); *F24F 7/007* (2013.01)

(58) Field of Classification Search
CPC .... E04H 9/14; E04H 9/12; E04H 9/10; E04H 9/08; E04H 9/02; E04H 9/024; E04H 9/028; E04H 9/04; E04H 9/06; E02D 29/045; E04B 1/001; E04B 1/34835; E04B 1/34869; E04B 2001/1975; E04B 2001/1981; E04B 2001/1984; E04B 2001/24; E04B 2001/2457; E04B 5/10
See application file for complete search history.

(56) References Cited

U.S. PATENT DOCUMENTS

| | | |
|---|---|---|
| 3,251,159 A | 5/1966 | Trice |
| 4,534,144 A | 8/1985 | Gustafsson et al. |
| 4,592,175 A * | 6/1986 | Werner ............ E04H 1/04 52/79.9 |
| 4,631,872 A | 12/1986 | Daroga |

(Continued)

FOREIGN PATENT DOCUMENTS

| | | |
|---|---|---|
| KR | 101395180 B1 | 5/2014 |
| KR | 102188299 B1 | 12/2020 |

OTHER PUBLICATIONS

Atlas Survival Shelters; "Brand X bunker gets inspected"; Jul. 27, 2019; URL: https://www.youtube.com/watch?v=R_YLKzxMEXs.

(Continued)

*Primary Examiner* — Kyle J. Walraed-Sullivan
(74) *Attorney, Agent, or Firm* — James H. Ortega; Carstens, Allen & Gourley, LLP

(57) ABSTRACT

A sheltering system comprised of a housing unit made of at least one panel connected to a base with one or more entrances into the housing unit and a structural framework with at least one beam that extends the length or width of a panel or base on the housing unit. The beam has at least one notch near the joining of two panels or a panel and the base. The housing unit may be connected to an air intake system that allows for air to move into the interior of the housing unit and then egress out.

19 Claims, 17 Drawing Sheets

(56) References Cited

U.S. PATENT DOCUMENTS

| | | | | |
|---|---|---|---|---|
| 4,660,334 | A * | 4/1987 | McCarthy | E04H 9/12 |
| | | | | 285/224 |
| 5,655,338 | A | 8/1997 | Lucas | |
| 6,131,343 | A | 10/2000 | Jackson, Jr. | |
| 6,385,919 | B1 | 5/2002 | McCarthy | |
| 6,385,920 | B1 | 5/2002 | Chandler | |
| 6,393,776 | B1 | 5/2002 | Waller et al. | |
| 6,415,557 | B1 * | 7/2002 | McCalley | E04H 9/14 |
| | | | | 52/584.1 |
| 6,415,558 | B1 * | 7/2002 | Cherry | E04H 9/14 |
| | | | | 52/270 |
| 7,458,305 | B1 * | 12/2008 | Horlander | F41H 5/24 |
| | | | | 52/800.1 |
| 8,484,929 | B1 * | 7/2013 | Begdouri | B65D 88/76 |
| | | | | 52/745.03 |
| 8,596,018 | B2 | 12/2013 | Dagher et al. | |
| 8,776,453 | B1 * | 7/2014 | Fain | E04C 2/08 |
| | | | | 52/79.12 |
| 8,991,134 | B2 * | 3/2015 | Wheeler | E04B 1/343 |
| | | | | 220/4.27 |
| 9,010,230 | B2 | 4/2015 | Peters | |
| 9,279,265 | B1 | 3/2016 | Nead | |
| 9,316,015 | B1 * | 4/2016 | Elliott | E04B 1/98 |
| 9,834,947 | B2 | 12/2017 | Beckmann et al. | |
| 10,428,541 | B2 | 10/2019 | Harve et al. | |
| 11,384,524 | B2 * | 7/2022 | Pospisil | E02D 17/13 |
| 2004/0003546 | A1 * | 1/2004 | Sissons | E04C 2/384 |
| | | | | 52/106 |
| 2009/0064604 | A1 | 3/2009 | Yamaguchi | |
| 2010/0115858 | A1 * | 5/2010 | Olsen | E04H 9/14 |
| | | | | 49/476.1 |
| 2011/0023759 | A1 | 2/2011 | Waller | |
| 2012/0180425 | A1 | 7/2012 | Dooley et al. | |
| 2013/0086849 | A1 * | 4/2013 | Clouser | E04H 1/00 |
| | | | | 52/79.9 |
| 2014/0166648 | A1 * | 6/2014 | Iwashita | B65D 7/04 |
| | | | | 220/4.01 |
| 2016/0017609 | A1 * | 1/2016 | Bottin | E04D 13/064 |
| | | | | 52/302.1 |
| 2017/0081870 | A1 * | 3/2017 | Hensen | E04B 1/34384 |
| 2017/0219316 | A1 | 8/2017 | Peters | |
| 2017/0328054 | A1 * | 11/2017 | Bakken | E04H 1/005 |
| 2018/0313074 | A1 * | 11/2018 | Brown | F41H 5/24 |
| 2019/0010691 | A1 * | 1/2019 | Moran | E04B 1/3483 |
| 2019/0062050 | A1 | 2/2019 | Benedict | |
| 2021/0113864 | A1 | 4/2021 | Nam | |

OTHER PUBLICATIONS

Atlas Survival Shelters; "Building a $20,000 Fort Knox Gun Vault"; Jan. 6, 2021; URL: https://www.youtube.com/watch?v=5wGTp8ZTk_0.

Atlas Survival Shelters; "Building a $300,000 Big Boy Bomb Shelter—Part 1"; Jul. 16, 2021; URL: https://www.youtube.com/watch?v=K1HF-83mQ8s.

Atlas Survival Shelters; "Building a $300,000 Big Boy Modular Bomb Shelter—Part 2"; Jul. 31, 2021; URL: https://www.youtube.com/watch?v=tIYI21zm1DQ.

Atlas Survival Shelters; "Building a Bug Out Cabin With Shipping Containers"; May 31, 2019; URL: https://www.youtube.com/watch?v=4_r8ZKOShYl.

Atlas Survival Shelters; "Building the Big Boy 12' x 48' Bunker—Stage 1—Floor and Paint"; Jan. 20, 2020; URL: https://www.youtube.com/watch?v=8f0Cep-OTVU.

Atlas Survival Shelters; "Bullet Proof Hatches on Atlas Survival Shelters (Update)"; Jan. 25, 2021; URL: https://www.youtube.com/watch?v=snvoDTuTIfE.

Atlas Survival Shelters; "Bunker in My Backyard—The ATLAS 10 x 21 Culvert Shelter"; Sep. 15, 2018; URL: https://www.youtube.com/watch?v=jRHbtEiVVgk.

Atlas Survival Shelters; "Buying my own Private Armored MRAP"; Mar. 24, 2021; URL: https://www.youtube.com/watch?v=9XB9RKuYZHY.

Atlas Survival Shelters; "Catalog—The Future of Bomb Shelters," URL: https://www.atlassurvivalshelters.com; 20 pages.

Atlas Survival Shelters; "Champion Dual Fuel Generator Runs on Both Propane or Gasoline"; Mar. 21, 2019; URL: https://www.youtube.com/watch?v=YpaqgwR2edw.

Atlas Survival Shelters; "Couple Tours The Atlas Shelters Factory in Texas"; Apr. 4, 2019; URL: https://www.youtube.com/watch?v=Mqh6xdREDFg.

Atlas Survival Shelters; "Crooked Bunker Builder Exposed as FBI Snitch—Must Watch!"; Mar. 15, 2020; URL: https://www.youtube.com/watch?v=roDNLIvN-Bo.

Atlas Survival Shelters; "Customer Installs His Own Atlas Doomsday Cache !! "; Jul. 22, 2020; URL: https://www.youtube.com/watch?v=e_cMw09QRM0.

Atlas Survival Shelters; "DIY—Build your own Air Tight Safe Room—Use Atlas Survival Shelters Parts."; Apr. 5, 2020; URL: https://www.youtube.com/watch?v=KVEnh9qUxuA.

Atlas Survival Shelters; "Doomsday Zombie Bunker Tour !! "; Jun. 17, 2020; URL: https://www.youtube.com/watch?v=AHeTG6aNzjE.

Atlas Survival Shelters; "Electric Bug Out Bikes from Sam at Electric Bicycle Center"; Jul. 10, 2019; URL: https://www.youtube.com/watch?v=0xfokBvWz6Q.

Atlas Survival Shelters; "Engineer775 installs an Atlas Bunker with Solar, a Diesel Generator, and WIFI!"; Jun. 25, 2020; URL: https://www.youtube.com/watch?v=seTYRuSnRPs.

Atlas Survival Shelters; "Erecting Walls of an Atlas Bomb Shelter—MIG Welding"; Apr. 30, 2021; URL: https://www.youtube.com/watch?v=GDesJAAKwTQ&t=50s.

Atlas Survival Shelters; "Everyday things that Kill more people than Rifles in the USA"; Mar. 23, 2021; URL: https://www.youtube.com/watch?v=SRrqfD7y0ds.

Atlas Survival Shelters; "Exploding Fireball Puts Out Fire Near Atlas Fire Shelters"; Dec. 21, 2018; URL: https://www.youtube.com/watch?v=OUpG-4Yyr3M.

Atlas Survival Shelters; "Feeding Alligator Gars At the Worlds Biggest Bass Pro Shop"; February 8; 2021, URL: https://youtube.com/watch?v=NP6gxrOHg2c.

Atlas Survival Shelters; "Final Inspection Video of an Atlas Bunker Before It Ships"; Mar. 11, 2019; URL: https://www.youtube.com/watch?v=kN1yIQdSVbM.

Atlas Survival Shelters; "Finishing out a $500,000 Luxury Platinum Series Doomsday Bunker"; Jun. 18, 2021; URL: https://www.youtube.com/watch?v=TvwRIzzGZ5Y.

Atlas Survival Shelters; "Flying in 2020 was like being in Zombieland—watch and see for yourself"; Jun. 11, 2021; URL: https://www.youtube.com/watch?v=THsLnAteA8E.

Atlas Survival Shelters; "Garage Floor Tornado Shelter"; May 24, 2013; URL: https://www.youtube.com/watch?v=PDRv9Vu1PIo.

Atlas Survival Shelters; "Gas Tight Doors & Bullet Proof Hatches on Atlas Bomb Shelters."; Feb. 28, 2019; URL: https://www.youtube.com/watch?v=U-OVzSHz6W0.

Atlas Survival Shelters; "Generator Pod—10x51 Round Culvert"; May 21, 2014; URL: https://www.youtube.com/watch?v=1Fe30alig-o.

Atlas Survival Shelters; "Generator Pod—Atlas Survival Shelters"; Feb. 17, 2014; URL: https://www.youtube.com/watch?v=8yRLWSr-bAk.

Atlas Survival Shelters; "Generator Pod Attached to 10x51 Round Culvert"; May 21, 2014; URL: https://www.youtube.com/watch?v=qN5EkcMLVps.

Atlas Survival Shelters; "Heavy Duty Modular Bomb Shelter Build"; Feb. 3, 2020; URL: https://www.youtube.com/watch?v=GwWmuXd6hpw.

Atlas Survival Shelters; "Hidden Guns in Secret Compartment Furniture"; Mar. 29, 2021; URL: https://www.youtube.com/watch?v=BgOmGmnc_eY.

Atlas Survival Shelters; "How Canned Water with a 50 Year Shelf Life is Made - Blue Can Water"; Mar. 7, 2019; URL: https://www.youtube.com/watch?v=T9cyhP99Uhw.

(56) References Cited

OTHER PUBLICATIONS

Atlas Survival Shelters; "How Do You Breathe Inside a Nuclear Bomb Shelter?"; Feb. 23, 2019; URL: https://www.youtube.com/watch?v=gP_uhnULyk.
Atlas Survival Shelters; "How Engineer775 Powered This Big Boy Bunker"; Jan. 8, 2021; URL: https://www.youtube.com/watch?v=M9K8WIEvTUY.
Atlas Survival Shelters; "How Exotic Gun & Trophy Rooms are Made—Julian & Sons Fine Woodworking"; Feb. 3, 2021; URL: https://www.youtube.com/watch?v=Hx0ypWEEHrw.
Atlas Survival Shelters; "How I Am Replacing My Wise Food Supply"; Apr. 9, 2019; URL: https://www.youtube.com/watch?v=5xNjelx85_k.
Atlas Survival Shelters; "How I Survived the Texas Snow Storm of 2021"; Feb. 19, 2021; URL: https://www.youtube.com/watch?v=Zy8ZxTpOcNE.
Atlas Survival Shelters; "How Long Do You Need to Stay in Your Bunker After a Nuclear Bomb?—Radiation Detectors"; Feb. 23, 2019; URL: https://www.youtube.com/watch?v=Uc4xI544IzY.
Atlas Survival Shelters; "How this $20K Piranha Ironworker paid for itself in one year?"; May 28, 2021; URL: https://www.youtube.com/watch?v=B57WvfM-XoM&t=2s.
Atlas Survival Shelters; "How to Build a Steel Tornado—Fallout Shelter For a Garage (Full Tutorial HD)"; Dec. 20, 2018; URL: https://www.youtube.com/watch?v=aufZHxdU238.
Atlas Survival Shelters; "How to Complete a Sand Filled Escape Box for an Atlas Survival Shelter"; Dec. 3, 2020; URL: https://www.youtube.com/watch?v=Z-XYiWeHivk.
Atlas Survival Shelters; "How To Create a Watertight Underground Bunker & Food Cache for $699"; Feb. 14, 2019; URL: https://www.youtube.com/watch?v=yQodGC6kq8k.
Atlas Survival Shelters; "How To EMP Proof Your Bunker, Home or Car For $299"; Apr. 21, 2019; URL: https://www.youtube.com/watch?v=LXdb4L5q1IU.
Atlas Survival Shelters; "How to grow Food and Plants in an underground Bomb Shelter!"; Aug. 2, 2019; URL: youtube.com/watch?v=aj719c6XuzY.
Atlas Survival Shelters; "How To Hide Your Medicine Bottles in Plain Sight?"; Mar. 1, 2019; URL: https://www.youtube.com/watch?v=46-a24LApB0.
Atlas Survival Shelters; "How to make a Million Dollars selling Bomb Shelters!"; Aug. 1, 2019; URL: https://www.youtube.com/watch?v=sHQzhmTKfK4.
Atlas Survival Shelters; "How To Power a Small Bunker After SHTF?—Kodiak Generator"; Feb. 25, 2019; URL: https://www.youtube.com/watch?v=cvT9KUMjJLA.
Atlas Survival Shelters; "How would Rambo prepare Texans for a Civil War? MRAP and a Atlas Bunker"; Feb. 22, 2021; URL: https://www.youtube.com/watch?v=4JgPHD59QAg.
Atlas Survival Shelters; "I build a 40 mph bug out bike just to see it get stolen on camera!"; Sep. 5, 2019; URL: https://www.youtube.com/watch?v=i3a_4Ak--Mw.
Atlas Survival Shelters; "I Wore a Green Hazmat Suit through LAX"—See what happens!; Mar. 19, 2020; URL: https://www.youtube.com/watch?v=bQTsuqDV64.
Atlas Survival Shelters; "I wore my MAGA hat through Canadian airports—Part 2"; Nov. 15, 2019; URL: https://www.youtube.com/watch?v=8zm-y3cxYE.
Atlas Survival Shelters; "Importance of Compaction when Installing Atlas Culverts"; May 24, 2019; URL: https://www.youtube.com/watch?v=qiWGGwcgtHE.
Atlas Survival Shelters; "Incredible Miniature Toilet Paper Tablets For Backpackers and Preppers"; Nov. 10, 2018; URL: https://www.youtube.com/watch?v=EKGtBHV8zpA.
Atlas Survival Shelters; "Incredible Secret Rooms and Tricked Out Bomb Shelters"; Oct. 7, 2018; URL: https://www.youtube.com/watch?v=ptvA5R456ro.
Atlas Survival Shelters; "Installing & Testing The Escape Tunnel on an Atlas Bomb Shelter"; Dec. 7, 2018; URL: https://www.youtube.com/watch?v=bmqRF67hURA.
Atlas Survival Shelters; "Installing a $500,000 Luxury Platinum Series Doomsday Bunker in Minnesota"; Jun. 15, 2021; URL: https://www.youtube.com/watch?v=KoctrIEc3Us.
Atlas Survival Shelters; "Installing a Bomb Shelter in South Dakota"; Aug. 24, 2019; URL: https://www.youtube.com/watch?v=3sN7efVDEaU.
Atlas Survival Shelters; "Installing a Wildfire Bunker"; Sep. 3, 2019; URL: https://www.youtube.com/watch?v=sNWdQqYSDkc.
Atlas Survival Shelters; "Installing an $8,000 Bullet Proof Safe Room!"; Sep. 22, 2020; URL: https://www.youtube.com/watch?v=74XjcLCNnX8.
Atlas Survival Shelters; "Iron Door Assets (Trihub, LLC.)"; Dec. 4, 2013; URL: https://www.youtube.com/watch?v=_etI2n4092Q.
Atlas Survival Shelters; "Kim Kardashian meets Doomsday Bunker Builder!!! "; Apr. 16, 2021; URL: https://www.youtube.com/watch?v=kbtif06gsiw.
Atlas Survival Shelters; "Lady's Atlas Bunker in New Mexico With $7,000 of Survival Food"; Jan. 21, 2019; URL: https://www.youtube.com/watch?v=aqJRdTIJKZM.
Atlas Survival Shelters; "Leaf Generator at the NPS Expo, Tennessee."; Mar. 22, 2013; URL: https://www.youtube.com/watch?v=dHAcjVkvbAA.
Atlas Survival Shelters; "Let's take a walk through the Atlas Factory today !!! "; Mar. 26, 2021; URL: https://www.youtube.com/watch?v=7MNUVzn-Yto.
Atlas Survival Shelters; "Machine Gun Shoot with Atlas Survival Shelters on Jun. 1-2, 2013"; May 8, 2013; URL: https://www.youtube.com/watch?v=g_EGopjphyg.
Atlas Survival Shelters; "MAGA Hat Video editor Murdered! 30 Min. After Posting His Last Video."; Jan. 6, 2020; URL: https://www.youtube.com/watch?v=ztodEMNIiLc.
Atlas Survival Shelters; "Major Suplus & Survival—The Best Doomsday Store in California"; Mar. 19, 2019; URL: https://www.youtube.com/watch?v=rxSXYLcJXTk.
Atlas Survival Shelters; "Man loses his bomb shelter in forest!"; Sep. 13, 2019; URL: https://www.youtube.com/watch?v=KZVCORInTE8.
Atlas Survival Shelters; "Man Turns His Bunker Into a underground party room"; Dec. 6, 2018; URL: https://www.youtube.com/watch?v=DAKXY5iiCh0.
Atlas Survival Shelters; "Manhattan, NY 48 Hours after the Looting. What the Media Won't Show You!"; Jun. 5, 2020; URL: https://www.youtube.com/watch?v=HUHk5qK01-U.
Atlas Survival Shelters; "Maxam Slingshot Survival Knife Under $20 For Christmas"; Nov. 19, 2018; URL: https://www.youtube.com/watch?v=6c9aihllGyM.
Atlas Survival Shelters; "Missile Scare Causes Neighbors to Attack Neighbor Without Atlas Bomb Shelter!"; Sep. 29, 2018; URL: https://www.youtube.com/watch?v=wFeR2bVZU84.
Atlas Survival Shelters; "Mountain Preppers show"; May 21, 2014; URL: https://www.youtube.com/watch?v=nqvzj453Rto.
Atlas Survival Shelters; "Mr Beast—My New 30,000 lb Hyster forklift—what will he lift ?? "; May 6, 2021; URL: https://www.youtube.com/watch?v=WAkFBz0UIxo.
Atlas Survival Shelters; "My favorite Platinum cabins at Recreational Resort Cottages"; Oct. 11, 2019; URL: https://www.youtube.com/watch?v=QZfz-QFBX5s.
Atlas Survival Shelters; "NadoSafe—World's Cheapest Bulletproof Tornado-Fallout Shelter"; Apr. 1, 2019; URL: https://www.youtube.com/watch?v=bo9UrlI6quo.
Atlas Survival Shelters; "Nebraska Bomb Shelter Hidden Under a Silo !! "; Jun. 2, 2020; URL: https://www.youtube.com/watch?v=chKUi5qnKxk.
Atlas Survival Shelters; "New California Fire Shelter Built Into the House"; Nov. 19, 2018; URL: https://www.youtube.com/watch?v=tdAlcdOy6E0.
Atlas Survival Shelters; "Nice Bunker on a Ranch—10x51 Atlas Survival Shelter"; Nov. 16, 2018; URL: https://www.youtube.com/watch?v=3sYH6dr4gyU.
Atlas Survival Shelters; "Party in an Atlas Survival Shelter"; May 25, 2013; URL: https://www.youtube.com/watch?v=PqYhifGhUlk.
Atlas Survival Shelters; "Prepper Community Virtual Tour"; May 21, 2014; URL: https://www.youtube.com/watch?v=tOaliVXthLY.

(56) References Cited

OTHER PUBLICATIONS

Atlas Survival Shelters; "Remington 12 Gauge Pump Model 870 Is How I Plan to Get Out of LA!"; Nov. 21, 2018; URL: https://www.youtube.com/watch?v=wMq43Iq5yzo.
Atlas Survival Shelters; "Rent a Doomsday Bunker for a Family Vacation for Only $999"; May 16, 2019; URL: https://www.youtube.com/watch?v=vu96900RnW4.
Atlas Survival Shelters; "Revealing a Hidden Modern Doomsday BUNKER—[[Unedited Version]]"; Oct. 18, 2018; URL: https://www.youtube.com/watch?v=WVMul74ERmo.
Atlas Survival Shelters; "Rising S Bunker gets upgraded by Atlas Survival Shelters in one day"; Jul. 28, 2021; URL: https://www.youtube.com/watch?v=8V7iZMZdFIU.
Atlas Survival Shelters; "Ron explains the Atlas Shelter Design"; Mar. 27, 2013; URL: https://www.youtube.com/watch?v=zZn44YGpSDE.
Atlas Survival Shelters; "Ron from Atlas Shelters shoots the Walking Dead!"; May 24, 2013; URL: https://www.youtube.com/watch?v=HJRskVigVi4.
Atlas Survival Shelters; "Ron Gets His Concealed Carry after the murder of His Youtube Editor."; Mar. 1, 2020; URL: https://www.youtube.com/watch?v=hvvTtC2pJwk.
Atlas Survival Shelters; "Ron Tests his Bullet Proof Blast Hatch"; Apr. 2, 2013; URL: https://www.youtube.com/watch?v=pupCjGV11f4.
Atlas Survival Shelters; "Ron visits Denver's "New World Order" Airport"; May 17, 2013; URL: https://www.youtube.com/watch?v=7w1d6_fl8Vw.
Atlas Survival Shelters; "Ron's new 1919a4 Machine Gun"; May 24, 2013; URL: https://www.youtube.com/watch?v=dk72JtcUgPc.
Atlas Survival Shelters; "Ron's New Uzi"; May 1, 2013; URL: https://www.youtube.com/watch?v=1rqZiWtk9O4.
Atlas Survival Shelters; "Round Culvert Shelter at Emergency Essentials Salt Lake City, Utah"; May 21, 2014; URL: https://www.youtube.com/watch?v=IYI8hnUY3tk.
Atlas Survival Shelters; "Secret Doors and Passages of the Rich and Famous"; Apr. 27, 2020; URL: https://www.youtube.com/watch?v=HBYe2r_rfLs.
Atlas Survival Shelters; "Secret FAQ About Atlas Bomb Shelters—10X30 Safe Cellar Part 2"; Oct. 2, 2018; URL: https://www.youtube.com/watch?v=RblAfx4QcTY.
Atlas Survival Shelters; "Secret Modern Bunker Loaded Up With Supplies for Doomsday—"30 Day Bunker Challenge""; Mar. 2, 2019; URL: https://www.youtube.com/watch?v=rfMK7sutuNc.
Atlas Survival Shelters; "See a $300k Shooting Range for the Rich and Famous !! "; May 20, 2020; URL: https://www.youtube.com/watch?v=78SWza4DSXg.
Atlas Survival Shelters; "Smoke Testing the Atlas Fire Shelter"; Nov. 21, 2018; URL: https://www.youtube.com/watch?v=bmXxcEOBU_s.
Atlas Survival Shelters; "Some Fake News Almost Destroys Wise Food Storage!"; Mar. 16, 2019; URL: https://www.youtube.com/watch?v=4gWy8OZhq1M.
Atlas Survival Shelters; ""Everything You Need to Know about Growing Food in a Bunker !! " Greencoast Hydroponics"; Jun. 13, 2020; URL: https://www.youtube.com/watch?v=uKLKR9y1oN8.
Atlas Survival Shelters; ""New" Prepper Communities for Pleasure or for when "SHTF" !! "; Jul. 24, 2020; URL: https://www.youtube.com/watch?v=aOQNglqjKeE.
Atlas Survival Shelters; "$10 Million dollar AT&T Bunker gets trashed by copper thieves"; Mar. 18, 2021; URL: https://www.youtube.com/watch?v=HLo5R_6RWIc.
Atlas Survival Shelters; "$100,000 Do-it yourself Doomsday Bunker turns out fantastic"; Apr. 23, 2021; URL: https://www.youtube.com/watch?v=KNN9r4XEWSY&t=2s.
Atlas Survival Shelters; "$13 Million Doomsday Bunker You can buy cheap!! At&T L5"; Mar. 19, 2021; URL: https://www.youtube.com/watch?v=QTp7Qy5AUcQ.
Atlas Survival Shelters; "$70,000 Underground Shelter for Two People "NICE""; Aug. 25, 2020; URL: https://www.youtube.com/watch?v=091-ODuPG-4.
Atlas Survival Shelters; "Big Splash" Machine Gun Shoot Site; Aug. 27, 2013; URL: https://www.youtube.com/watch?v=oWvdaoH1EyQ.
Atlas Survival Shelters; "10 Ways Atlas Can Install a Secret Safe Cellar Under Your Home"; Jul. 11, 2020; URL: https://www.youtube.com/watch?v=AT3SEp703N0.
Atlas Survival Shelters; "10x20 Round Culvert—The Backyard Bunker"; Aug. 7, 2017; URL: https://www.youtube.com/watch?v=vSYHKA88Co4.
Atlas Survival Shelters; "10x36 Round Culvert—Badass 6 Person Shelter"; Jul. 17, 2017; URL: https://www.youtube.com/watch?v=drbNC7NMNXs.
Atlas Survival Shelters; "10x51 Hillside Retreat—Our Best Floor Plan"; May 24, 2013; URL: https://www.youtube.com/watch?v=5ZkEkpNR_hM.
Atlas Survival Shelters; "10x51 Round Culvert—8 Person + Huge Master"; Aug. 2, 2017; URL: https://www.youtube.com/watch?v=lodqGdwno2E.
Atlas Survival Shelters; "10x51 Round Culvert—8 Person 2 Bedroom"; Oct. 31, 2013; URL: https://www.youtube.com/watch?v=G0iNaWAC2LQ.
Atlas Survival Shelters; "15 Reasons You Want to be in Texas When S.H.T.F!"; Mar. 17, 2019; URL: https://www.youtube.com/watch?v=ZyJ_rpZEHM.
Atlas Survival Shelters; "50 incredible bug out Jeeps—Lucas Oil Offroad Expo"; Oct. 4, 2019; URL: https://www.youtube.com/watch?v=OyBeGQ6tIPs.
Atlas Survival Shelters; "7 Things I Can Do in Texas That I Can't Do in California"; Jun. 30, 2019; URL: https://www.youtube.com/watch?v=uDahjBOFsxQ.
Atlas Survival Shelters; "A $200,000 Luxury Bomb Shelter Under a Home—Atlas 10x40' Platinum Series Safe Cellar"; Sep. 7, 2020; URL: https://www.youtube.com/watch?v=CLGCdj7uzFs.
Atlas Survival Shelters; A Completed $500,000 Luxury Platinum Series Doomsday Bunker; Jun. 26, 2021; URL: https://www.youtube.com/watch?v=0Ztk7ZuNSE4&t=15s.
Atlas Survival Shelters; "A Funny Sample of the "Billy Bombproof" Survival Gear Channel—A Must See!"; Dec. 21, 2018; URL: https://www.youtube.com/watch?v=zcyBG7lppHI.
Atlas Survival Shelters; "A Tiny House Underground Bunker You Can Live in—Atlas 10x40' Modular"; Aug. 4, 2020; URL: https://www.youtube.com/watch?v=6-rrK7S45d0.
Atlas Survival Shelters; "A Tornado Shelter you can "Spend-A-Night" in Comfortably !!! "; Apr. 28, 2020; URL: https://www.youtube.com/watch?v=6cKfeScbGZA.
Atlas Survival Shelters; "A walk through the Atlas factory"; Sep. 28, 2019; URL: https://www.youtube.com/watch?v=AB8Df57KwQg.
Atlas Survival Shelters; "Add a 4 stroke motor to your bike—Tutorial"; Aug. 20, 2019; URL: https://www.youtube.com/watch?v=AVU5VMdWTFw.
Atlas Survival Shelters; "Affordable $15000 Doomsday Cache Shelter Built and Delivered"; May 18, 2020; URL: https://www.youtube.com/watch?v=qpJR_59srVg.
Atlas Survival Shelters; "Americans installing a Bomb Shelter"; Nov. 11, 2019; URL: https://www.youtube.com/watch?v=8ydpZjbjPqA.
Atlas Survival Shelters; "Are you looking for a Safe Room? Atlas Safe Cellar should be your Plan B"; Jan. 15, 2021; URL: https://www.youtube.com/watch?v=SKRONoERLS0.
Atlas Survival Shelters; "Atlas 10x30 Safe-Cellar—Luxury Bunker Built Under a Home (Complete Installation Video)—Part 1"; Sep. 13, 2018; URL: https://www.youtube.com/watch?v=x4NU9KwpZog.
Atlas Survival Shelters; "Atlas 10X35 Culvert with French Drain (Complete Install)"; Dec. 7, 2020; URL: https://www.youtube.com/watch?v=x9PqYB1QQ9k.
Atlas Survival Shelters; "Atlas 10'x38' Round Water Tight Bomb Shelter !! "; May 23, 2020; URL: https://www.youtube.com/watch?v=OfTCHYiixw8.
Atlas Survival Shelters; "Atlas 10x40 Safe Cellar on Shipping Day"; Aug. 13, 2020; URL: https://www.youtube.com/watch?v=Rlc_RlgWvGs.

(56) References Cited

OTHER PUBLICATIONS

Atlas Survival Shelters; "Atlas 12x20 Safe Cellar—Doomsday bunker under a driveway"; Jul. 2, 2021; URL: https://www.youtube.com/watch?v=20wywMobYBE&t=4s.
Atlas Survival Shelters; "Atlas Air System $7,000"; Apr. 10, 2013; URL: https://www.youtube.com/watch?v=G_Mzh7LCteQ.
Atlas Survival Shelters; "Atlas Culvert Shelter with a generator pod"; Oct. 24, 2019; URL: https://www.youtube.com/watch?v=udMKWms9waE.
Atlas Survival Shelters; "Atlas Dome Bunkers How to Live Underground in style !! "; Jun. 10, 2020; URL: https://www.youtube.com/watch?v=TvIl9GI9g4k.
Atlas Survival Shelters; "Atlas Dome Shelters"; Aug. 28, 2013; URL: https://www.youtube.com/watch?v=ou1ISorkDzM.
Atlas Survival Shelters; "Atlas stands behind its products—Repair of an Escape Tunnel"; Mar. 4, 2020; URL: https://www.youtube.com/watch?v=uwsfkCe1v10.
Atlas Survival Shelters; "Atlas Survival Shelters—10' X 51' Home"; May 8, 2013; URL: https://www.youtube.com/watch?v=2tSUYSWy9fY.
Atlas Survival Shelters; "Atlas Survival Shelters—under floor storage"; May 8, 2013; URL: https://www.youtube.com/watch?v=6jrUHnpMZQQ.
Atlas Survival Shelters; "Atlas Survival Shelters 10' X 51' Hillside Retreat"; Mar. 21, 2013; URL: https://www.youtube.com/watch?v=nBcfYwU4rVs.
Atlas Survival Shelters; "Atlas Survival Shelters an Engineering Marvel"; May 3, 2019; URL: https://www.youtube.nhcom/watch?v=LMgv72h700c.
Atlas Survival Shelters; "Atlas Survival Shelters Promotional Video"; May 21, 2014; URL: https://www.youtube.com/watch?v=ywJ-wUd9Yn4.
Atlas Survival Shelters; "Atlas vs Rising S Bunkers in a Side-By-Side Comparison"; May 18, 2019; URL: https://www.youtube.com/watch?v=NyA2nLIHKNE.
Atlas Survival Shelters; "Bad Rising S Bunker floods and destroys $100,000 in survival food"; Nov. 5, 2019; URL: https://www.youtube.com/watch?v=L7ktaNJe8ew.
Atlas Survival Shelters; "Barn-dominium Bunker Installation—Atlas 10x26' Culvert w/ Generator Pod"; Dec. 29, 2020; URL: youtube.com/watch?v=wIQc0Pv-SAc.
Atlas Survival Shelters; "Better Prepared Than Scared—Starting Your Doomsday Cache"; Dec. 12, 2018; URL: https://www.youtube.com/watch?v=hxnkvGKkofs.
Atlas Survival Shelters; "Big Boy Bomb Shelter finally revealed!"; Apr. 4, 2020; URL: https://www.youtube.com/watch?=YK0TU0fknmE.
Atlas Survival Shelters; "Big Boy Bomb Shelter is where I'm spending the Corona Virus Quarantine."; Mar. 31, 2020; URL: https://www.youtube.com/watch?v=SB6zt3dlDmA.
Atlas Survival Shelters; "Big Boy Bunker Gets Installed (Detailed Instructions)"; Nov. 24, 2020; URL: https://www.youtube.com/watch?v=7TeEV7ag791.
Atlas Survival Shelters; "Bomb Tested EMP Proof Data Bunker"; Jan. 31, 2019; URL: https://www.youtube.com/watch?v=AAL2Pf_Elcs.
Atlas Survival Shelters; "BombNado Disaster Shelters—by Atlas Survival Shelters"; Oct. 10, 2018; URL: https://www.youtube.com/watch?v=TajrmGFt5ig.
Atlas Survival Shelters; "Texas Girls Shoot the Yildiz Single Shot 12 Gauge Shotgun—Kicks Like a Mule"; Dec. 12, 2019; URL: https://www.youtube.com/watch?v=iKTcLyPO2Ew.
Atlas Survival Shelters; "Texas Prepper buys Blackwater MRAP The Ultimate Armored Vehicle"; Apr. 27, 2021; URL: https://www.youtube.com/watch?v=J-jdX05TX11.
Atlas Survival Shelters; "The Best Doomsday TV Series That Has Not Aired Yet!—Better Than Doomsday Preppers"; Mar. 8, 2019; URL: https://www.youtube.com/watch?v=2k7Z-vXSFYo.
Atlas Survival Shelters; "The Best Shipping Container Shelter Ever"; Aug. 27, 2013; URL: https://www.youtube.com/watch?v=vjn2K6NHYHs.
Atlas Survival Shelters; "The Doomsday Prepper's Bunker We Did For TV in 2012—Then & Now !"; Nov. 29, 2018; URL: https://www.youtube.com/watch?v=w5bQc5Z9cmo.
Atlas Survival Shelters; "The first Atlas Bunker built in our European Factory"; Jun. 5, 2021; URL: https://www.youtube.com/watch?v=tzRKWc4-tMs.
Atlas Survival Shelters; "The Good News About Nuclear Destruction"; Aug. 24, 2020; URL: https://www.youtube.com/watch?v=WprJQ7WYdJY.
Atlas Survival Shelters; "The Incredible Duck Hunting Video"; Jan. 11, 2019; URL: https://www.youtube.com/watch?v=751ZFtF3qmE.
Atlas Survival Shelters; "The NU Aqua Water Systems inside Atlas Shelters"; Aug. 16, 2019; URL: https://www.youtube.com/watch?v=gk8lbC-zRTo.
Atlas Survival Shelters; "This $130,000 Bomb Shelter is Huge inside."; Apr. 12, 2020; URL: https://www.youtube.com/watch?v=1i88f4IExUE.
Atlas Survival Shelters; "This $150,000 Bomb Shelter is Nice Inside!—Atlas 10X33 with Generator Pod"; Jan. 3, 2020; URL: https://www.youtube.com/watch?v=5xN9hJLNz9E.
Atlas Survival Shelters; "This $50,000 Wine Cellar is Really a Secret Bomb Shelter"; Feb. 16, 2020; URL: https://www.youtube.com/watch?v=So8LFOec32Y.
Atlas Survival Shelters; "This $70,000 Ammo Bunker makes a great Pew Pew Vault"; Oct. 22, 2020; URL: https://www.youtube.com/watch?v=gy-QEKx7ORw.
Atlas Survival Shelters; "This $70,000 Doomsday Bunker Was Made to Withstand an Earthquake!"; May 27, 2020; URL: https://www.youtube.com/watch?v=RZMuBQxWvHQ.
Atlas Survival Shelters; "Tiny Homes and Cottages for your Underground Bunker Part 1"; Jun. 22, 2019; URL: https://www.youtube.com/watch?v=j2iuTJysH5A.
Atlas Survival Shelters; "Tiny Radiation Detector Could Save Millions—NUK-Alert"; Feb. 1, 2020; URL: https://www.youtube.com/watch?v=GK6viKMCAaU.
Atlas Survival Shelters; "Top 10 Incredible companies that make furniture for "Hiding Guns" in plain sight"; Mar. 31, 2021; URL: https://www.youtube.com/watch?v=YNhsEVDfQz8.
Atlas Survival Shelters; "Top 10 People Making Furniture With Secret Compartments For Guns"; Feb. 26, 2019; URL: https://www.youtube.com/watch?v=351MeHVANao.
Atlas Survival Shelters; "Top 25 Things to Look for When buying a Bomb Shelter"; Jul. 22, 2020; URL: https://www.youtube.com/watch?v=9Q1pFN-sZw8.
Atlas Survival Shelters; "Top Ways to Bury Your Guns Before They are Confiscated"; Jan. 14, 2021; URL: https://www.youtube.com/watch?v=tZ7KTSPum-Y.
Atlas Survival Shelters; "Walk through 10 bunkers in 10 minutes—what you missed at the prepper show!"; Oct. 7, 2019; URL: https://www.youtube.com/watch?v=gqhwszmBm6w.
Atlas Survival Shelters; "Watch Diablo Blades Cut Through My Steel Like Butter, "Crazy Fast""; Jul. 8, 2020; URL: https://www.youtube.com/watch?v=t_2NG2nZe0k.
Atlas Survival Shelters; "We make Bomb Shelters that look like Homes inside how we do it"; Apr. 1, 2021; URL: https://www.youtube.com/watch?v=vckGd79dJfw.
Atlas Survival Shelters; "What it takes to be an independent Dealer for Atlas Survival Shelters."; Apr. 12, 2020; URL: https://www.youtube.com/watch?v=2sFXv4LFhGA.
Atlas Survival Shelters; "What started the bunker wars between Atlas and Rising S"; Nov. 13, 2019; URL: https://www.youtube.com/watch?v=kj6wZaxCPSw.
Atlas Survival Shelters; "What's Inside a $30 Million Atlas E. Missile Silo !!! "; Jul. 10, 2021; URL: https://www.youtube.com/watch?v=S3GcTT80OLM.
Atlas Survival Shelters; "Where to Add 10 Secret "Hiding Places" in Your House"; Feb. 12, 2021; URL: https://www.youtube.com/watch?v=L0OCS-YYyH8.

(56) References Cited

OTHER PUBLICATIONS

Atlas Survival Shelters; "Why Is Bill Gates Building So Many Doomsday Bunkers (2019)"; Jun. 8, 2019; URL: https://www.youtube.com/watch?v=qw1uB_q9Uw0.

Atlas Survival Shelters; "Why Is Bill Gates Building So Many Doomsday Bunkers (2021)"; Jan. 20, 2021; URL: https://www.youtube.com/watch?v=jdW3FqqV3lg.

Atlas Survival Shelters; "Why the USA should break up and become the American Union"; Jul. 5, 2019; URL: https://www.youtube.com/watch?v=ANBLfeMv1yg.

Atlas Survival Shelters; "Why Was 70-Year-Old Texas Man Arrested For Having An Old Bunker"; Jun. 21, 2019; URL: https://www.youtube.com/watch?v=VyX7ybP6tNM.

Atlas Survival Shelters; "Wise Lawsuit Claims Awful Things! But Is It Really All True?"; Mar. 10, 2019; URL: https://www.youtube.com/watch?v=5QVn3gEppjE.

Atlas Survival Shelters; "Wood Gas Powered Truck"; May 25, 2013; URL: https://www.youtube.com/watch?v=slml-Zzp-74.

Atlas Survival Shelters; "World Expert Visits a Badly Engineered $500,000 Bomb Shelter"; Jun. 23, 2019; URL: https://www.youtube.com/watch?v=SjMCnXEbwfc.

Atlas Survival Shelters; "World's Largest Bomb Shelter Factory"; Oct. 11, 2018; URL: https://www.youtube.com/watch?v=U_LD2m_AL3Q.

Atlas Survival Shelters; "WOW! $75 Harbor Freight Survival Gear Challenge"; Jan. 19, 2021; URL: https://www.youtube.com/watch?v=pVXsV7GLAIs.

Atlas Survival Shelters; Company Website; URL: https://www.atlassurvivalshelters.com/.

\* cited by examiner

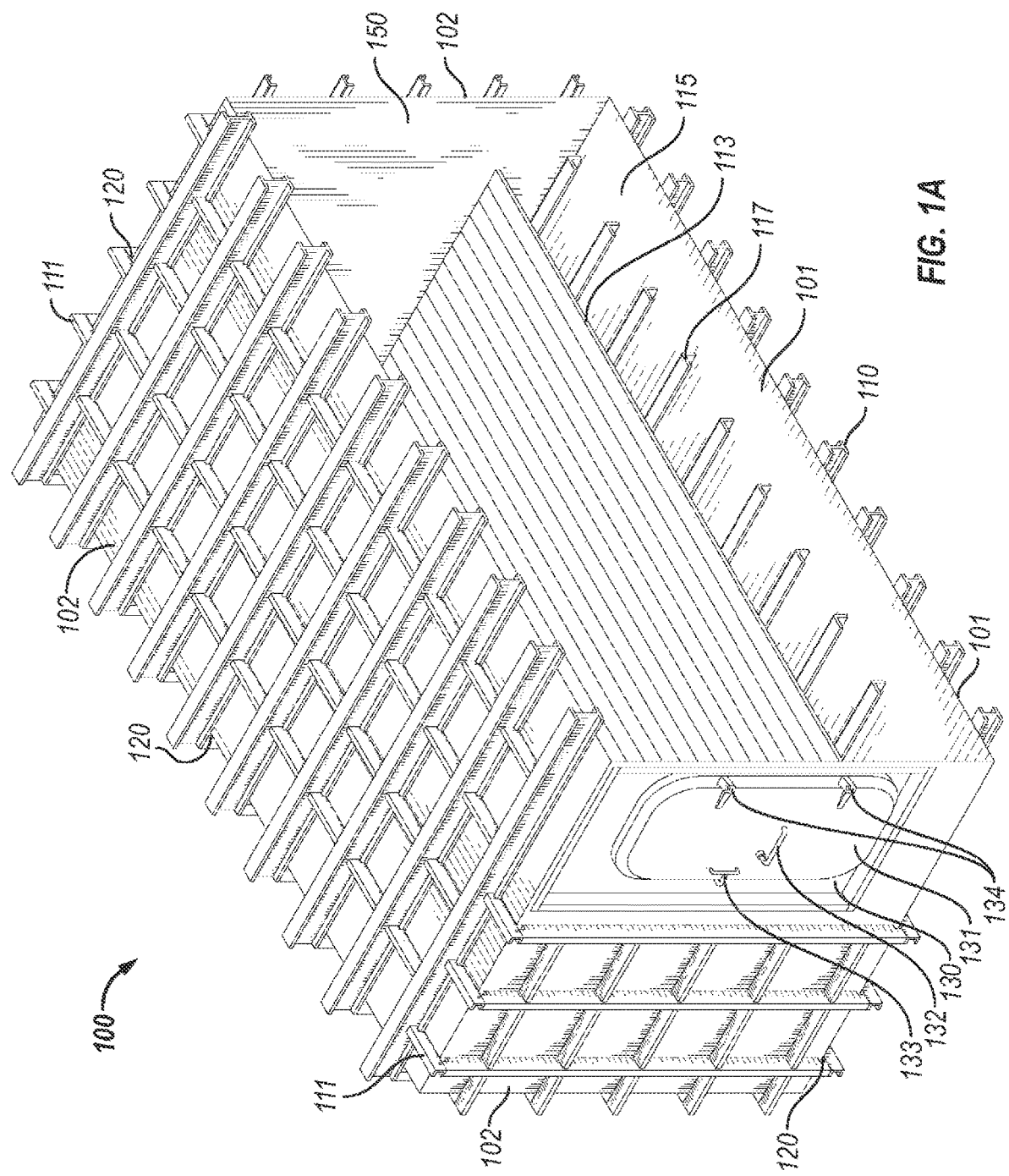

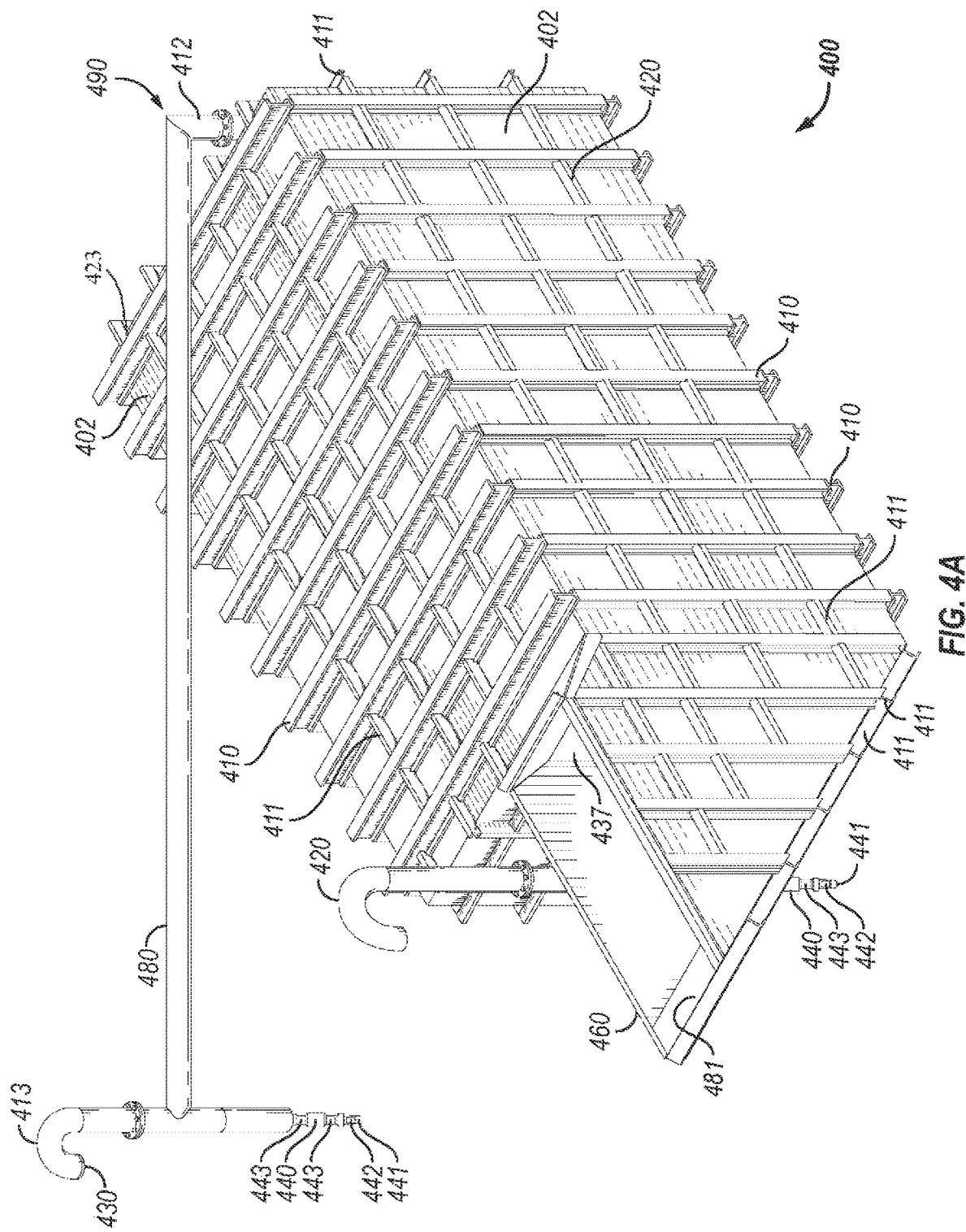

UNDERGROUND SHELTER WITH AIR-INTAKE SYSTEM

BACKGROUND

Technical Field

The present disclosure relates to a survival shelter designed for short- to long-term protection of life and property from other people or disasters. More particularly, and not by way of limitation, the present disclosure is directed to a system and method for using a reinforced survival sheltering system that can be manufactured in such a way as to increase the structural quality of an underground shelter.

Background

This background section is intended to provide a discussion of related aspects of the art that could be helpful to understanding the examples discussed in this disclosure. It is not intended that anything contained herein be an admission of what is or is not prior art, and accordingly, this section should be considered in that light.

Survival shelters are designed to keep humans and valuable property safe from other people or disasters. Many shelters are built underground to utilize the extra protection and cover that the ground provides; however, in areas where the water table may be close to the surface, water can leak into underground shelters. The water can seep into the shelter through cracks and gaps in the seams between the walls, floor, and roof. The leaking water damages property and the shelter and subsequently grow mold in the shelter. Furthermore, water can create instability through erosion or rusting, generating larger gaps and cracks in the shelter's exterior. At worst, during times of severe flooding, an underground shelter may also become flooded and risk people's lives. Current methods of leak prevention generally involve the addition of interior waterproofing but repairing the structure of a leaky shelter that is already underground is difficult and costly.

What is needed is a system that inhibits water from leaking into a sheltering system at the seams by addressing structural weaknesses of the shelter. It would be advantageous to have a system and method that overcomes the disadvantages of the prior art. The present disclosure provides such a system and method.

SUMMARY

This summary provides a discussion of aspects of certain examples of the invention. It is not intended to limit the claimed invention or any of the terms in the claims. The summary provides some aspects but there are aspects and examples of the invention that are not discussed here.

The present disclosure includes novel aspects of a survival shelter that are directed to a survival shelter that is reinforced by notched beams on the exterior of a housing unit. Each beam adds to the structural integrity of the housing unit by helping keep the housing unit's exterior panels and base from buckling under pressure through load distribution, particularly if the shelter is underground. Beams may be fused to the housing unit through welding, which creates a robust connection but stresses and changes the structural properties of the material at the attachment point. Furthermore, the panels that create the housing exterior may also be welded together or to a base, so there are places where the welded beams meet the weld zone that joins two panels or a panel to a base. Areas with multiple connected pieces undergo several alterations to their structural properties due to the repeated welding at the joints, which causes stress on the material and may even distort the housing unit at those spots. Thus, numerously welded sites may be weaker and are more likely to allow unwanted water into the housing unit.

The present invention overcomes that limitation by having a notch near the end of the beam such that a welder can weld two panels or a panel and a base together in one continuous line without overlapping another weld line. The notch specifically allows each component of the housing exterior to be welded only once along the interface between two panels, thereby maintaining the structural integrity of the material by reducing the number of times that the material is stressed. In one or more examples, the single weld line on the exterior corresponds with a weld line along the same interface in the interior so as to effectively waterproof the survival shelter. As a result, the housing unit is structurally reinforced by the presence of the beams without sacrificing protection from leaks.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative examples when read in conjunction with the accompanying drawings, wherein:

FIG. 1A is a perspective cross-section view of one example of an underground shelter with a storage component.

FIG. 4A is a perspective view of one example of an underground shelter with an air intake system.

DETAILED DESCRIPTION

Figure 1B:
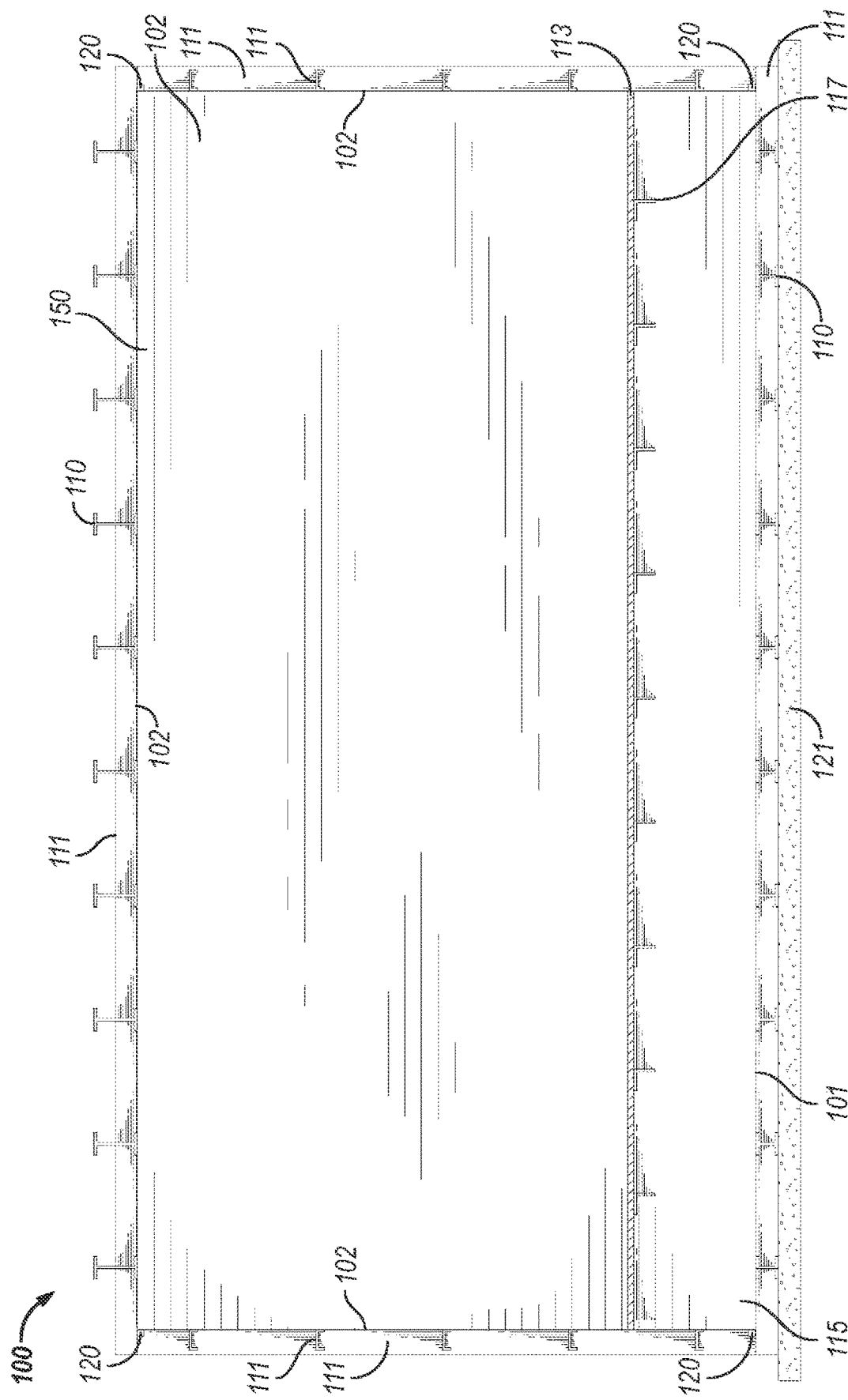
FIG. 1B is a cross-section side view of one example of an underground shelter with a storage component.

Examples of the present disclosure will now be described. Survival shelters are enclosed spaces that are typically designed to protect people, pets, or property from outside influences. Many shelters are built underground to take advantage of the extra protection and cover that the earth provides. For example, underground structures can be insulated from events such as most severe weather events, bomb blasts, and surface fires. Furthermore, underground buildings are typically hidden from possible intruders and can benefit from natural soundproofing, noise abatement, and increased energy efficiency.

One issue that plagues modern underground shelters is the tendency to leak or flood, particularly when the water table rises above the underground shelter. Both water and air leaks can cause issues for structures: water leaks can destroy property and introduce mold and rust, while air leaks can contribute to depressurization and air filtration problems. In the event of a chemical or radiation release, toxic particles can seep into a shelter and cause harm to the interior and its inhabitants. Current solutions to leaking include moisture barriers, special pumping systems, and sealants. Unfortunately, some of these solutions are performed only after a shelter has already been built underground, which makes waterproofing much more difficult and costly. Furthermore, these solutions can be ineffective and may only mitigate some damage done by leaks. However, the main issue with these solutions is that they only treat the symptoms of leaks and not the actual cause, which is structural weaknesses in the shelter's assembly.

One way to help reinforce an underground shelter's structure is through external support structures such as beams that are attached to the exterior of the shelter's housing unit. External support structures can help distribute the weight of the ground above the shelter, thereby reducing pressure on the weaker parts of the shelter. However, leaks generally appear in the seams of the shelter's exterior panels, particularly in places where two or more panels meet, a panel meets a base, or a panel meets an auxiliary support structure such as a beam. The panels are typically welded together, but if welded improperly, the shelter may begin to weaken and allow cracks to form in the welded seams. In the worst-case scenario, improper welding can cause severe structural weakness that causes the entire shelter to collapse. Particularly troublesome are areas where a welder has to make multiple passes in order to properly weld multiple materials together, such as at corners or joints. Because welding changes the physical and chemical composition of the materials to be welded together, the stress from multiple welds can cause structural weaknesses in the welded areas. The structural weaknesses can lead to fractures and cracks that allow water and ambient air into a shelter or pressurized air out of the shelter. Some materials respond better to different methods of welding that allow for multiple passes; however, these processes may be expensive and can severely limit the kinds of materials that builders may use to construct resilient underground shelters.

The present invention allows for support structures such as beams to help further strengthen an underground structure without forcing welders to pass over weld lines multiple times. By having a notch near the end of a structural support, a welder can weld two panels, a support beam to a panel or base, or a panel and a base together in one continuous line without overlapping another weld line along the exterior interface between the two panels. The notch specifically allows each component of a shelter's housing exterior to be welded only once, thereby maintaining the structural integrity of the material by reducing the number of times that the material is stressed by welding. In in or more examples, a weld line is performed along the interior interface so that the shelter is waterproofed. As a result, the housing unit is structurally reinforced by the support of the beams without sacrificing protection from leaks.

FIG. 1A is a perspective cross-section schematic of one possible example of an underground shelter that contains notches in exterior support structures that help prevent structural weaknesses that can occur during welding. In at least one example, the shelter is comprised of at least one housing unit 100, which may be buried under at least three feet of earth cover, in the shape of a prism that is comprised of five panels 102, four of which connect to a base 101. This particular example shows several buttresses supports 110 that are parallel to the width of the base 101 and extend the entire width of the housing unit 100. The buttress supports 110 may also be attached to one or more additional panels 102 of the housing unit 100. Several beam supports 111 may run perpendicular to the buttress supports 110 and may also stretch both the length and the width of panels 102 that form the housing unit 100. The panels 102, supports 110 and 111, and base 101 may be made from a variety of metals or plastics and would ideally be rigid, waterproof, bulletproof, or fireproof. The panels 102 or base 101 may also be made of a material similar to concrete or stone. In other examples, the buttress supports 110 and beam supports 111 may be the same type of supports. The supports 110 and 111 themselves may be any type of structure that provides support including, but not limited to, beams, wires, slabs, girders, poles, struts, columns, buttresses, bars, plates, blocks, posts, trusses, or any combination thereof. This particular example shows the buttress supports 110 as I-beams and the support beams 111 as U-beams that are welded to one another and welded to panels 102 and base 101. In some examples, the panels 102, supports 110 and 111, and base 101 may be connected to one another via welding, glue, fastened, tied together, or some combination thereof. If the housing unit 100 is located above ground, the exterior of the housing unit 100 may be built such that the shelter can withstand a variety of disasters, including, but not limited to, extreme or severe weather, a chemical release, bomb attack, seismic event, or explosions. The housing unit 100 may be encased in a concrete shell that provides extra support and protection or the housing unit 100 may sit on a concrete slab. The housing unit 100 may be any shape, including, but not limited to, domed, spherical, cylindrical, truncated cylindrical, or prismed and may be corrugated, galvanized, or sand-blasted to provide durability and protection. The entire housing unit 100 and attached framework, which may be attached to the interior or exterior of the panels 102, made up of supports 110 and 111 may have components attached to provide options for portability and transportation if necessary and may be installed in or underneath existing homes. The framework may be composed of one or more supports 110 and 111 and may only have beam supports 111. The supports 110 and 111 may be made of multiple materials. The housing unit 100 may be built elsewhere and transported and installed at the desired location.

In at least one example, beam supports 111 contain notches 120 in places that intersect other weld lines, such as where two panels 102 meet along an interface, where a beam support 111 or buttress support 110 meets a panel 102, or where a panel 102 and base 101 meet. FIG. 1A demonstrates an example with notches 120 at or near the ends of beam supports 111 where a buttress support 110 is welded to panel 102. The notches 120 help prevent a welder from welding over a previous weld line, thereby reducing stress and perturbations in the materials located in the weld area. As such, notches 120 are typically dimensioned such that the heat zone of one weld line will not overlap with the heat zone of the weld line for the beam supports 111. In this example, a welder would weld the buttress supports 110 to a panel 102 or base 101, panel 102 to another panel 102, or panel 102 to base 101 in a continuous line. The welder could then weld beam supports 111 to the panel 102, base 101, or buttress support 110 by welding the beam supports 111 in a continuous line, stopping at a notch 120. Because the notch 120 is ideally dimensioned to minimize the number of times the material in the area undergoes chemical and physical changes, the materials that make up panels 102, base 101, and supports 110 and 111 may encounter less strain. Thus, due to the reduction of stress in the materials that form the housing unit 100, the housing unit 100 is less likely to have leaks or flooding due to structural weaknesses. The addition of supports 110 and 111 further helps maintain structural integrity by redistributing the weight of the earth cover that exerts pressure on the housing unit 100.

The housing unit 100 may be accessible through more than one entry port 130 (also sometimes referred to as an entry) that may be made of durable material that may also be rigid, waterproof, bulletproof, or fireproof. The example shown in FIG. 1A shows the entry port 130 having an entrance barrier 131 as a door, but other examples may have a door, hatch, gate, flap, or other entrance barrier 131 and would preferably create an airtight, gas-tight, or watertight seal. The entry port 130 may also be a combination of hatches, doors, or other entrance barriers 131 to provide protection from other people, debris, or disaster elements. The entrance barriers 131 may include a locking mechanism 132 or a tamper-proof mechanism and may be dimensioned large enough to drive a vehicle or plane into the housing unit. The entrance barrier 131 may have hinges 134 and hinges 134 may allow the entrance barrier 131 to open in at least one direction. The entrance barrier 131 may also allow entry by being removed from the entry port 130. The entrance barrier 131 or entry port 130 may have a handle 133 attached to help with entry into the housing unit 100. The handle 133 may be made from a rigid material such as metal, plastic, or wood, or may be made from a flexible material such as cloth or rope. Furthermore, the handle 133 may also be part of the locking mechanism 132. The entrance barrier 131 may also have knobs or levels that aid in entry. The entry port 130 may connect the housing unit 100 to the interior or exterior of a surface-level house and may be concealed by its surroundings. Furthermore, the entry port 130 may contain a 90-degree turn into the housing unit 100 to attenuate any gamma radiation that may inadvertently enter the shelter. The entry port 130 or other area within the housing unit interior 150 may also have a decontamination shower for removing contaminants that may affect other individuals in the shelter.

The housing unit 100, which may contain furniture, may also contain one or more interior rooms 150, including a mud room, kitchen, bathroom, or bedroom, and may have a floor 113 that is separate from the base 101. The floor 113 may be at some height above the base 101 for additional storage 115, which is accessible through a removeable floor or hinged component. The floor 113 may be supported by joists 117 that the floor 113 sits on and are connected to the interior side of the panels 102; however, the floor 113 may be supported through several ways, including but not limited to beams, purlins, wires, slabs, girders, poles, struts, columns, buttresses, bars, plates, blocks, posts, trusses, or any combination thereof. This particular example shows a floor 113 made of removeable composite slats that rest on joists 117 that are L-beams. The floor 113 or base 101 may be made from materials sturdy enough to support supplies, furniture, people, or pets without allowing elements of the environment external to the housing unit 101 or the materials housed in storage 115 into the housing unit interior 150. Furthermore, the floor 113 or base 101 may be made from materials that are rigid, waterproof, bulletproof, or fireproof. Elements of the interior 150 of the housing unit 100 may be galvanized to prevent rust or made from materials such as wood, plastic, cloth, etc. The housing unit 100 may also be climate controlled by a fan, air filtration system, air conditioning system, heating system, or other systems that may affect the ambient air of the housing unit interior 150. The housing unit 100 may be configured to be soundproof, echo-proof, waterproof, or protected from electromagnetic pulses or seismic activities. The housing unit 100 may also be equipped with a pumping system that helps remove fluid from the housing unit interior 150.

Additionally, the housing unit 100 may possess the ability to receive and use electricity through a generator, solar panels, mechanical energy, the power grid, or other power sources. The housing unit interior 150 or storage 115 may also have lights and power outlets for electronic equipment. The lights may be automatic or switched on and off manually through something such as a light switch. The housing unit 100 may also possess the ability to receive water for use in areas such as a flushable toilet, decontamination shower, and sinks as well as the ability to transport sewage away from the housing unit 100. The housing unit 100 may also contain a dry flushing toilet. The housing unit 100 would also preferably be equipped with radio antenna and antenna cables.

FIG. 1B is a side cross-section view of one example of an underground shelter with housing unit 100 and sub-flooring storage 115 that allows for a shelter owner to conceal or store valuables and other items. In this example, the housing unit 100, which may be buried under at least three feet of earth cover, sits atop a concrete slab 121 and the housing unit 100 is in the shape of a prism that is comprised of five panels 102, four of which connect to a base 101. This particular example shows several buttresses supports 110 that are parallel to the width of the base 101 and extend the entire width of the housing unit 100. The buttress supports 110 in this example are attached to the housing unit 100 by being welded or otherwise attached to panel 102 that makes the top of the housing unit 100 in addition to base 101, and the buttress supports 110 sit between the base 101 and concrete slab 121. The buttress supports 110 may also be attached to multiple side panels 102 of the housing unit 100. Several beam supports 111 may run perpendicular to the buttress supports 110 and may also stretch both the length and the width of panels 102 that form the housing unit 100. The panels 102, supports 110 and 111, and base 101 may be made from a variety of metals or plastics and would ideally be rigid, waterproof, bulletproof, or fireproof. The base 101 or panels 102 may also be made of a material like concrete or stone. In other examples, the buttress supports 110 and beam supports 111 may be the same type of supports. The supports 110 and 111 themselves may be any type of structure that provides support including, but not limited to, beams, wires, slabs, girders, poles, struts, columns, buttresses, plates, blocks, posts, trusses, or any combination thereof. This particular example shows the buttress supports 110 as I-beams and the support beams 111 as U-beams that are welded to one another and welded to panels 102 and base 101. In some examples, the panels 102, supports 110 and 111, and base 101 may be connected to one another via welding, glue, fastened, tied together, or some combination thereof. If the housing unit 100 is located above ground, the exterior of the housing unit 100 should be built such that the shelter can withstand a variety of disasters, including, but not limited to, extreme or severe weather, a chemical release, bomb attack, seismic event, or explosions. The housing unit 100 may be encased in a concrete shell that provides extra support and protection. The housing unit 100 may be any shape, including, but not limited to, domed, spherical, cylindrical, truncated cylindrical, or prismed and may be corrugated, galvanized, or sand-blasted to provide durability and protection. The entire housing unit 100 and attached framework, which may be attached to the interior or exterior of the panels 102, made up of supports 110 and 111 may have components attached to provide options for portability and transportation if necessary and may be installed in or underneath existing homes. The framework may be composed of one or more supports 110 and 111 and may only have beam supports 111. The supports 110 and 111 may be made of multiple materials. The housing unit 100 may be built elsewhere and transported and installed at the desired location.

The housing unit 100, which may contain furniture, may also contain one or more interior rooms 150, including a mud room, kitchen, bathroom, or bedroom, and may have a floor 113 that is separate from the base 101. The floor 113 may be at some height above the base 101 for additional storage 115, which is accessible through a removeable floor or hinged component. The floor 113 may be supported by joists 117 that the floor 113 sits on and are connected to the interior side of the panels 102; however, the floor 113 may be supported through several ways, including but not limited to beams, purlins, wires, slabs, girders, poles, struts, columns, buttresses, bars, plates, blocks, posts, trusses, or any combination thereof. This particular example shows a floor 113 made of removeable composite slats that rest on joists 117 that are L-beams. The floor 113 or base 101 may be made from materials sturdy enough to support supplies, furniture, people, or pets without allowing elements of the environment external to the housing unit 101 or the materials housed in storage 115 into the housing unit interior 150. Furthermore, the floor 113 or base 101 may be made from materials that are rigid, waterproof, bulletproof, or fireproof. Elements of the interior 150 of the housing unit 100 may be galvanized to prevent rust or made from materials such as wood, plastic, cloth, etc. The housing unit 100 may also be climate controlled by a fan, air filtration system, air conditioning system, heating system, or other systems that may affect the ambient air of the housing unit interior 150. The housing unit 100 may be configured to be soundproof, echo-proof, waterproof, or protected from electromagnetic pulses or seismic activities. The housing unit 100 may also be equipped with a pumping system that helps remove fluid from the housing unit interior 150.

Additionally, the housing unit 100 may possess the ability to receive and use electricity through a generator, solar panels, mechanical energy, the power grid, or other power sources. The housing unit interior 150 or storage 115 may also have lights and power outlets for electronic equipment. The lights may be automatic or switched on and off manually through something such as a light switch. The housing unit 100 may also possess the ability to receive water for use in areas such as a flushable toilet, decontamination shower, and sinks as well as the ability to transport sewage away from the housing unit 100. The housing unit 100 may also contain a dry flushing toilet. The housing unit 100 would also preferably be equipped with radio antenna and antenna cables.

In at least one example, beam supports 111 contain notches 120 in places that intersect other weld lines, such as where two panels 102 meet along an interface, where a beam support 111 or buttress support 110 meets a panel 102, or where a panel 102 and base 101 meet. FIG. 1B demonstrates an example with notches 120 at or near the ends of beam supports 111 where a buttress support 110 is welded to panel 102. The notches 120 help prevent a welder from welding over a previous weld line, thereby reducing stress and perturbations in the materials located in the weld area. As such, notches 120 are typically dimensioned such that the heat zone of one weld line will not overlap with the heat zone of the weld line for the beam supports 111. In this example, a welder would weld the buttress supports 110 to a panel 102 or base 101, panel 102 to another panel 102, or panel 102 to base 101 in a continuous line. The welder could then weld beam supports 111 to the panel 102, base 101, or buttress support 110 by welding the beam supports 111 in a continuous line, stopping at a notch 120. Because the notch 120 is ideally dimensioned to minimize the number of times the material in the area undergoes chemical and physical changes, the materials that make up panels 102, base 101, and supports 110 and 111 may encounter less strain. Thus, due to the reduction of stress in the materials that form the housing unit 100, the housing unit 100 is less likely to have leaks or flooding due to structural weaknesses. The addition of supports 110 and 111 further helps maintain structural integrity by redistributing the weight of the earth cover that exerts pressure on the housing unit 100.

Figure 1C:
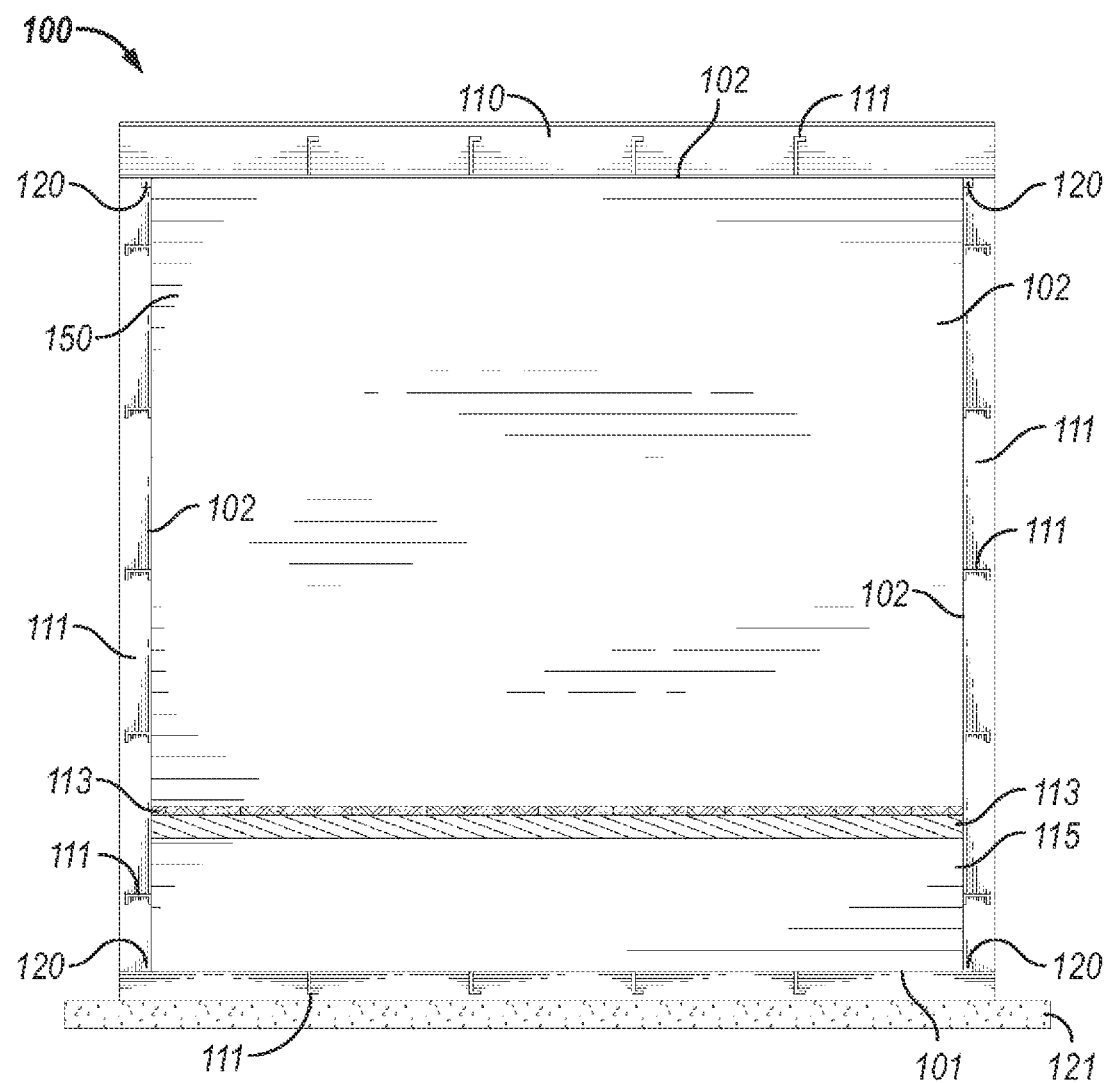
FIG. 1C is a cross-section front view of one example of an underground shelter with a storage component.

FIG. 1C is a front cross-section view of another example of an underground shelter with housing unit 100 and sub-flooring storage 115 that allows for a shelter owner to conceal or store valuables and other items. In this example, the housing unit 100, which may be buried under at least three feet of earth cover, sits atop a concrete slab 121 and the housing unit 100 is in the shape of a prism that is comprised of five panels 102, four of which connect to a base 101. This particular example shows several buttresses supports 110 that are parallel to the width of the base 101 and extend the entire width of the housing unit 100. The buttress supports 110 in this example are attached to the housing unit 100 by being welded or otherwise attached to panel 102 that makes the top of the housing unit 100 in addition to base 101, and the buttress supports 110 sit between the base 101 and concrete slab 121. The buttress supports 110 may also be attached to multiple side panels 102 of the housing unit 100. Several beam supports 111 may run perpendicular to the buttress supports 110 that may stretch the length of panels 102 that form the housing unit 100. The panels 102, supports 110 and 111, and base 101 may be made from a variety of metals or plastics and would ideally be rigid, waterproof, bulletproof, or fireproof. The base 101 or panels 102 may also be made of a material like concrete or stone. In other examples, the buttress supports 110 and beam supports 111 may be the same type of supports. The supports 110 and 111 themselves may be any type of structure that provides support including, but not limited to, beams, wires, slabs, girders, poles, struts, columns, buttresses, plates, blocks, posts, trusses, or any combination thereof. This particular example shows the buttress supports 110 as I-beams and the support beams 111 as U-beams that are welded to one another and welded to panels 102 and base 101. In some examples, the panels 102, supports 110 and 111, and base 101 may be connected to one another via welding, glue, fastened, tied together, or some combination thereof. If the housing unit 100 is located above ground, the exterior of the housing unit 100 should be built such that the shelter can withstand a variety of disasters, including, but not limited to, extreme or severe weather, a chemical release, bomb attack, seismic event, or explosions. The housing unit 100 may be encased in a concrete shell that provides extra support and protection. The housing unit 100 may be any shape, including, but not limited to, domed, spherical, cylindrical, truncated cylindrical, or prismed and may be corrugated, galvanized, or sand-blasted to provide durability and protection. The entire housing unit 100 and attached framework, which may be attached to the interior or exterior of the panels 102, made up of supports 110 and 111 may have components attached to provide options for portability and transportation if necessary and may be installed in or underneath existing homes. The framework may be composed of one or more supports 110 and 111 and may only have beam supports 111. The supports 110 and 111 may be made of multiple materials. The housing unit 100 may be built elsewhere and transported and installed at the desired location.

The housing unit 100, which may contain furniture, may also contain one or more interior rooms 150, including a mud room, kitchen, bathroom, or bedroom, and may have a floor 113 that is separate from the base 101. The floor 113 may be at some height above the base 101 for additional storage 115, which is accessible through a removeable floor or hinged component. The floor 113 may be supported by joists 117 that the floor 113 sits on and are connected to the interior side of the panels 102; however, the floor 113 may be supported through several ways, including but not limited to beams, purlins, wires, slabs, girders, poles, struts, columns, buttresses, bars, plates, blocks, posts, trusses, or any combination thereof. This particular example shows a floor 113 made of removeable composite slats that rest on joists 117 that are L-beams. The floor 113 or base 101 may be made from materials sturdy enough to support supplies, furniture, people, or pets without allowing elements of the environment external to the housing unit 101 or the materials housed in storage 115 into the housing unit interior 150. Furthermore, the floor 113 or base 101 may be made from materials that are rigid, waterproof, bulletproof, or fireproof. Elements of the interior 150 of the housing unit 100 may be galvanized to prevent rust or made from materials such as wood, plastic, cloth, etc. The housing unit 100 may also be climate controlled by a fan, air filtration system, air conditioning system, heating system, or other systems that may affect the ambient air of the housing unit interior 150. The housing unit 100 may be configured to be soundproof, echo-proof, waterproof, or protected from electromagnetic pulses or seismic activities. The housing unit 100 may also be equipped with a pumping system that helps remove fluid from the housing unit interior 150.

Additionally, the housing unit 100 may possess the ability to receive and use electricity through a generator, solar panels, mechanical energy, the power grid, or other power sources. The housing unit interior 150 or storage 115 may also have lights and power outlets for electronic equipment. The lights may be automatic or switched on and off manually through something such as a light switch. The housing unit 100 may also possess the ability to receive water for use in areas such as a flushable toilet, decontamination shower, and sinks as well as the ability to transport sewage away from the housing unit 100. The housing unit 100 may also contain a dry flushing toilet. The housing unit 100 would also preferably be equipped with radio antenna and antenna cables.

Figure 1D:
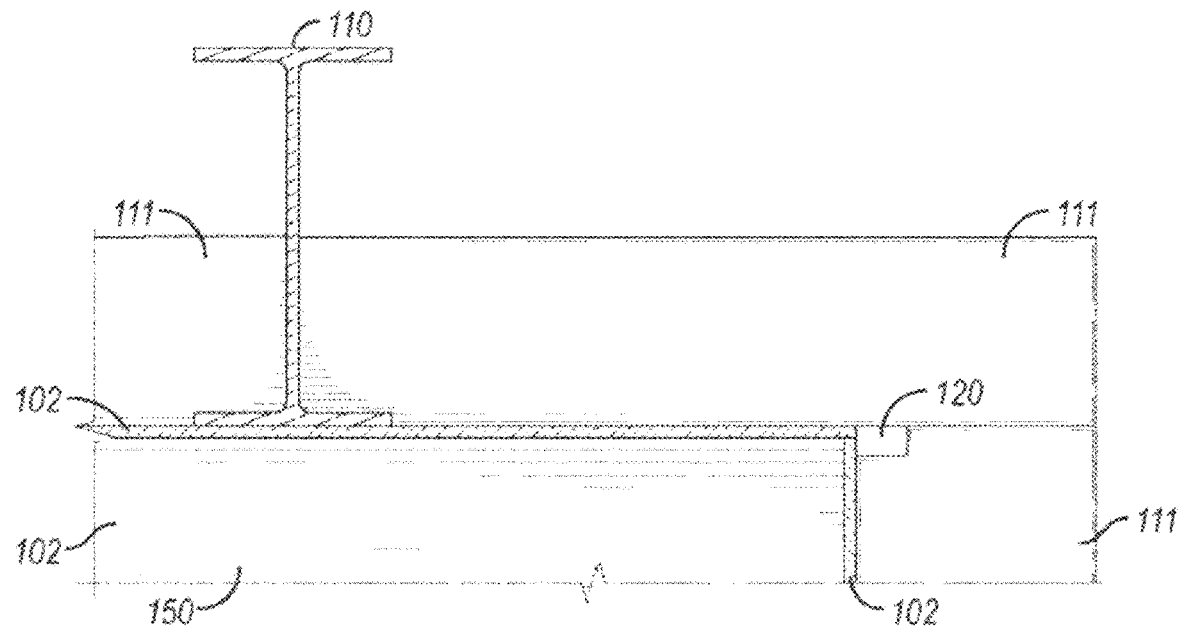
FIG. 1D is a detailed cross-section view of one example of the top of an underground shelter with notches in the beams.

FIG. 1D shows a top closeup schematic cross-section diagram of the notches 120 in an example of the invention that contains notches 120 in the beam supports 111. The notches 120 help prevent a welder from welding over a previous weld line, thereby reducing stress and perturbations in the materials located in the weld area. As such, notches 120 are typically dimensioned such that the heat zone of one weld line will not overlap with the heat zone of the weld line for the beam supports 111. In at least one example, a housing unit may be comprised of at least two panels 102 attached to beam supports 111 and buttress supports 110. The beam supports 111 contain notches 120 in places that intersect other weld lines, such as where two panels 102 meet at an interface or where a beam support 111 or buttress support 110 meets a panel 102. FIG. 1D illustrates an example with notches 120 at or near the ends of beam supports 111 where a buttress support 110 is being welded to panel 102. In this embodiment, a welder would weld the buttress supports 110 to a panel 102 or panel 102 to another panel 102 in a continuous line. The welder could then weld beam supports 111 to the panel 102 or buttress support 110 by welding the beam supports 111 in a continuous line, stopping at a notch 120. Because the notch 120 is ideally dimensioned to minimize the number of times the material in the area undergoes chemical and physical changes, the materials that make up panels 102 and supports 110 and 111 may encounter less strain. Thus, due to the reduction of stress in the materials that form the housing unit 100, the housing unit 100 is less likely to have leaks or flooding due to structural weaknesses. The addition of supports 110 and 111 further helps maintain structural integrity by redistributing the weight of the earth cover that exerts pressure on the housing unit 100. Elements of the interior 150 of the housing unit may be adjacent to one or more panels 102.

Figure 1E:
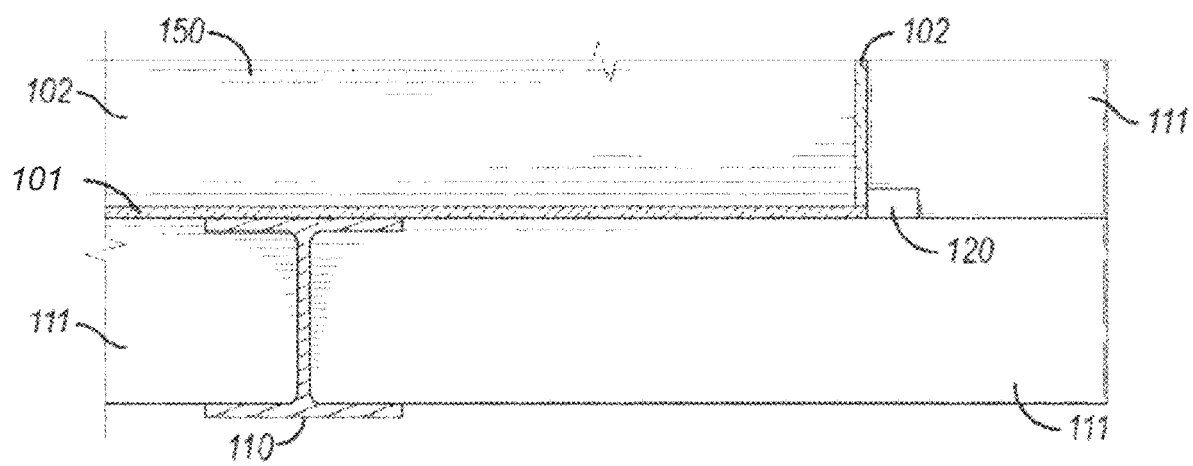
FIG. 1E is a detailed cross-section view of one example of the bottom of an underground shelter with notches in the beams.

FIG. 1E shows a bottom closeup schematic cross-section diagram of the notches 120 in an embodiment of the invention that contains notches in the beam supports 111. The notches 120 help welders from welding over a previous weld line, thereby reducing stress and perturbations in the materials located in the weld area. As such, notches 120 are typically dimensioned such that the heat zone of one weld line will not overlap with the heat zone of the weld line for the beam supports 111. In at least one embodiment, beam supports 111 contain notches 120 in places that intersect other weld lines, such as where a beam support 111 or buttress support 110 meets a panel 102 or where a panel 102 and base 101 meet. FIG. 1D demonstrates an embodiment with notches 120 at or near the ends of beam supports 111 where a buttress support 110 is being welded to panel 102. Additionally, notches 102 may be in a beam support 111 where one or more panels 102 are being welded to meet with base 101. In this embodiment, a welder would weld the buttress supports 110 to a panel 102 or base 101 or panel 102 to base 101 in a continuous line. The welder could then weld beam supports 111 to the panel 102, base 101, or buttress support 110 by welding the beam supports 111 in a continuous line, stopping at a notch 120. Because the notch 120 is ideally dimensioned to minimize the number of times the material in the area undergoes chemical and physical changes, the materials that make up panels 102, base 101, and supports 110 and 111 may encounter less strain. Thus, due to the reduction of stress in the materials that form the housing unit 100, the housing unit 100 is less likely to have leaks or flooding due to structural weaknesses. The addition of supports 110 and 111 further helps maintain structural integrity by redistributing the weight of the earth cover that exerts pressure on the housing unit 100. Elements of the interior 150 of the housing unit may be adjacent to one or more panels 102.

Figure 1F:
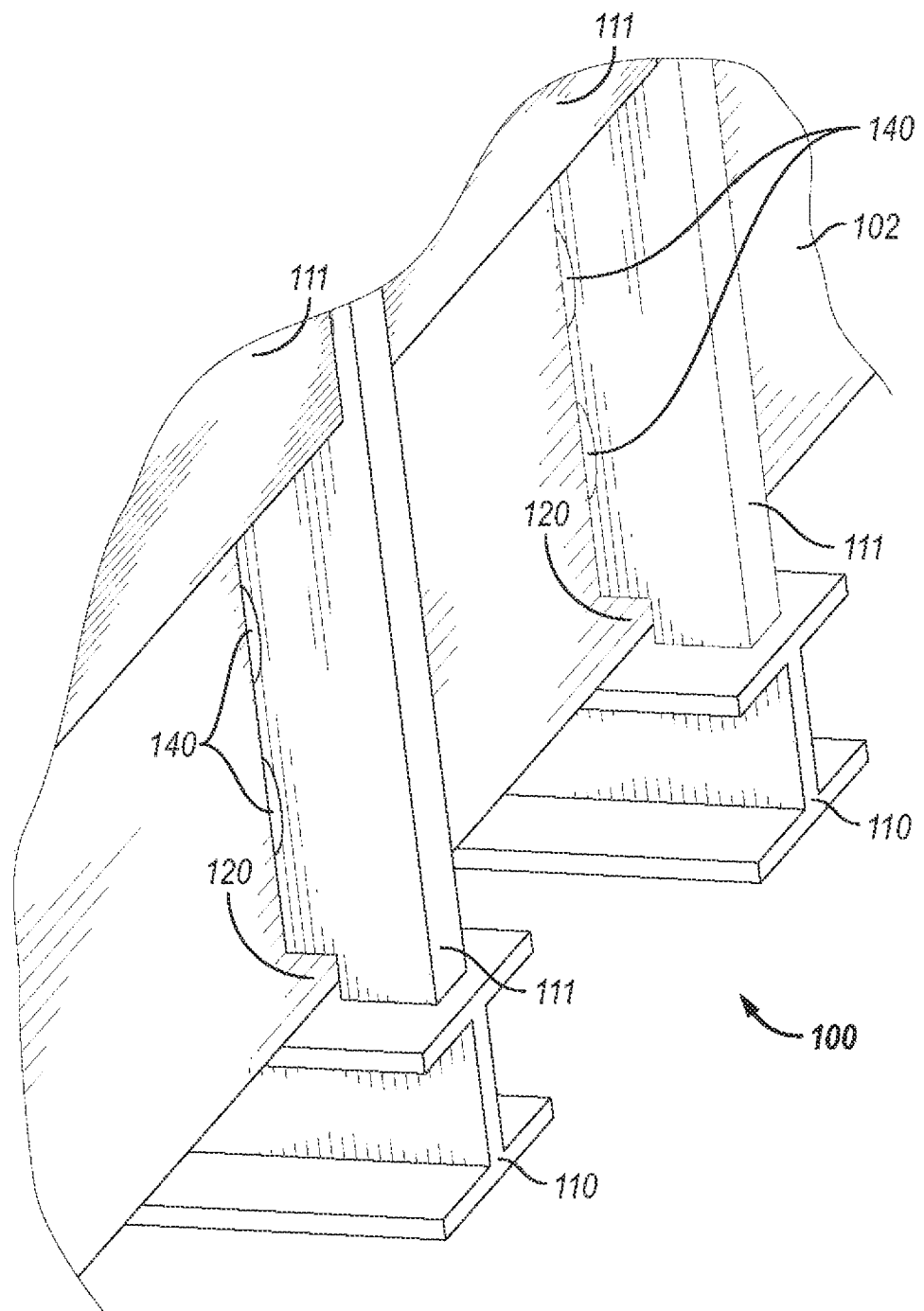
FIG. 1F is a detailed side view of one example of the bottom of an underground shelter with notches in the beams.

FIG. 1F shows a schematic diagram of the notches 120 in an embodiment of the housing unit 100 that contains notches in the beam supports 111. The notches 120 allow a welder to avoid welding over a previous weld line 140, thereby reducing stress and perturbations in the materials around the weld area. As such, notches 120 are typically dimensioned such that the heat zone of one weld line will not overlap with the heat zone of the weld line for the beam supports 111. In at least one embodiment, beam supports 111 contain notches 120 in places that intersect other weld lines, such as where a beam support 111 or buttress support 110 meets a panel 102. FIG. 1F demonstrates an example with notches 120 at or near the ends of beam supports 111 where a beam support 111 is welded to panel 102. The notch allows for the welder to avoid intersecting with the weld line 140 that attaches beam support 111 to panel 102 when welding another panel 102 or the base 101 to the panel 102 with the beam support 110. In this embodiment, a welder would weld the buttress supports 110 to a panel 102 or base 101 or panel 102 to base 101 in a continuous line. The welder could then weld beam supports 111 to the panel 102, base 101, or buttress support 110 by welding the beam supports 111 in a continuous line, stopping at a notch 120. Because the notch 120 is ideally dimensioned to minimize the number of times the material in the area undergoes chemical and physical changes, the materials that make up panels 102, base 101, and supports 110 and 111 may encounter less strain. Thus, due to the reduction of stress in the materials that form the housing unit 100, the housing unit 100 is less likely to have leaks or flooding due to structural weaknesses. The addition of supports 110 and 111 further helps maintain structural integrity by redistributing the weight of the earth cover that exerts pressure on the housing unit.

Figure 2:
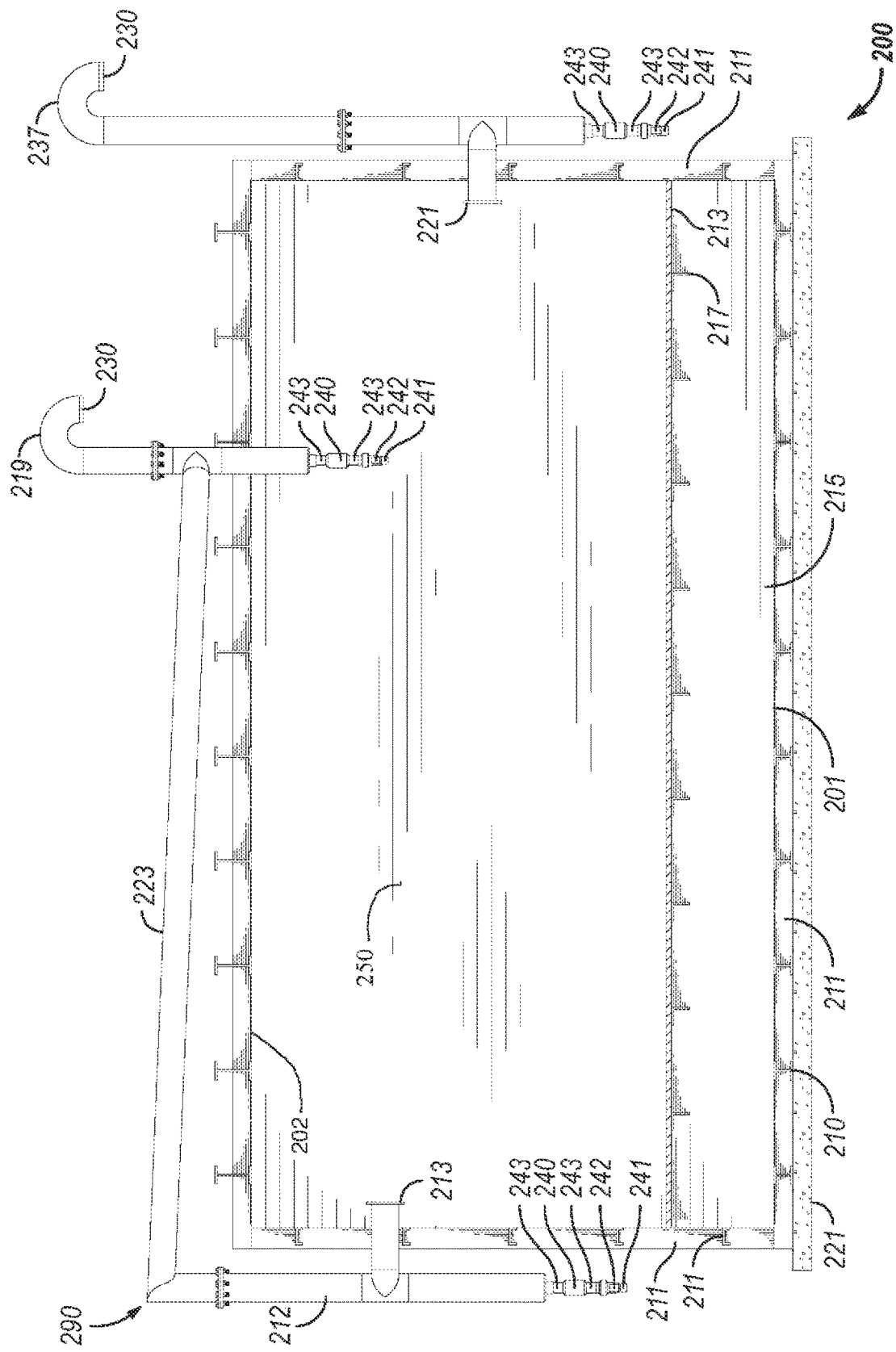
FIG. 2 is a cross-section view of one example of an underground shelter with an air intake system.

FIG. 2 is a cross-section side view of one example of an underground shelter 200 with an air intake system. In at least one embodiment, the shelter is comprised of at least one housing unit 200, which may be buried under at least three feet of earth cover, in the shape of a prism that is comprised of five panels 202, four of which connect to a base 201. This particular example shows several buttress supports 210 that are parallel to the width of the base 201 and extend the entire width of the housing unit 200. The buttress supports 210 may also be attached to one or more additional panels 202 of the housing unit 200. Several beam supports 211 may run perpendicular to the buttress supports 210 and may also stretch both the length and the width of panels 202 that form the housing unit 200. The panels 202, supports 210 and 211, and base 201 may be made from a variety of metals or plastics and would ideally be rigid, waterproof, bulletproof, or fireproof. The panels 202 or base 201 may also be made of a material similar to concrete or stone. In other examples, the buttress supports 210 and beam supports 211 may be the same type of supports. The supports 210 and 211 themselves may be any type of structure that provides support including, but not limited to, beams, wires, slabs, girders, poles, struts, columns, buttresses, bars, plates, blocks, posts, trusses, or any combination thereof. This particular embodiment shows the buttress supports 210 as I-beams and the support beams 211 as U-beams that are welded to one another and welded to panels 202 and base 201. In some embodiments, the panels 202, supports 210 and 211, and base 201 may be connected to one another via welding, glue, fastened, tied together, or some combination thereof. If the housing unit 200 is located above ground, the exterior of the housing unit 200 should be built such that the shelter can withstand a variety of disasters, including, but not limited to, extreme or severe weather, a chemical release, bomb attack, seismic event, or explosions. The housing unit 200 may be encased in a concrete shell that provides extra support and protection or the housing unit 200 may sit on a concrete slab 221. The housing unit 200 may be any shape, including, but not limited to, domed, spherical, cylindrical, truncated cylindrical, or prismed and may be corrugated, galvanized, or sand-blasted to provide durability and protection. The entire housing unit 200 and attached framework, which may be attached to the interior or exterior of the panels 202, made up of supports 210 and 211 may have components attached to provide options for portability and transportation if necessary and may be installed in or underneath existing homes. The framework may be composed of one or more supports 210 and 211 and may only have beam supports 211. The supports 210 and 211 may be made of multiple materials. The housing unit 200 may be built elsewhere and transported and installed at the desired location.

The housing unit 200, which may contain furniture, may also contain one or more interior rooms 250, including a mud room, kitchen, bathroom, or bedroom, and may have a floor 213 that is separate from the base 201. The floor 213 may be at some height above the base 201 for additional storage 215, which is accessible through a removeable floor or hinged component. The floor 213 may be supported by joists 217 that the floor 213 sits on and are connected to the interior side of the panels 102; however, the floor 213 may be supported through several ways, including but not limited to beams, purlins, wires, slabs, girders, poles, struts, columns, buttresses, bars, plates, blocks, posts, trusses, or any combination thereof. This particular embodiment shows a floor 213 made of removeable composite slats that rest on joists 217 that are L-beams. The floor 213 or base 201 may be made from materials sturdy enough to support supplies, furniture, people, or pets without allowing elements of the environment external to the housing unit 201 or the materials housed in storage 215 into the housing unit interior 250. Furthermore, the floor 213 or base 201 may be made from materials that are rigid, waterproof, bulletproof, or fireproof. Elements of the interior 250 of the housing unit 200 may be galvanized to prevent rust or made from materials such as wood, plastic, cloth, etc. The housing unit 200 may also be climate controlled by a fan, air filtration system, air conditioning system, heating system, or other systems that may affect the ambient air of the housing unit interior 250. The housing unit 200 may be configured to be soundproof, echo-proof, waterproof, or protected from electromagnetic pulses or seismic activities. The housing unit 200 may also be equipped with a pumping system that helps remove fluid from the housing unit interior 150.

The housing unit 200 may be equipped with an air filtration system 290 that brings fresh surface air into the housing unit 200. If underground, the air filtration system 290 may contain at least one surface intake pipe 219, which draws surface air into one or more slanted air pipes 223 that ideally has a non-zero grade. The slanted air pipe 223, which in one or more examples is slanted at a two-degree angle or greater, reduces condensation and allows for dryer air to move into the housing unit 200. The slanted air pipe 223 may also attach to one or more pipes such as a vertical intake pipe 212 as shown in this embodiment. The slanted air pipe 223, vertical intake pipe 212, or other pipe may connect to one or more intake vents 225 that may be connected to or within the housing unit 200 and moves air into the housing unit interior 250. The intake vents 225 may connect to one or more filtration systems, which preferably filter out any nuclear, biological, or chemical toxins before releasing the air into the housing unit interior 250. The filters may be, but not limited to, high-efficiency particulate air (HEPA), ultraviolet (UV) light, adsorption, electrostatic, carbon, media, pleated, spun glass, or some combination thereof. Air may leave the housing unit 200 through one or more exhaust vents 221, which may be placed at a different elevation from the intake vents 219 to prevent ventilation crossflow. The exhaust vents 221 may connect to one or more exhaust pipes 237 that leads the air back to the surface. The air filtration system 290 may also be connected to one or more air vents or ducts to distribute air throughout the shelter. Both intake and exhaust surface pipes 219 and 237 may be configured to prevent tampering and preferably contain debris shields 230 in the form of screens or hoods that prevent debris and other unwanted items from entering the filtration system 290. The debris shields 230 in this embodiment are welded to the surface openings of air intake pipe 219 and exhaust pipe 237; however, the debris shields 230 may be attached through a variety of ways, including but not limited to, glue, welding, threaded coupling, and fastening. The debris shields 230 may also be placed at other locations within the intake pipe 219 and exhaust pipe 237 at places other than the surface openings. The intake pipes 219 and exhaust pipes 237 may be curved in a way that prevents tampering at the surface such that the pipe opening faces the surface instead of towards the sky. In this example, the intake pipe 219 and exhaust pipe 237 are curved to form a "candy-cane" shape; in other words, the intake pipe 219 and exhaust pipe 237 are curved 180 degrees about the z-axis such that the surface ends of the intake pipe 219 and exhaust pipe 237 point down.

One other way that the filtration might prevent tampering is through a blast valve, which closes the intake and exhaust pipes when a strong pressure change is detected. The blast valve preferably becomes automatically triggered when a pressure change in the air filtration system 290 occurs at less than or equal to 0.1 psi; however, the blast valve may be manually triggered or become automatically triggered at a larger change of pressure. The blast valve can also have a rating of 30 psi but is not required. Additionally, the air filtration system 290 may work in concert with an airtight or sealed entrance barrier or interior entrance barrier to control the climate of the housing unit 200. The airtight seal may also help maintain air that is free from exterior toxins.

The air filtration system 290 may be battery-powered, solar-powered, generator-powered, fuel-powered, grid-powered, powered by kinetic energy using a hand crank, or powered through other power sources. The air filtration system 290 may also use a combination of different power sources and have various back-up power systems in place. The air filtration system 290 preferably moves at least 177 cubic feet of air per minute of unfiltered air or at least 88 cubic feet per minute of filtered air.

The intake pipe 219, slanted air pipe 223, vertical intake pipe 212, exhaust pipe 237, or other additional pipe may be connected to one or more condensate check valves 240. The condensate check valves 240 may help prevent condensation from getting into housing unit 200. The condensate check valves 240 may be connected to one or more safety valves 241, which may have a device that prevents large debris from accessing the safety valve 241 such as a perforated screen 242. The intake pipe 210, slanted air pipe 211, vertical intake pipe 212, exhaust pipe 220, or other additional pipe may be connected to one or more condensate check valves 240 directly or through another pipe. The embodiment in FIG. 2 shows that the intake pipe 219, vertical intake pipe 212, and exhaust pipe 237 attach to condensate check valves 240 through pipe nipples 243. These pipe nipples 243 are shown to have a 2" diameter, but that diameter is not required. The pipe nipples 243 may also connect condensate check valves 240 to the safety valves 241. The pipes may be made of plastic, polyvinyl chloride (PVC), metal, or any other material capable of channeling air into a system while minimizing the air's interaction to the environment surrounding the pipe. Some embodiments use Schedule 40 pipe, but Schedule 40 is not required. Pipes and valves may also be attached to each other through a variety of ways, including but not limited to, glue, welding, threaded coupling, and fastening.

Additionally, the housing unit 200 may possess the ability to receive and use electricity through a generator, solar panels, mechanical energy, the power grid, or other power sources. The housing unit interior 250 or storage 215 may also have lights and power outlets for electronic equipment. The lights may be automatic or switched on and off manually through something such as a light switch. The power source available to the housing unit 200 may be separate from the power source that the air filtration system 290 utilizes. The housing unit 100 may also possess the ability to receive water for use in areas such as a flushable toilet, decontamination shower, and sinks as well as the ability to transport sewage away from the housing unit 200. The housing unit 200 may also contain a dry flushing toilet. The housing unit 200 would also preferably be equipped with radio antenna and antenna cables.

Figure 3:
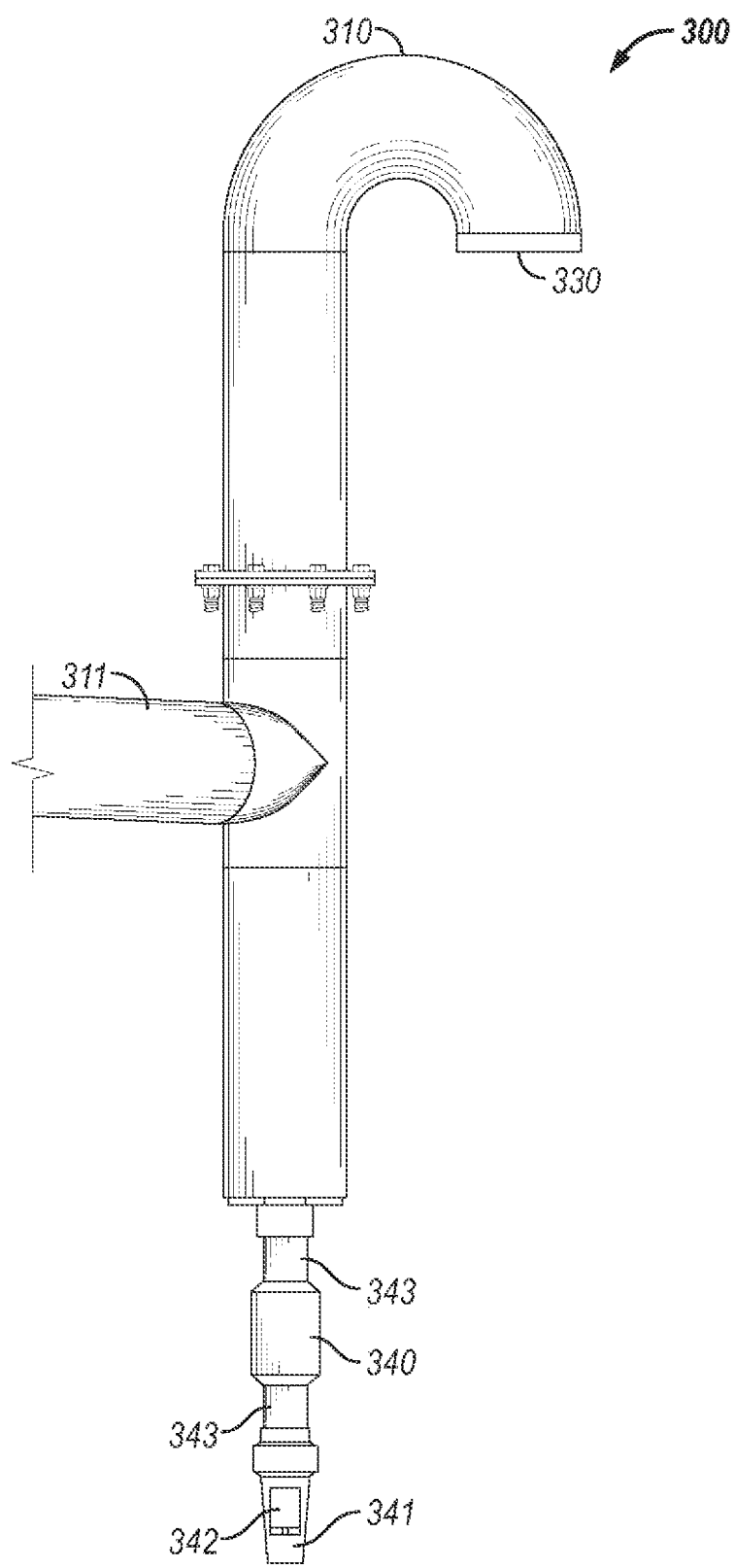
FIG. 3 is a detailed side view of one example of an air intake pipe in an underground shelter with an air intake system.

FIG. 3 is a diagram of one embodiment of an air intake system 300 that is preferably attached to the air filtration system of an underground shelter and ideally brings surface air into the shelter. An air intake pipe 310 may draw surface air into one or more slanted air pipes 311 that ideally has a non-zero grade. An intake pipe 310, slanted air pipe 311, or other additional pipe may be connected to one or more condensate check valves 340. The condensate check valves 340 may help prevent condensation from getting into the shelter or an air filter. The condensate check valves 340 may be connected to one or more safety valves 341, which may have a device that prevents large debris from accessing the safety valve 341 such as a perforated screen 342. An intake pipe 310, slanted air pipe 311, or other additional pipe may be connected to one or more condensate check valves 340 directly or through other pipe. The embodiment in FIG. 3 shows that the intake pipe 310 attaches to condensate check valve 340 through pipe nipples 343. These pipe nipples 343 are shown to have a 2" diameter, but that diameter is not required. The pipe nipples 343 may also connect condensate check valves 340 to the safety valves 341. The pipes may be made of plastic, polyvinyl chloride (PVC), metal, or any other material capable of channeling air into a system while minimizing the air's interaction to the environment surrounding the pipe. Some embodiments use Schedule 40 pipe, but Schedule 40 is not required. Pipes and valves may also be attached to each other through a variety of ways, including but not limited to, glue, welding, threaded coupling, and fastening.

A surface intake pipe 310 may be configured to prevent tampering and preferably contain debris shield 330 in the form of a screen or hood that prevent debris and other unwanted items from entering the intake pipe 310. The debris shield 330 in this embodiment are welded to the surface opening of an air intake pipe 310; however, the debris shield 330 may be attached through a variety of ways, including but not limited to, glue, welding, threaded coupling, and fastening. The debris shield 330 may also be placed at other locations within an intake pipe 310 at places other than the surface openings. An intake pipe 310 may be curved in a way that prevents tampering at the surface such that the pipe opening faces the surface instead of towards the sky. In this embodiment, the intake pipe 310 is curved to form a "candy-cane" shape; in other words, the intake pipe 310 is curved 180 degrees about the z-axis such that the surface end of the intake pipe 310 points down.

FIG. 4A shows a perspective view of the exterior of an underground shelter with a stairwell entry and an air filtration system. In at least one example, the shelter is comprised of at least one housing unit 400, which may be buried under at least three feet of earth cover, in the shape of a prism that is comprised of five panels 402, four of which connect to a base 401. This particular embodiment shows several buttress supports 410 that are parallel to the width of the base (not show) and extend the entire width of the housing unit 400. The buttress supports 410 may also be attached to one or more additional panels 402 of the housing unit 400. Several beam supports 411 may run perpendicular to the buttress supports 410 and may also stretch both the length and the width of panels 402 that form the housing unit 400. The panels 402 or supports 410 and 411 may be made from a variety of metals or plastics and would ideally be rigid, waterproof, bulletproof, or fireproof. The panels 402 may also be made of a material similar to concrete or stone. In other examples, the buttress supports 410 and beam supports 411 may be the same type of supports. The supports 410 and 411 themselves may be any type of structure that provides support including, but not limited to, beams, wires, slabs, girders, poles, struts, columns, buttresses, bars, plates, blocks, posts, trusses, or any combination thereof. This particular embodiment shows the buttress supports 410 as I-beams and the support beams 411 as U-beams that are welded to one another and panels 402. In some embodiments, the panels 402 or supports 410 and 411 may be connected to one another via welding, glue, fastened, tied together, or some combination thereof. If the housing unit 400 is located above ground, the exterior of the housing unit 400 should be built such that the shelter can withstand a variety of disasters, including, but not limited to, extreme or severe weather, a chemical release, bomb attack, seismic event, or explosions. The housing unit 400 may be encased in a concrete shell that provides extra support and protection or the housing unit 400 may sit on a concrete slab. The housing unit 100 may be any shape, including, but not limited to, domed, spherical, cylindrical, truncated cylindrical, or prismed and may be corrugated, galvanized, or sand-blasted to provide durability and protection. The entire housing unit 400 and attached framework, which may be attached to the interior or exterior of the panels 402, made up of supports 410 and 411 may have components attached to provide options for portability and transportation if necessary and may be installed in or underneath existing homes.

The framework may be composed of one or more supports 410 and 411 and may only have beam supports 411. The supports 410 and 411 may be made of multiple materials. The housing unit 400 may be built elsewhere and transported and installed at the desired location.

In at least one embodiment, beam supports 411 contain notches 423 in places that intersect other weld lines, such as where two panels 402 meet, where a beam support 411 or buttress support 410 meets a panel 402. FIG. 4A demonstrates an embodiment with notches 423 at or near the ends of beam supports 411 where a buttress support 410 is welded to panel 402. The notches 423 help prevent a welder from welding over a previous weld line, thereby reducing stress and perturbations in the materials located in the weld area. As such, notches 423 are typically dimensioned such that the heat zone of one weld line will not overlap with the heat zone of the weld line for the beam supports 411. In this embodiment, a welder would weld the buttress supports 410 to a panel 402 or base 401, panel 402 to another panel 402, or panel 402 to base 401 in a continuous line. The welder could then weld beam supports 411 to the panel 402, base 401, or buttress support 410 by welding the beam supports 411 in a continuous line, stopping at a notch 423. Because the notch 423 is ideally dimensioned to minimize the number of times the material in the area undergoes chemical and physical changes, the materials that make up panels 402, base 401, and supports 410 and 411 may encounter less strain. Thus, due to the reduction of stress in the materials that form the housing unit 400, the housing unit 400 is less likely to have leaks or flooding due to structural weaknesses. The addition of supports 410 and 411 further helps maintain structural integrity by redistributing the weight of the earth cover that exerts pressure on the housing unit 400.

The housing unit 400 may be accessible through more than one entry port 437 (also sometimes referred to as an entry) that may be made of durable material that may also be rigid, waterproof, bulletproof, or fireproof. The entry port 437 may also include a stairwell 460 with steps 480, ladders, or other devices that provide ingress or egress in the presence of an elevation differential. Elements of the interior of the housing unit 400, such as stairs 481, may be galvanized to prevent rust or made from materials such as wood, plastic, cloth, etc. The exterior of stairwell 460 may be made of the same materials that make up the rest of the housing unit 400. The stairwell may also have panels and have a primary entrance that may be covered by a hatch that can be removed.

The housing unit 400 may be equipped with an air filtration system 490 that brings fresh surface air into the housing unit 400. If underground, the air filtration system 490 may contain at least one surface intake pipe 413, which draws surface air into one or more slanted air pipes 480 that ideally has a non-zero grade. The slanted air pipe 480, which is preferably slanted at a two-degree angle or higher, reduces condensation and allows for dryer air to move into the housing unit 400. The slanted air pipe 480 may also attach to one or more pipes such as a vertical intake pipe 412 as shown in this embodiment. The slanted air pipe 480, vertical intake pipe 412, or other pipe may connect to the housing unit 400 and move air into the housing unit 400. Air may leave the housing unit 400 through an exhaust port 421 one or more exhaust pipes 420 that leads the air back to the surface. The intake or exhaust surface pipes 410 and 420 may be configured to prevent tampering and preferably contain debris shields 430 in the form of screens or hoods that prevent debris and other unwanted items from entering the filtration system 290. The debris shields 430 in this embodiment are welded to the surface openings of air intake pipe 410; however, the debris shields 441 may be attached through a variety of ways, including but not limited to, glue, welding, threaded coupling, and fastening. The debris shields 441 may also be placed at other locations within the intake pipe 413 and exhaust pipe 420 at places other than the surface openings. The intake pipes 413 and exhaust pipes 420 may be curved in a way that prevents tampering at the surface such that the pipe opening faces the surface instead of towards the sky. In this embodiment, the intake pipe 413 and exhaust pipe 420 are curved to form a "candy-cane" shape; in other words, the intake pipe 413 and exhaust pipe 420 are curved 180 degrees about the z-axis such that the surface ends of the intake pipe 413 and exhaust pipe 420 point down.

The air filtration system 490 may be battery-powered, solar-powered, generator-powered, fuel-powered, grid-powered, powered by kinetic energy using a hand crank, or powered through other power sources. The air filtration system 490 may also use a combination of different power sources and have various back-up power systems in place.

The intake pipe 413, slanted air pipe 480, vertical intake pipe 412, exhaust pipe 420, or other additional pipe may be connected to one or more condensate check valves 440. The condensate check valves 440 may help prevent condensation from getting into housing unit 400. The condensate check valves 440 may be connected to one or more safety valves 441, which may have a device that prevents large debris from accessing the safety valve 441 such as a perforated screen 442. The intake pipe 410, slanted air pipe 411, vertical intake pipe 412, exhaust pipe 420, or other additional pipe may be connected to one or more condensate check valves 440 directly or through another pipe. The embodiment in FIG. 4A shows that the intake pipe 413 and exhaust pipe 420 attach to condensate check valves 440 through pipe nipples 443. These pipe nipples 443 are shown to have a 2" diameter, but that diameter is not required. The pipe nipples 443 may also connect condensate check valves 440 to the safety valves 441. The pipes may be made of plastic, polyvinyl chloride (PVC), metal, or any other material capable of channeling air into a system while minimizing the air's interaction to the environment surrounding the pipe. Some embodiments use Schedule 40 pipe, but Schedule 40 is not required. Pipes and valves may also be attached to each other through a variety of sways, including but not limited to, glue, welding, threaded coupling, and fastening.

Additionally, the housing unit 400 may possess the ability to receive and use electricity through a generator, solar panels, mechanical energy, the power grid, or other power sources. The power source available to the housing unit 400 may be separate from the power source that the air filtration system 490 utilizes. The housing unit 400 may also possess the ability to receive water for use in areas such as a flushable toilet, decontamination shower, and sinks as well as the ability to transport sewage away from the housing unit 400. The housing unit 400 would also preferably be equipped with radio antenna and antenna cables.

Figure 4B:
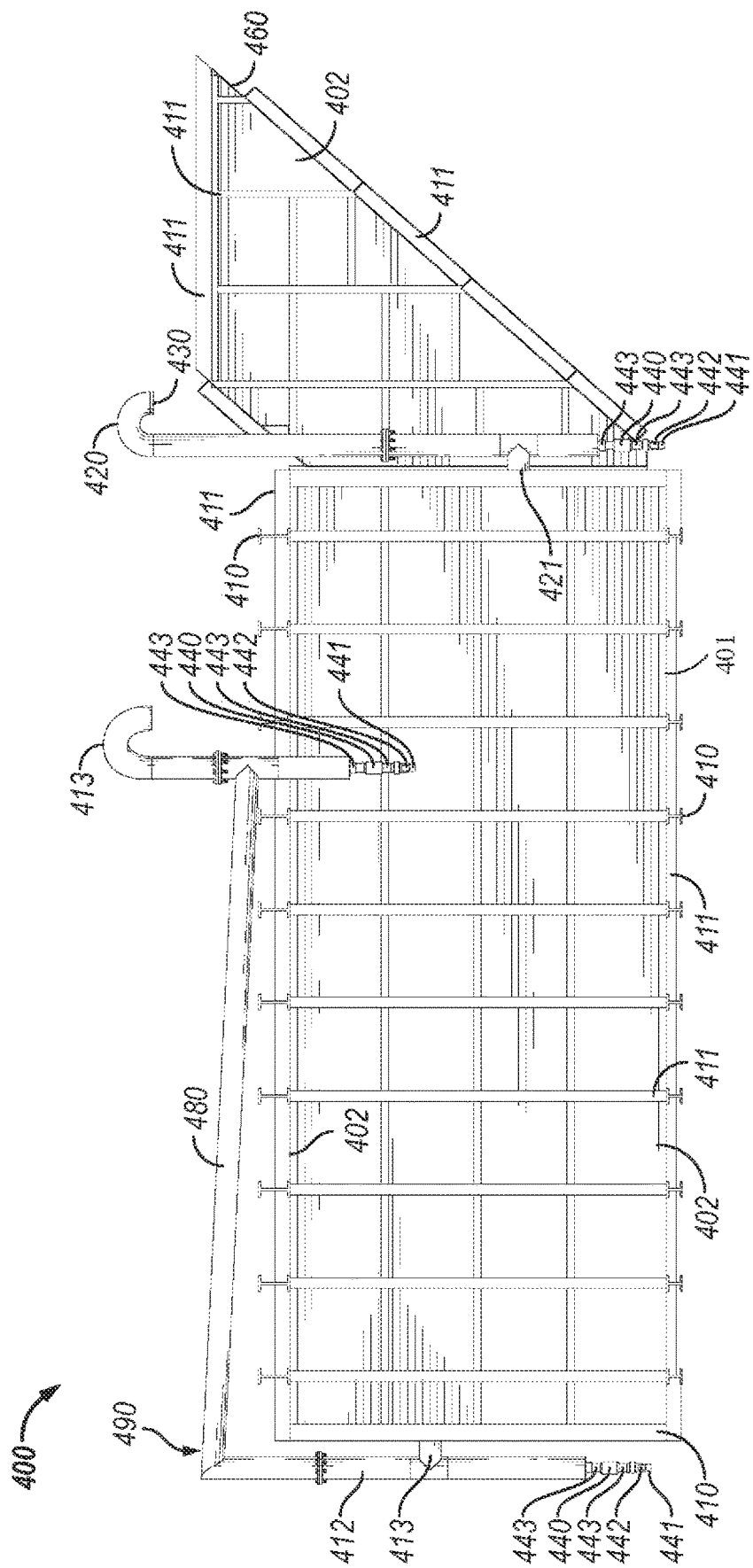
FIG. 4B is a side view of one example of an underground shelter with an air intake system.

FIG. 4B shows a side view of the exterior of an underground shelter 400 with a stairwell entry and an air filtration system. In at least one embodiment, the shelter is comprised of at least one housing unit 100, which is preferably buried under at least three feet of earth cover, in the shape of a prism that is comprised of five panels 402, four of which connect to a base 401. This particular embodiment shows several buttress supports 410 that are parallel to the width of the base 401 and extend the entire width of the housing unit 400. The buttress supports 410 may also be attached to one or more additional panels 402 of the housing unit 400. Several beam supports 411 may run perpendicular to the buttress supports 410 and may also stretch both the length and the width of panels 402 that form the housing unit 400. The panels 402 or supports 410 and 411 may be made from a variety of metals or plastics and would ideally be rigid, waterproof, bulletproof, or fireproof. The panels 402 may also be made of a material similar to concrete or stone. In other embodiments, the buttress supports 410 and beam supports 411 may be the same type of supports. The supports 410 and 411 themselves may be any type of structure that provides support including, but not limited to, beams, wires, slabs, girders, poles, struts, columns, buttresses, bars, plates, blocks, posts, trusses, or any combination thereof. This particular embodiment shows the buttress supports 410 as I-beams that are welded to beam supports 411 and panels 402. In some embodiments, the panels 402 or supports 410 and 411 may be connected to one another via welding, glue, fastened, tied together, or some combination thereof. If the housing unit 400 is located above ground, the exterior of the housing unit 400 should be built such that the shelter can withstand a variety of disasters, including, but not limited to, extreme or severe weather, a chemical release, bomb attack, seismic event, or explosions. The housing unit 400 may be encased in a concrete shell that provides extra support and protection or the housing unit 400 may sit on a concrete slab. The housing unit 400 may be any shape, including, but not limited to, domed, spherical, cylindrical, truncated cylindrical, or prismed and may be corrugated, galvanized, or sand-blasted to provide durability and protection. The entire housing unit 400 and attached framework, which may be attached to the interior or exterior of the panels 402, made up of supports 410 and 411 may have components attached to provide options for portability and transportation if necessary and may be installed in or underneath existing homes. The framework may be composed of one or more supports 410 and 411 and may only have beam supports 411. The supports 410 and 411 may be made of multiple materials. The housing unit 400 may be built elsewhere and transported and installed at the desired location.

The housing unit 400 may be accessible through more than one stairwell 460 with steps, ladders, or other devices that provide ingress or egress in the presence of an elevation differential. The exterior of stairwell 460 may be made of the same materials that make up the rest of the housing unit 400. The stairwell 460 may be made of durable material that may also be rigid, waterproof, bulletproof, or fireproof.

The housing unit 400 may be equipped with an air filtration system 490 that brings fresh surface air into the housing unit 400. If underground, the air filtration system 490 may contain at least one surface intake pipe 413, which draws surface air into one or more slanted air pipes 480 that ideally has a non-zero grade. The slanted air pipe 480, which is preferably slanted at a two-degree angle or higher, reduces condensation and allows for dryer air to move into the housing unit 400. The slanted air pipe 480 may also attach to one or more pipes such as a vertical intake pipe 412 as shown in this embodiment. The slanted air pipe 480, vertical intake pipe 412, or other pipe may connect to the housing unit 400 and move air into the housing unit 400. Air may leave the housing unit 400 through one or more exhaust pipes 420 that leads the air back to the surface. The intake or exhaust surface pipes 413 and 420 may be configured to prevent tampering and preferably contain debris shields 430 in the form of screens or hoods that prevent debris and other unwanted items from entering the filtration system 490. The debris shields 430 in this embodiment are welded to the surface openings of air exhaust pipe 420; however, the debris shields 430 may be attached through a variety of ways, including but not limited to, glue, welding, threaded coupling, and fastening. The debris shields 430 may also be placed at other locations within the intake pipe 413 and exhaust pipe 420 at places other than the surface openings. The intake pipes 413 and exhaust pipes 420 may be curved in a way that prevents tampering at the surface such that the pipe opening faces the surface instead of towards the sky. In this embodiment, the intake pipe 413 and exhaust pipe 420 are curved to form a "candy-cane" shape; in other words, the intake pipe 413 and exhaust pipe 420 are curved 180 degrees about the z-axis such that the surface ends of the intake pipe 413 and exhaust pipe 420 point down.

The air filtration system 490 may be battery-powered, solar-powered, generator-powered, fuel-powered, grid-powered, powered by kinetic energy using a hand crank, or powered through other power sources. The air filtration system 490 may also use a combination of different power sources and have various back-up power systems in place.

The intake pipe 413, slanted air pipe 480, vertical intake pipe 412, exhaust pipe 420, or other additional pipe may be connected to one or more condensate check valves 440. The condensate check valves 440 may help prevent condensation from getting into housing unit 400. The condensate check valves 440 may be connected to one or more safety valves 441, which may have a device that prevents large debris from accessing the safety valve 441 such as a perforated screen 442. The intake pipe 413, slanted air pipe 480, vertical intake pipe 412, exhaust pipe 420, or other additional pipe may be connected to one or more condensate check valves 440 directly or through other pipe. The embodiment in FIG. 413 shows that the intake pipe 413, vertical intake pipe 412, and exhaust pipe 420 attach to condensate check valves 440 through pipe nipples 443. These pipe nipples 443 are shown to have a 2" diameter, but that diameter is not required. The pipe nipples 443 may also connect condensate check valves 440 to the safety valves 441. The pipes may be made of plastic, polyvinyl chloride (PVC), metal, or any other material capable of channeling air into a system while minimizing the air's interaction to the environment surrounding the pipe. Some embodiments use Schedule 40 pipe, but Schedule 40 is not required. Pipes and valves may also be attached to each other through a variety of ways, including but not limited to, glue, welding, threaded coupling, and fastening.

Additionally, the housing unit 400 may possess the ability to receive and use electricity through a generator, solar panels, mechanical energy, the power grid, or other power sources. The power source available to the housing unit 400 may be separate from the power source that the air filtration system 490 utilizes. The housing unit 400 may also possess the ability to receive water for use in areas such as a flushable toilet, decontamination shower, and sinks as well as the ability to transport sewage away from the housing unit 400. The housing unit 400 would also preferably be equipped with radio antenna and antenna cables.

Figure 4C:
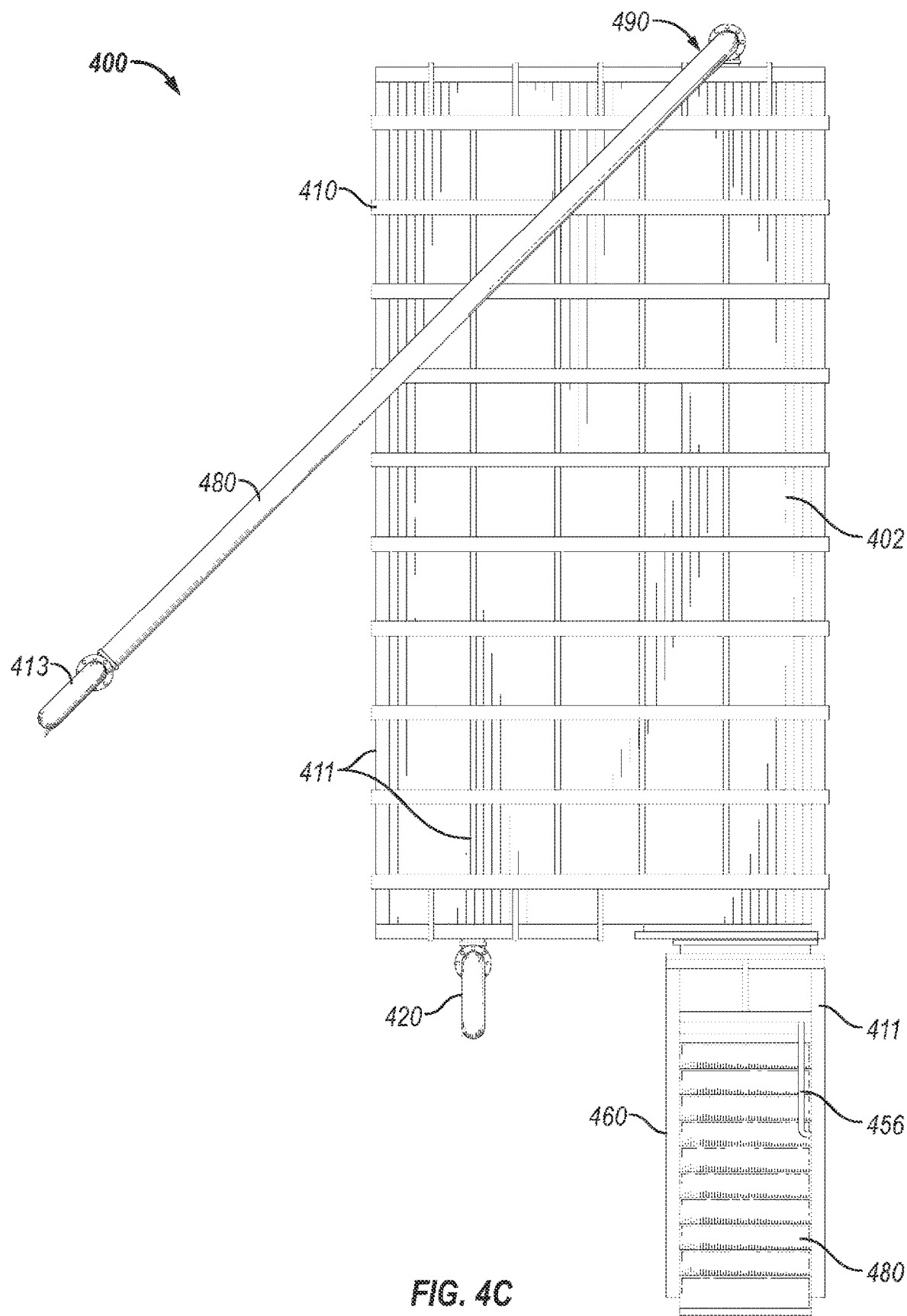
FIG. 4C is a top view of one example of an underground shelter with an air intake system.

FIG. 4C is a top view of the exterior of an underground shelter with a stairwell entry and an air filtration system. In at least one embodiment, the shelter is comprised of a housing unit 100, which is preferably buried under at least three feet of earth cover, in the shape of a prism that is comprised of five panels 402, four of which connect to a base (not shown). This particular embodiment shows several buttress supports 410 that are parallel to the width of the base and extend the entire width of the housing unit 400. The buttress supports 410 may also be attached to one or more additional panels 402 of the housing unit 400. Several beam supports 411 may run perpendicular to the buttress supports 410 and may also stretch both the length and the width of panels 402 that form the housing unit 400. The panels 402 or supports 410 and 411 may be made from a variety of metals or plastics and would ideally be rigid, waterproof, bulletproof, or fireproof. The panels 402 may also be made of a material similar to concrete or stone. In other embodiments, the buttress supports 410 and beam supports 411 may be the same type of supports. The supports 410 and 411 themselves may be any type of structure that provides support including, but not limited to, beams, wires, slabs, girders, poles, struts, columns, buttresses, bars, plates, blocks, posts, trusses, or any combination thereof. This particular embodiment shows the buttress supports 410 as welded to beam supports 411 and panels 402. In some examples, the panels 402 or supports 410 and 411 may be connected to one another via welding, glue, fastened, tied together, or some combination thereof. If the housing unit 400 is located above ground, the exterior of the housing unit 400 should be built such that the shelter can withstand a variety of disasters, including, but not limited to, extreme or severe weather, a chemical release, bomb attack, seismic event, or explosions. The housing unit 400 may be encased in a concrete shell that provides extra support and protection or the housing unit 400 may sit on a concrete slab. The housing unit 400 may be any shape, including, but not limited to, domed, spherical, cylindrical, truncated cylindrical, or prismed and may be corrugated, galvanized, or sand-blasted to provide durability and protection. The entire housing unit 400 and attached framework, which may be attached to the interior or exterior of the panels 402, made up of supports 410 and 411 may have components attached to provide options for portability and transportation if necessary and may be installed in or underneath existing homes. The framework may be composed of one or more supports 410 and 411 and may only have beam supports 411. The supports 410 and 411 may be made of multiple materials. The housing unit 400 may be built elsewhere and transported and installed at the desired location.

The housing unit 400 may be accessible through more than one stairwell 460 with steps 480, ladders, or other devices that provide ingress or egress in the presence of an elevation differential. The stairwell 460 may also have more than one handrail 456 that may be made from a rigid material such as metal, plastic, or wood, or may be made from a flexible material such as cloth or rope. The exterior of stairwell 460 may be made of the same materials that make up the rest of the housing unit 400 and may be uncovered, partially covered, or fully covered. The stairwell 460 may be made of durable material that may also be rigid, waterproof, bulletproof, or fireproof.

The housing unit 400 may be equipped with an air filtration system 490 that brings fresh surface air into the housing unit 400. If underground, the air filtration system 490 may contain at least one surface intake pipe 413, which draws surface air into one or more slanted air pipes 480 that ideally has a non-zero grade. The slanted air pipe 480, which is preferably slanted at a two-degree angle or higher, reduces condensation and allows for dryer air to move into the housing unit 400. The slanted air pipe 480 may also attach to one or more pipes. The slanted air pipe 480 or other pipes may connect to the housing unit 400 and move air into the housing unit 400. Air may leave the housing unit 400 through one or more exhaust pipes 420 that leads the air back to the surface. The intake pipes 410 and exhaust pipes 420 may be curved in a way that prevents tampering at the surface such that the pipe opening faces the surface instead of towards the sky. In this embodiment, the intake pipe 410 and exhaust pipe 420 are curved to form a "candy-cane" shape; in other words, the intake pipe 410 and exhaust pipe 420 are curved 180 degrees about the z-axis such that the surface ends of the intake pipe 410 and exhaust pipe 420 point down.

The air filtration system 490 may be battery-powered, solar-powered, generator-powered, fuel-powered, grid-powered, powered by kinetic energy using a hand crank, or powered through other power sources. The air filtration system 490 may also use a combination of different power sources and have various back-up power systems in place.

The pipes may be made of plastic, polyvinyl chloride (PVC), metal, or any other material capable of channeling air into a system while minimizing the air's interaction to the environment surrounding the pipe. Some embodiments use Schedule 40 pipe, but Schedule 40 is not required. Pipes and valves may also be attached to each other through a variety of ways, including but not limited to, glue, welding, threaded coupling, and fastening.

Additionally, the housing unit 400 may possess the ability to receive and use electricity through a generator, solar panels, mechanical energy, the power grid, or other power sources. The power source available to the housing unit 400 may be separate from the power source that the air filtration system 490 utilizes. The housing unit 400 may also possess the ability to receive water for use in areas such as a flushable toilet, decontamination shower, and sinks as well as the ability to transport sewage away from the housing unit 400. The housing unit 400 would also preferably be equipped with radio antenna and antenna cables.

Figure 5:
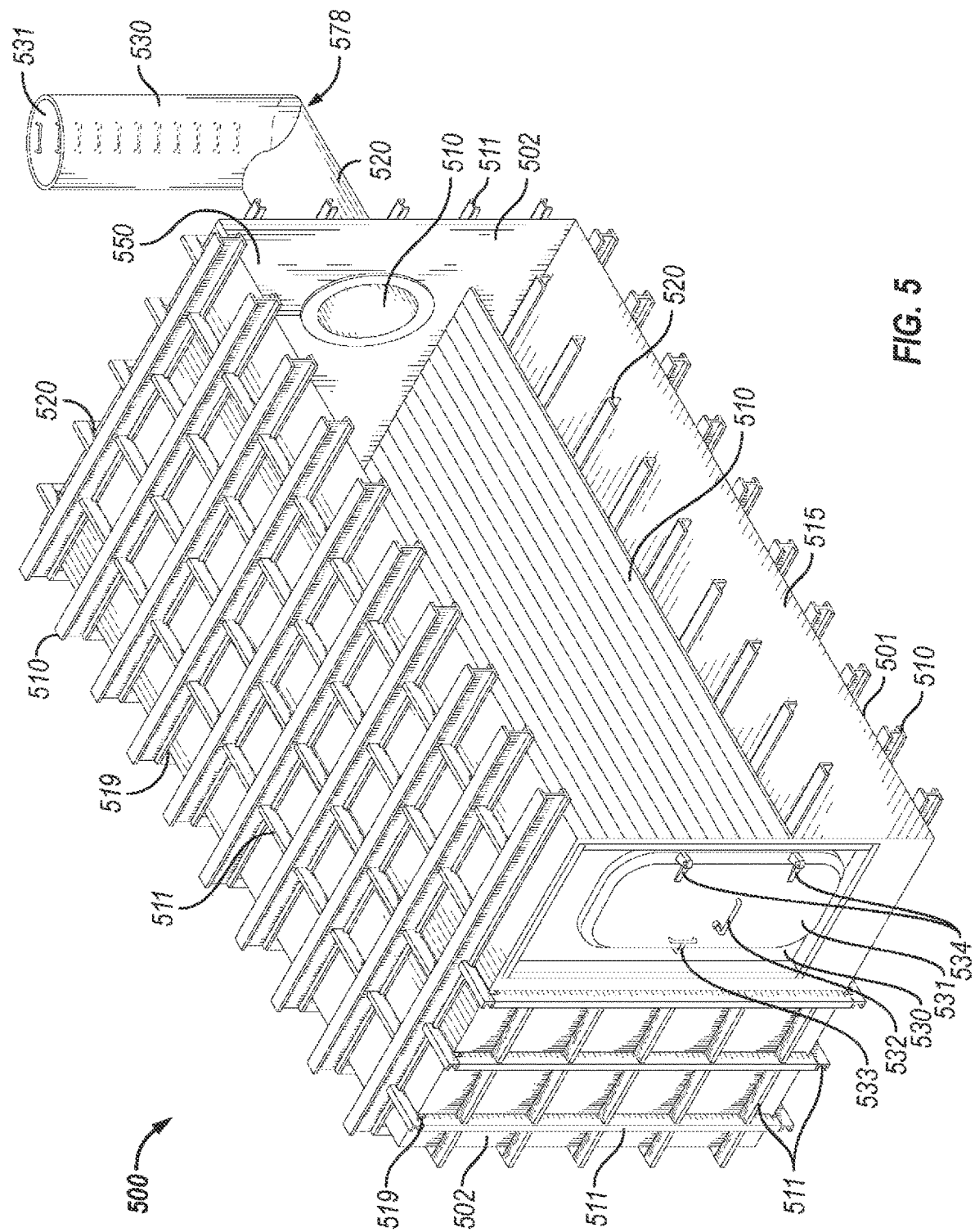
FIG. 5 is a perspective cross-section view of one example of an underground shelter with an escape tunnel.

FIG. 5 is a perspective cross-section view of one example of an underground shelter with an escape tunnel. In at least one example, the shelter is comprised of at least one housing unit 500, which is preferably buried under at least three feet of earth cover, in the shape of a prism that is comprised of five panels 502, four of which connect to a base 501. This particular example shows several buttress supports 510 that are parallel to the width of the base 501 and extend the entire width of the housing unit 500. The buttress supports 510 may also be attached to one or more additional panels 502 of the housing unit 500. Several beam supports 511 may run perpendicular to the buttress supports 510 and may also stretch both the length and the width of panels 502 that form the housing unit 500. The panels 502, supports 510 and 511, and base 501 may be made from a variety of metals or plastics and would ideally be rigid, waterproof, bulletproof, or fireproof. The panels 502 or base 501 may also be made of a material similar to concrete or stone. In other embodiments, the buttress supports 510 and beam supports 511 may be the same type of supports. The supports 510 and 511 themselves may be any type of structure that provides support including, but not limited to, beams, wires, slabs, girders, poles, struts, columns, buttresses, bars, plates, blocks, posts, trusses, or any combination thereof. This particular embodiment shows the buttress supports 510 as I-beams and the support beams 511 as U-beams that are welded to one another and welded to panels 502 and base 501. In some embodiments, the panels 502, supports 510 and 511, and base 501 may be connected to one another via welding, glue, fastened, tied together, or some combination thereof. If the housing unit 500 is located above ground, the exterior of the housing unit 500 should be built such that the shelter can withstand a variety of disasters, including, but not limited to, extreme or severe weather, a chemical release, bomb attack, seismic event, or explosions. The housing unit 500 may be encased in a concrete shell that provides extra support and protection or the housing unit 500 may sit on a concrete slab. The housing unit 500 may be any shape, including, but not limited to, domed, spherical, cylindrical, truncated cylindrical, or prismed and may be corrugated, galvanized, or sand-blasted to provide durability and protection. The entire housing unit 500 and attached framework, which may be attached to the interior or exterior of the panels 502, made up of supports 510 and 511 may have components attached to provide options for portability and transportation if necessary and may be installed in or underneath existing homes. The framework may be composed of one or more supports 510 and 511 and may only have beam supports 511. The supports 510 and 511 may be made of multiple materials. The housing unit 500 may be built elsewhere and transported and installed at the desired location.

In at least one example, beam supports 511 contain notches 520 in places that intersect other weld lines, such as where two panels 502 meet, where a beam support 511 or buttress support 510 meets a panel 502, or where a panel 502 and base 501 meet. FIG. 5 demonstrates an embodiment with notches 519 at or near the ends of beam supports 511 where a buttress support 519 is welded to panel 502. The notches 519 help prevent a welder from welding over a previous weld line, thereby reducing stress and perturbations in the materials located in the weld area. As such, notches 519 are typically dimensioned such that the heat zone of one weld line will not overlap with the heat zone of the weld line for the beam supports 511. In this example, a welder would weld the buttress supports 510 to a panel 502 or base 501, panel 502 to another panel 502, or panel 502 to base 501 in a continuous line. The welder could then weld beam supports 511 to the panel 502, base 501, or buttress support 510 by welding the beam supports 511 in a continuous line, stopping at a notch 519. Because the notch 519 is ideally dimensioned to minimize the number of times the material in the area undergoes chemical and physical changes, the materials that make up panels 502, base 501, and supports 510 and 511 may encounter less strain. Thus, due to the reduction of stress in the materials that form the housing unit 500, the housing unit 500 is less likely to have leaks or flooding due to structural weaknesses. The addition of supports 510 and 511 further helps maintain structural integrity by redistributing the weight of the earth cover that exerts pressure on the housing unit 500.

The housing unit 500 may be accessible through more than one entry 530 that may be made of durable material that may also be rigid, waterproof, bulletproof, or fireproof. The embodiment shown in FIG. 5 shows the entry 530 having an entrance barrier 531 as a door, but other embodiments may have a door, hatch, gate, flap, or other entrance barrier 531 and would preferably create an airtight, gas-tight, or watertight seal. The entry 530 may also be a combination of hatches, doors, or other entrance barriers 531 to provide protection from other people, debris, or disaster elements. The entrance barriers 531 may include a locking mechanism 532 or a tamper-proof mechanism and may be dimensioned large enough to drive a vehicle or plane into the housing unit. The entrance barrier 531 may have hinges 534 and hinges 534 may allow the entrance barrier 531 to open in at least one direction. The entrance barrier 531 may also allow entry by being removed from the entry 530. The entrance barrier 531 or entry 530 may have a handle 533 attached to help with entry into the housing unit 500. The handle 533 may be made from a rigid material such as metal, plastic, or wood, or may be made from a flexible material such as cloth or rope. Furthermore, the handle 533 may also be part of the locking mechanism 532. The entrance barrier 531 may also have knobs or levels that aid in entry. The entry 530 may connect the housing unit 500 to the interior or exterior of a surface-level house and may be concealed by its surroundings. Furthermore, the entry 530 may contain a 90-degree turn into the housing unit 500 to attenuate any gamma radiation that may inadvertently enter the shelter. The entry 530 or other area within the housing unit interior 550 may also have a decontamination shower for removing contaminants that may affect other individuals in the shelter.

The housing unit 500, which may contain furniture, may also contain one or more interior rooms 550, including a mud room, kitchen, bathroom, or bedroom, and may have a floor 513 that is separate from the base 501. The floor 513 may be at some height above the base 501 for additional storage 515, which is accessible through a removeable floor or hinged component. The floor 513 may be supported by joists 517 that the floor 513 sits on and are connected to the interior side of the panels 502; however, the floor 513 may be supported through several ways, including but not limited to beams, purlins, wires, slabs, girders, poles, struts, columns, buttresses, bars, plates, blocks, posts, trusses, or any combination thereof. This particular embodiment shows a floor 513 made of removeable composite slats that rest on joists 517 that are L-beams. The floor 513 or base 501 may be made from materials sturdy enough to support supplies, furniture, people, or pets without allowing elements of the environment external to the housing unit 501 or the materials housed in storage 515 into the housing unit interior 550. Furthermore, the floor 513 or base 501 may be made from materials that are rigid, waterproof, bulletproof, or fireproof. Elements of the interior 550 of the housing unit 500 may be galvanized to prevent rust or made from materials such as wood, plastic, cloth, etc. The housing unit 500 may also be climate controlled by a fan, air filtration system, air conditioning system, heating system, or other systems that may affect the ambient air of the housing unit interior 550. The housing unit 500 may be configured to be soundproof, echo-proof, waterproof, or protected from electromagnetic pulses or seismic activities. The housing unit 500 may also be equipped with a pumping system that helps remove fluid from the housing unit interior 550.

The escape tunnel 578 allows people to egress from the shelter, particularly in the event where the persons are unable or unwilling to leave through another exit. On one end, the escape tunnel 578 may have an entrance aperture 581. On the other end, the exit aperture 583 is attached to the end of the escape tunnel 578 where the escape tunnel 578 meets or is near the surface. In between the exit aperture 583 and the entrance aperture, there may be one or more lengths of tunnel 585, 587, connecting the entrance and exit. In FIG. 5, the lengths of tunnel 585, 587 are arranged to make an "L" shape; however, any shape or angle could be constructed.

Figure 6:
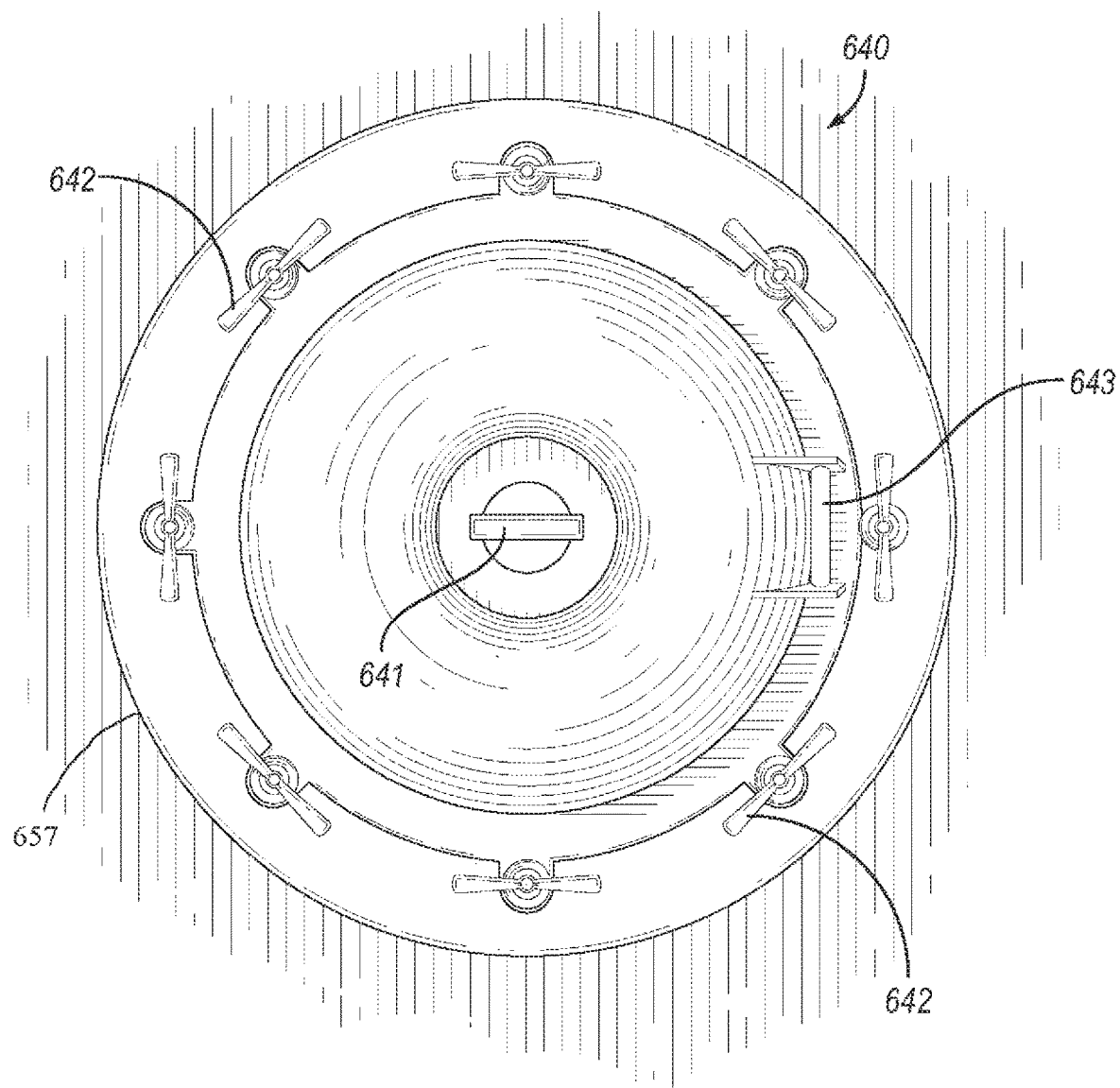
FIG. 6 is an interior schematic diagram of one example of an escape tunnel hatch of an underground shelter.

FIG. 6 is an interior schematic diagram of one example of an escape tunnel hatch 641 of an underground shelter. The escape tunnel 640 may allow users to egress from the housing unit when users are unable to exit through an entry. Users access the escape tunnel 640 through an escape porthole 657, which may or may not be concealed by an interior entrance barrier such as a door, hatch, or curtain. The escape tunnel 640 may include escape rungs and may include ladder rungs, bars, handholds, footholds, or other devices configured to help users leave the tunnel. The escape handles 643 may be made from a rigid material such as metal, plastic, or wood, or may be made from a flexible material such as cloth or rope. At least one embodiment of the escape tunnel 640 includes a horizontal tunnel that is connects the escape porthole 657 to the vertical tunnel, which contains escape handles. The escape tunnel 640 may have an exit barrier such as a hatch or a door and said hatch or door may be placed such that it is concealed within its environment. If the housing unit is underground, one embodiment allows the escape tunnel 640 to be concealed by burying the exit barrier in a coarse material such as sand, then using a funnel component of the exit barrier to empty the coarse material into the tunnel. Once enough coarse material has funneled into the tunnel from the surface, users may open the exit barrier and egress through to the surface. The escape tunnel 640 may be made from a variety of metals or plastics and would ideally be rigid, waterproof, bulletproof, fireproof, or able to support a person or pet during egress. In one or more examples, the escape tunnel hatch 641 may have a handle allowing for the escape tunnel hatch 641 to be pulled away from the escape porthole 657 after one or more escape fasteners 642 have been disengaged. The escape fasteners 642 may be latches, knobs, bolts, nuts, screws, etc.

Additionally, the housing unit may possess the ability to receive and use electricity through a generator, solar panels, mechanical energy, the power grid, or other power sources. The housing unit interior, storage, or escape tunnel 640 may also have lights and power outlets for electronic equipment. The lights may be automatic or switched on and off manually through something such as a light switch. The housing unit may also possess the ability to receive water for use in areas such as a flushable toilet, decontamination shower, and sinks as well as the ability to transport sewage away from the housing unit. The housing unit may also contain a dry flushing toilet. The housing unit would also preferably be equipped with radio antenna and antenna cables.

Figure 7:
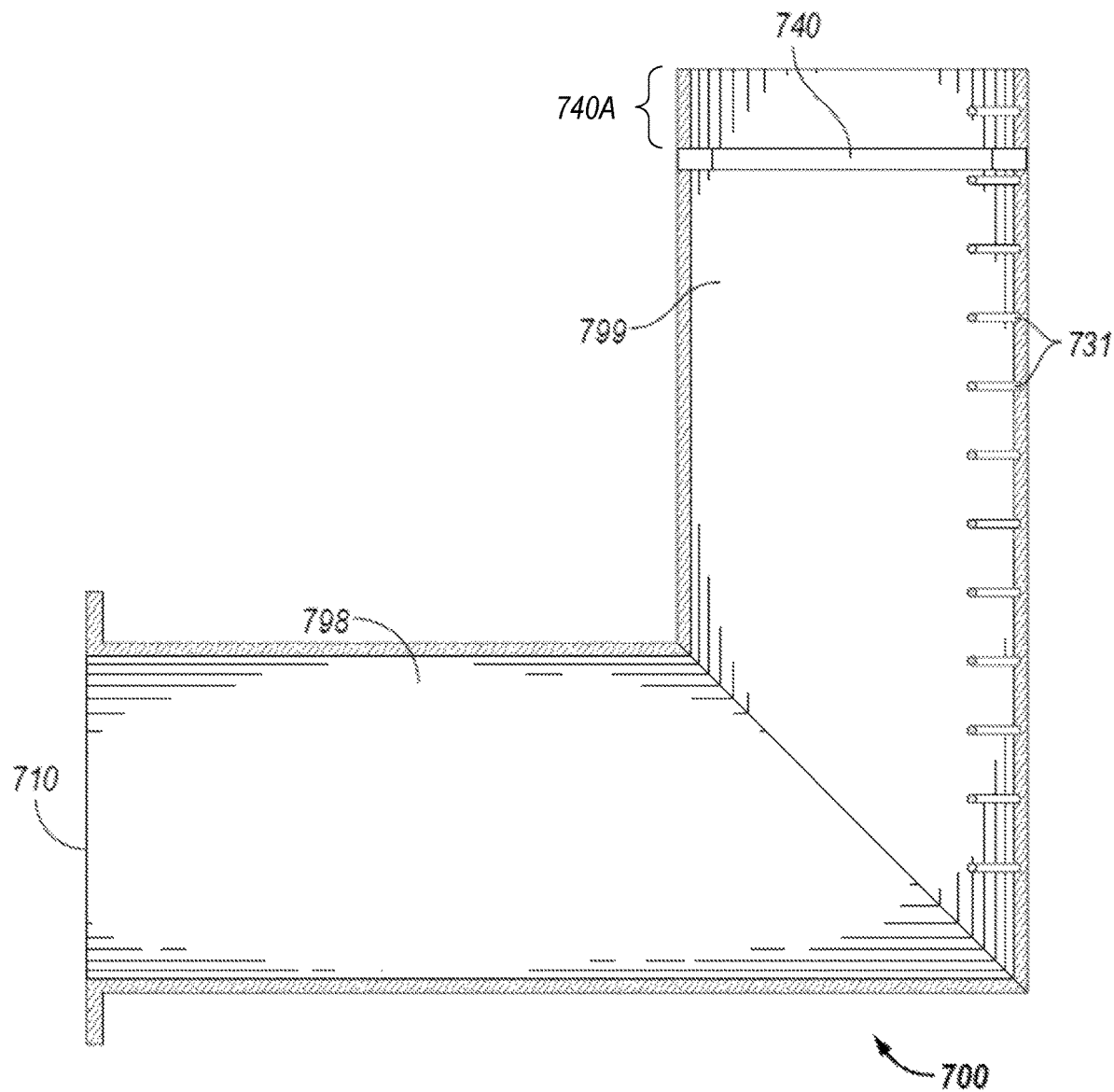
FIG. 7 is a cross-section view of one example of an escape tunnel of an underground shelter.

FIG. 7 is a cross-section view of one example of an escape tunnel of an underground shelter. The escape tunnel allows people to egress from the shelter, particularly in the event where the persons are unable or unwilling to leave through another exit. On one end, the escape tunnel 700 may have an entrance aperture 710. On the other end, the exit barrier 740 is attached to the end of the escape tunnel 700 where the escape tunnel 700 meets or is near the surface. In between the exit barrier 740 and the entrance aperture, there may be one or more lengths of tunnel 798, 799, connecting the entrance and exit. In FIG. 7, the lengths of tunnel 798, 799 are arranged to make an "L" shape; however, any shape or angle could be constructed.

The exit barrier 740 such as a hatch or a door and said hatch or door may be placed such that it is concealed within its environment. The exit barrier 740 may be hinged or unhinged and may be made of durable material that may also be rigid, waterproof, bulletproof, or fireproof. The exit barrier 740 may also have the ability to form an airtight seal. If the housing unit is underground, one embodiment allows the escape tunnel 700 to be concealed by burying the exit barrier 740 in a coarse material such as sand, then using a funnel component (not shown) of the exit barrier 740 to empty the coarse material into the escape tunnel 700. Once enough coarse material has funneled into the escape tunnel 700 from the surface, users may open the exit barrier 740 and egress through to the surface. In this embodiment, the funnel component is blocked by a removeable plug that can be screwed or pulled out from the funnel component to allow the coarse material to fall into the escape tunnel 700. The exit barrier 740 may open after disengaging one or more locking mechanisms (not shown) and the user may utilize one or more escape handles 731 to aid in opening the exit barrier 740. The locking mechanisms may include, but is not limited to, a keyed lock, one or more knobs that one must turn from the inside, latches, or a slide lock. The escape handles 731 may be made from a rigid material such as metal, plastic, or wood, or may be made from a flexible material such as cloth or rope.

The escape tunnel 700 may be made from a variety of metals or plastics and would ideally be rigid, waterproof, bulletproof, fireproof, or able to support a person or pet during egress. The escape tunnel 700 may also have lights and power outlets for electronic equipment. The lights may be automatic or switched on and off manually through something such as a light switch.

Figure 8:
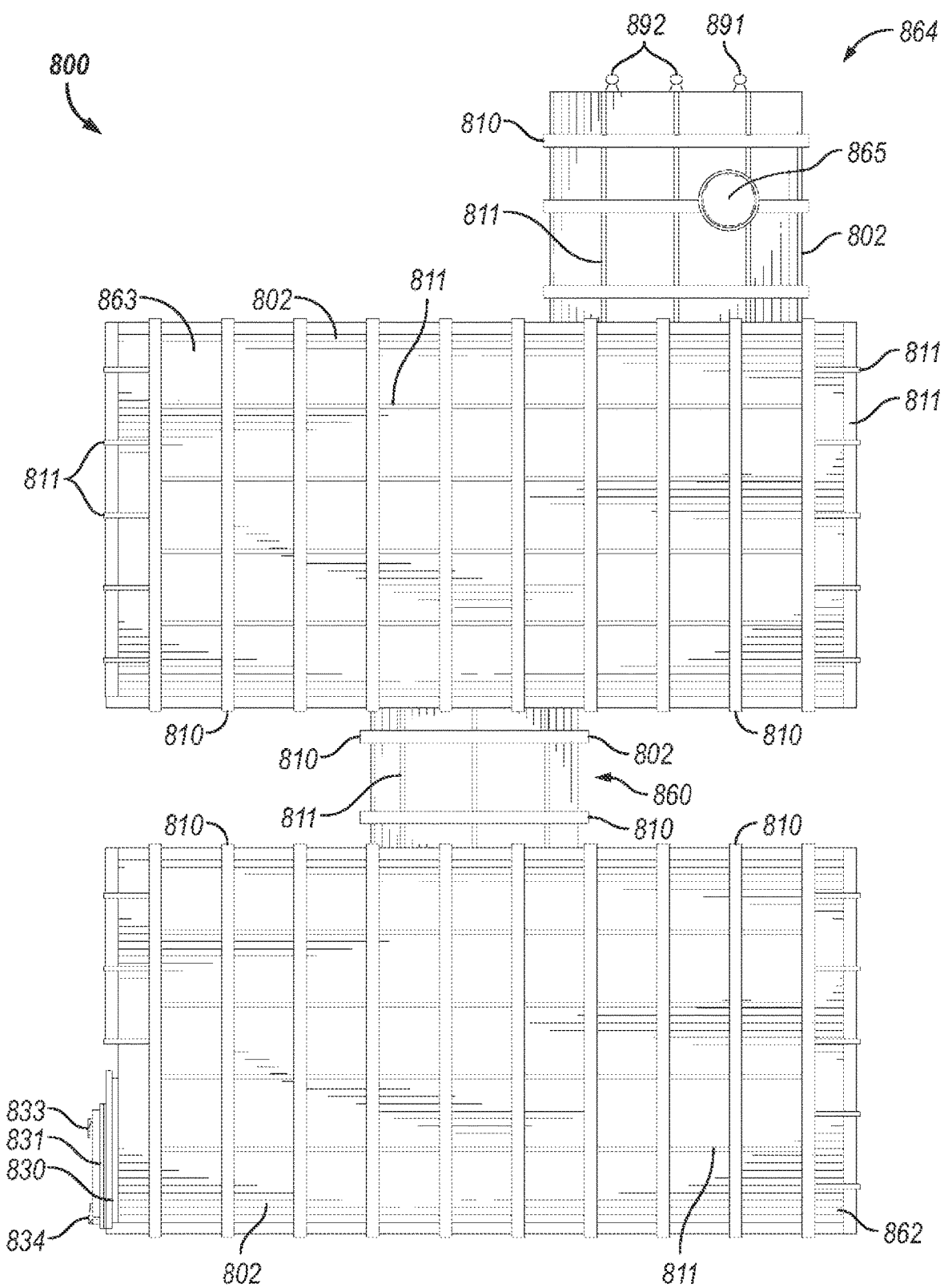
FIG. 8 is a top view of one example of an underground shelter with a generator pod.

FIG. 8 is a top view of the exterior of an underground shelter with a generator pod and two housing units connected by a tunnel. In at least one embodiment, the shelter is comprised of at least one housing unit 800, which is preferably buried under at least three feet of earth cover, each in the shape of a prism that is comprised of five panels 802, four of which connect to a base (not shown). This particular example shows two housing units 862, 863 connected by a tunnel 860 made of the panels, each with several buttress supports 810 that are parallel to the width of the base or tunnel 860 and extend the entire width of the housing units 800 or tunnel 860. The buttress supports 810 may also be attached to one or more additional panels of the housing units 800 or tunnel 860. Several beam supports 811 may run perpendicular to the buttress supports 810 and may also stretch both the length and the width of panels 802 that form the housing units 800 or tunnel 860. The panels 802 or supports 810 and 811 may be made from a variety of metals or plastics and would ideally be rigid, waterproof, bulletproof, or fireproof. The panels 802 may also be made of a material similar to concrete or stone. In other embodiments, the buttress supports 810 and beam supports 811 may be the same type of supports. The supports 810 and 811 themselves may be any type of structure that provides support including, but not limited to, beams, wires, slabs, girders, poles, struts, columns, buttresses, bars, plates, blocks, posts, trusses, or any combination thereof. This particular embodiment shows the buttress supports 810 as welded to beam supports 811 and panels 802. In some embodiments, the panels 802 or supports 810 and 811 may be connected to one another via welding, glue, fastened, tied together, or some combination thereof. If the housing units 800 or tunnel 860 are located above ground, the exterior of the housing units 800 or tunnel 860 should be built such that the shelter can withstand a variety of disasters, including, but not limited to, extreme or severe weather, a chemical release, bomb attack, seismic event, or explosions. The housing units 800 or tunnel 860 may be encased in a concrete shell that provides extra support and protection or the housing units 800 or tunnel 860 may sit on a concrete slab. The housing units 800 or tunnel 860 may be any shape, including, but not limited to, domed, spherical, cylindrical, truncated cylindrical, or prismed and may be corrugated, galvanized, or sand-blasted to provide durability and protection. The entire housing units 800 or tunnel 860 and attached framework, which may be attached to the interior or exterior of the panels 802, made up of supports 810 and 811 may have components attached to provide options for portability and transportation if necessary and may be installed in or underneath existing homes. The framework may be composed of one or more supports 810 and 811 and may only have beam supports 811. The supports 810 and 811 may be made of multiple materials. The housing units 800 or tunnel 860 may be built elsewhere and transported and installed at the desired location. The housing unit 800 may be accessible through more than one entry 830 that may be made of durable material that may also be rigid, waterproof, bulletproof, or fireproof.

The embodiment shown in FIG. 8 shows the entry 830 having an entrance barrier 831 as a door, but other embodiments may have a door, hatch, gate, flap, or other entrance barrier 831 and would preferably create an airtight, gastight, or watertight seal. The entry 830 may also be a combination of hatches, doors, or other entrance barriers 831 to provide protection from other people, debris, or disaster elements. The entrance barriers 831 may include a locking mechanism 832 or a tamper-proof mechanism and may be dimensioned large enough to drive a vehicle or plane into the housing unit. The entrance barrier 831 may have hinges 834 and hinges 834 may allow the entrance barrier 831 to open in at least one direction. The entrance barrier 831 may also allow entry by being removed from the entry 830. The entrance barrier 831 or entry 830 may have a handle 833 attached to help with entry into the housing unit 800. The handle 833 may be made from a rigid material such as metal, plastic, or wood, or may be made from a flexible material such as cloth or rope. Furthermore, the handle 833 may also be part of the locking mechanism 832. The entrance barrier 831 may also have knobs or levels that aid in entry. The entry 830 may connect the housing unit 800 to the interior or exterior of a surface-level house and may be concealed by its surroundings. Furthermore, the entry 830 may contain a 90-degree turn into the housing unit 800 to attenuate any gamma radiation that may inadvertently enter the shelter. The entry 830 or other area within the housing unit interior 850 may also have a decontamination shower for removing contaminants that may affect other individuals in the shelter.

Additionally, the housing unit 800 or tunnel 860 may possess the ability to receive and use electricity through a generator, solar panels, mechanical energy, the power grid, or other power sources. The power source available to the housing units 800 or tunnel 860 may be separate from the power source that an air filtration system (not shown) utilizes. The housing units 800 or tunnel 860 may also possess the ability to receive water for use in areas such as a flushable toilet, decontamination shower, and sinks as well as the ability to transport sewage away from the housing unit 800 or tunnel 860. The housing units 800 or tunnel 860 would also preferably be equipped with radio antenna and antenna cables.

The embodiment shown in FIG. 8 has a generator pod 864 attached to a housing unit 800. The generator pod may be made from the same panels 802 with supports 810 and 811 used for the housing units 800 or tunnel 860. The generator pod 864 may contain a generator that connects to the housing unit 800 or tunnel 860 to provide power to the housing unit 800 or tunnel 860. The generator pod 864 may have any combination of air intake pipes 891 and air exhaust pipes 892 for the generator itself and the generator pod 864 and exhaust port 865 for removing waste pollutants e interior of the generator pod 864. The generator pod 864 may be configured to be soundproof, echo-proof, waterproof, or protected from electromagnetic pulses or seismic activities. The generator may be fueled by a variety of fuels including diesel, gasoline, solar, or propane. The generator pod may also contain a fuel tank or battery. The housing unit 800 may be accessible through more than one entry 830 that may be made of durable material that may also be rigid, waterproof, bulletproof, or fireproof. The generator may have one or more entries having an entrance barrier as a door, but other embodiments may have a door, hatch, gate, flap, or other pod entrance barrier and would preferably create an airtight, gas-tight, or watertight seal. The entry may also be a combination of hatches, doors, or other entrance barriers to provide protection from people, debris, or disaster elements. The pod entrance barriers may include a locking mechanism or a tamper-proof mechanism and may be dimensioned large enough to insert a generator or person into the generator pod 864. The entrance barrier may have hinges that may allow the pod entrance barrier to open in at least one direction. The pod entrance barrier may also allow entry by being removed from the entry. The pod entrance barrier or entry may have a handle attached to help with entry into the generator pod 864. The handle may be made from a rigid material such as metal, plastic, or wood, or may be made from a flexible material such as cloth or rope. Furthermore, the handle may also be part of the pod's locking mechanism. The pod entrance barrier may also have knobs or levels that aid in entry. The pod entry may connect the housing unit 800 to the generator pod 864.

Figure 9:
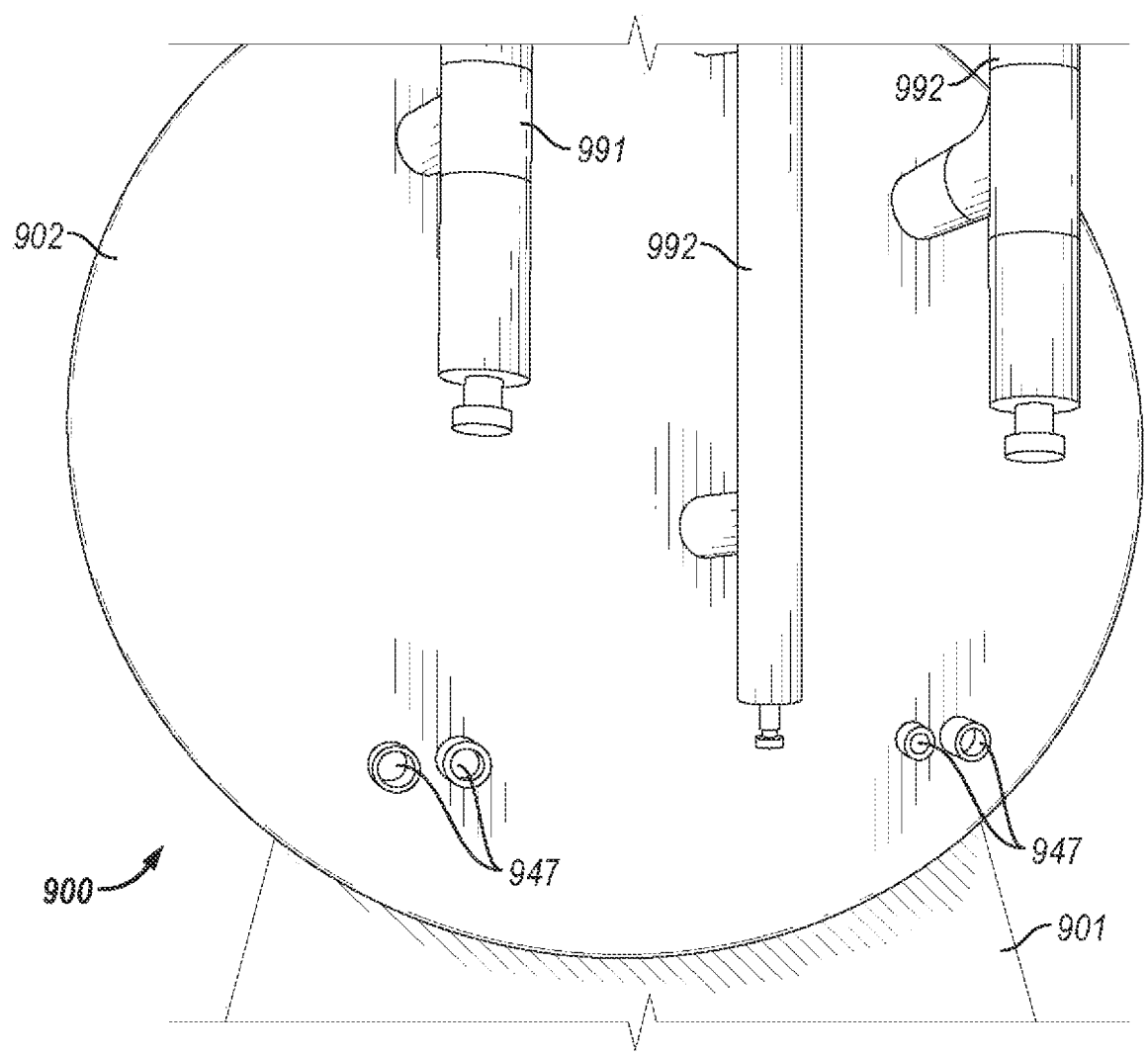
FIG. 9 is a side view of one example of an air intake system of an underground shelter with an air intake system.

FIG. 9 is an external side view of a generator pod 900, mounted on a support structure 901, that may be used to help power an underground shelter. The generator pod may be made from the same panels 902 with supports (not shown) used for the housing units (not shown) or tunnel (not shown). The generator pod 900 may contain a generator that connects to the housing unit or tunnel to provide power to the housing unit or tunnel. The generator may have any combination of air intake 991 and air exhaust 992 for the generator itself and the generator pod 900 and exhaust port (not shown). The generator pod 900 may be configured to be soundproof, echo-proof, waterproof, or protected from electromagnetic pulses or seismic activities. The generator may be fueled by a variety of fuels including diesel, gasoline, solar, or propane. The generator pod may also contain a fuel tank or battery. The generator pod may have one or more connectors 947 for fuel, water, air, battery units, or other possible substances that can help the generator or housing unit to operate.

Figure 10:
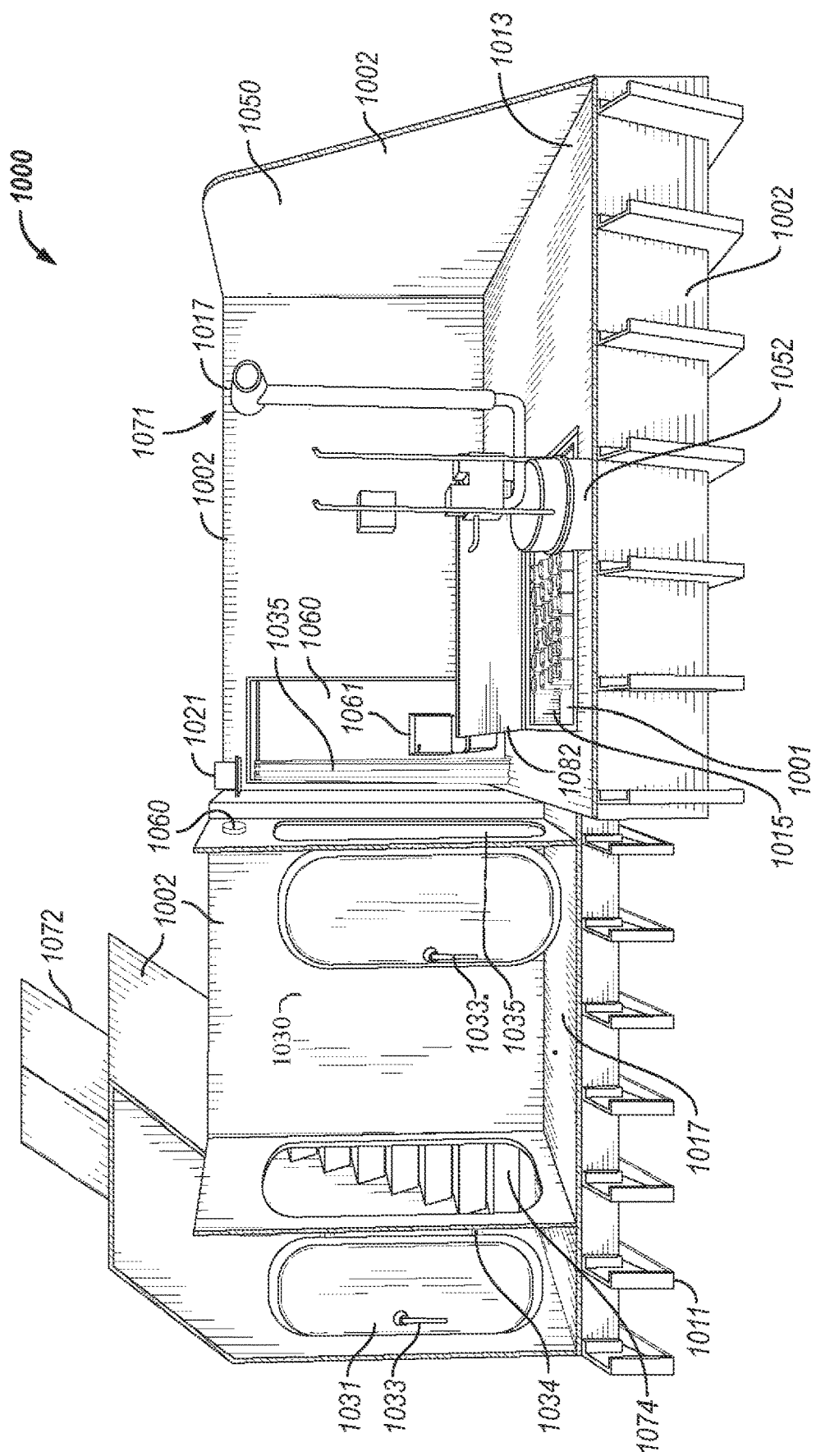
FIG. 10 is a detailed cross-section view of one example of an underground shelter with an air intake system and storage component.

FIG. 10 is a detailed cross-section view of one example of an underground shelter with an air intake system and storage component. In this example, the underground shelter has at least one housing unit with more than one room, a stairwell entry, storage, and an air filtration system. An underground shelter may be comprised of at least one housing unit 1000, which is preferably buried under at least three feet of earth cover, in the shape of a prism that is comprised of five panels 1002, four of which connect to a base 1001. This particular embodiment shows several buttress supports 1011 that are perpendicular to the base 1001. The buttress supports 1011 may also be attached to one or more additional panels 1002 of the housing unit 1000. The panels 1002, buttress supports 1011, and base 1001 may be made from a variety of metals or plastics and would ideally be rigid, waterproof, bulletproof, or fireproof. The panels 1002 or base 1001 may also be made of a material similar to concrete or stone. The buttress supports 1011 themselves may be any type of structure that provides support including, but not limited to, beams, wires, slabs, girders, poles, struts, columns, buttresses, bars, plates, blocks, posts, trusses, or any combination thereof. In some embodiments, the panels 1002, buttress supports 1010, and base 1001 may be connected to one another via welding, glue, fastened, tied together, or some combination thereof. If the housing unit 1000 is located above ground, the exterior of the housing unit 1000 should be built such that the shelter can withstand a variety of disasters, including, but not limited to, extreme or severe weather, a chemical release, bomb attack, seismic event, or explosions. The housing unit 1000 may be encased in a concrete shell that provides extra support and protection or the housing unit 1000 may sit on a concrete slab. The housing unit 1000 may be any shape, including, but not limited to, domed, spherical, cylindrical, truncated cylindrical, or prismed and may be corrugated, galvanized, or sand-blasted to provide durability and protection. The entire housing unit 1000 and attached framework, which may be attached to the interior or exterior of the panels 1002, made up of buttress supports 1011 may have components attached to provide options for portability and transportation if necessary and may be installed in or underneath existing homes. The framework may be composed of one or more supports 1011 and may only have beam supports 1011. The supports 1011 may be made of multiple materials. The housing unit 1000 may be built elsewhere and transported and installed at the desired location.

Figure 11:
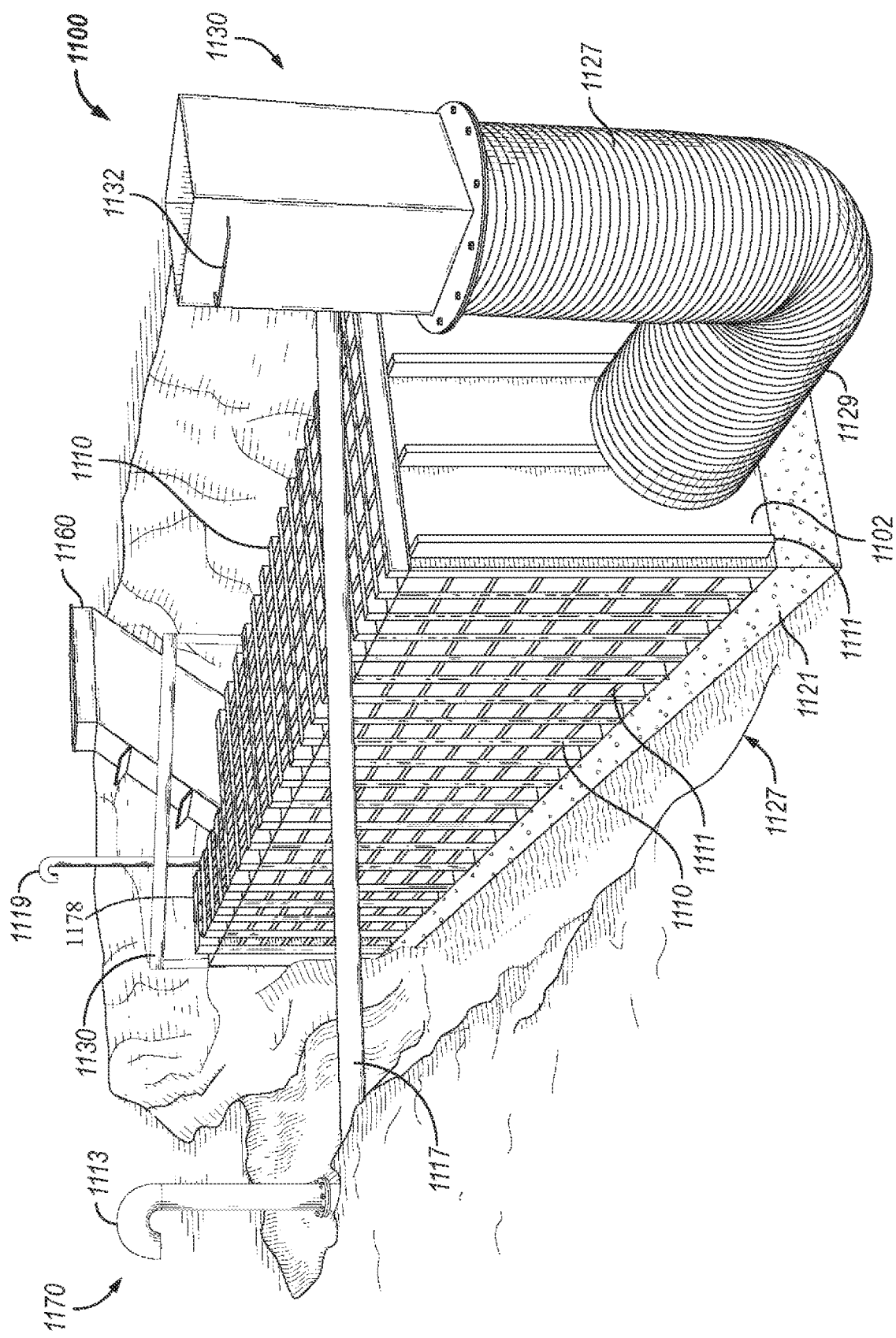
FIG. 11 is a perspective environmental view of one example of an underground shelter with an air intake system and escape tunnel.

The housing unit 1000 may be accessible through more than one entry room 1030 that may be made of durable material that may also be rigid, waterproof, bulletproof, or fireproof. The embodiment shown in FIG. 11 shows the entry room 1030 having an entrance barrier 1031 as a door, but other embodiments may have a door, hatch, gate, flap, or other entrance barrier 1031 and would preferably create an airtight, gas-tight, or watertight seal. The entry 1030 may also be a combination of hatches, doors, or other entrance barriers 1031 to provide protection from other people, debris, or disaster elements. The entrance barriers 1031 may include a locking mechanism (not shown) or a tamper-proof mechanism and may be dimensioned large enough to drive a vehicle or plane into the housing unit. The entrance barrier 1031 may have hinges 1034 that may allow the entrance barrier 1031 to open in at least one direction. The entrance barrier 1031 may also allow entry by being removed from the entry 1030. The entrance barrier 1031 or entry 1030 may have a handle 1033 attached to help with entry into the housing unit 1000. The handle 1033 may be made from a rigid material such as metal, plastic, or wood, or may be made from a flexible material such as cloth or rope. Furthermore, the handle 1033 may also be part of the locking mechanism 1032. The entrance barrier 1031 may also have knobs or levels that aid in entry. The entry 1030 may connect the housing unit 1000 to the interior or exterior of a surface-level house and may be concealed by its surroundings.

Furthermore, the entry room 1030 may contain a 90-degree turn into the housing unit 1000 to attenuate any gamma radiation that may inadvertently enter the shelter. The entry room 1030 or other area within the housing unit interior 1050 may also have a decontamination shower for removing contaminants that may affect other individuals in the shelter. The housing unit 100 may be accessible through more than one entry 1030 that may be made of durable material that may also be rigid, waterproof, bulletproof, or fireproof. The entry 1030 may also include a stairwell 1072 with steps 1074, ladders, or other devices that provide ingress or egress in the presence of an elevation differential. Elements of the interior of the housing unit 1000, such as stairs 1074, may be galvanized to prevent rust or made from materials such as wood, plastic, cloth, etc. The exterior of stairwell 1072 may be made of the same materials that make up the rest of the housing unit 1000.

The housing unit 1000, which may contain furniture, may also contain one or more interior rooms 1050, including a mud room, kitchen, bathroom, or bedroom, and may have a floor 1013 that is separate from the base 1001. The floor 1013 may be at some height above the base 1001 for additional storage 1015, which is accessible through a removeable floor or hinged component. The floor 1013 may be supported by joists (not shown) that the floor 1013 sits on and are connected to the interior side of the panels 1002; however, the floor 1013 may be supported through several ways, including but not limited to beams, purlins, wires, slabs, girders, poles, struts, columns, buttresses, bars, plates, blocks, posts, trusses, or any combination thereof. This particular example shows a hatch 1082 that allows access to the storage 1015. The floor 1013 or base 1001 may be made from materials sturdy enough to support supplies, furniture, people, or pets without allowing elements of the environment external to the housing unit 1001 or the materials housed in storage 1015 into the housing unit interior 1050. Furthermore, the floor 1013 or base 1001 may be made from materials that are rigid, waterproof, bulletproof, or fireproof. Elements of the interior 1050 of the housing unit 1000 may be galvanized to prevent rust or made from materials such as wood, plastic, cloth, etc. The housing unit 1000 may also be climate controlled by a fan, air filtration system, air conditioning system, heating system, or other systems that may affect the ambient air of the housing unit interior 1050. The housing unit 1000 may be configured to be soundproof, echo-proof, waterproof, or protected from electromagnetic pulses or seismic activities. The housing unit 1000 may also be equipped with a pumping system that helps remove fluid from the housing unit interior 1050.

The housing unit 1000 may also have a pressure port 1060, the pressure port is an aperture that may or may not have a hatch at least partially covering it. The purpose of the pressure port is to allow the air in the interior of the main area in the housing unit 1000 to put pressure on the air in the interior of the entry room 1130. By creating a pressure differential between the air in the interior of the entry room 1130 with the air in the interior of the housing unit 1000, harmful particulates, harmful particles, or debris may be pushed away from the entry port 1035. For example, if a person enters the stairwell 1072 and then the entry room 1130 and there is harmful airborne material outside the entrance of the stairwell 1072, the amount of harmful airborne material that enters the interior of the housing unit 1000 with the person is minimized by the higher pressure in the interior of the housing unit 1000 pushing on the lower pressure area of the entry room 1030.

The housing unit 1000 may be equipped with an air filtration system 1071 that brings fresh surface air into the housing unit 1000. If underground, the air filtration system 1071 may draw surface air into the housing unit 1000 through the air intake vent 1017. The air then may flow through one or more filters 1021 that may be located in a filter housing 1052. The filters may be, but not limited to, high-efficiency particulate air (HEPA), ultraviolet (UV) light, adsorption, electrostatic, carbon, media, pleated, spun glass, or some combination thereof. Any excess air in the housing interior 1052 may flow through the exhaust vent 1052 and flow to the surface. The air filtration system 1071 may also utilize a pressure porthole 1060 that allows higher pressure air leak into an adjacent room that may be connected by an interior entrance barrier 1035 and has a lower air pressure to prevent toxins and other particles from moving into the room with the high pressure. The interior entrance barriers 1035 may be doors, hatches, flaps, curtains, or other room separating apparatuses. The interior entrance barriers 1035 may have a handle 1033 attached to help with entry into the housing unit 1000. The handle 1033 may be made from a rigid material such as metal, plastic, or wood, or may be made from a flexible material such as cloth or rope. Furthermore, the handle 1033 may also be part of the locking mechanism. The interior entrance barrier 1035 may also have knobs or levels that aid in entry. In the event of nuclear fallout or a biological or chemical release, a pressure porthole 1060 may help reduce the number of harmful particles that enter the housing unit interior 1050 by pushing the particles out through the entry 1030.

The air filtration system 1071 may be battery-powered, solar-powered, generator-powered, fuel-powered, grid-powered, powered by kinetic energy using a hand crank, or powered through other power sources. The air filtration system 1071 may also use a combination of different power sources and have various back-up power systems in place.

Any pipes or vents in the air filtration system 1071 may be made of plastic, polyvinyl chloride (PVC), metal, or any other material capable of channeling air into a system while minimizing the air's interaction to the environment surrounding the pipe. Some embodiments use Schedule 40 pipe, but Schedule 40 is not required. Pipes and valves may also be attached to each other through a variety of ways, including but not limited to, glue, welding, threaded coupling, and fastening.

Additionally, the housing unit 1000 may possess the ability to receive and use electricity through a generator, solar panels, mechanical energy, the power grid, or other power sources. The housing unit interior 1050 or storage 1015 may also have lights and power outlets for electronic equipment. The lights may be automatic or switched on and off manually through something such as a light switch. The housing unit 1000 may also possess the ability to receive water for use in areas such as a flushable toilet 1061 in a separate wash room 1060, decontamination shower, and sinks as well as the ability to transport sewage away from the housing unit 1000. The housing unit 1000 may also contain a dry flushing toilet. The housing unit 1000 would also preferably be equipped with radio antenna and antenna cables.

FIG. 11 shows a perspective view of the exterior of an underground shelter with a stairwell entry, an air filtration system, and an escape tunnel. In at least one embodiment, the shelter is comprised of at least one housing unit 1100, which is preferably buried under at least three feet of earth cover, in the shape of a prism that is comprised of five panels 1102, four of which connect to a base 1101. This particular embodiment shows several buttress supports 1110 that are parallel to the width of the base 1101 and extend the entire width of the housing unit 1100. The buttress supports 1110 may also be attached to one or more additional panels 1102 of the housing unit 1100. Several beam supports 1111 may run perpendicular to the buttress supports 1110 and may also stretch both the length and the width of panels 1102 that form the housing unit 1100. The panels 1102 or supports 1110 and 1111 may be made from a variety of metals or plastics and would ideally be rigid, waterproof, bulletproof, or fireproof. The panels 1102 may also be made of a material similar to concrete or stone. In other embodiments, the buttress supports 1110 and beam supports 1111 may be the same type of supports. The supports 1110 and 1111 themselves may be any type of structure that provides support including, but not limited to, beams, wires, slabs, girders, poles, struts, columns, buttresses, bars, plates, blocks, posts, trusses, or any combination thereof. This particular embodiment shows the buttress supports 1110 as I-beams and the support beams 1111 as U-beams that are welded to one another and panels 1102. In some embodiments, the panels 1102 or supports 1110 and 1111 may be connected to one another via welding, glue, fastened, tied together, or some combination thereof. If the housing unit 1100 is located above ground, the exterior of the housing unit 1100 should be built such that the shelter can withstand a variety of disasters, including, but not limited to, extreme or severe weather, a chemical release, bomb attack, seismic event, or explosions. The housing unit 1100 may be encased in a concrete shell that provides extra support and protection or the housing unit 1100 may sit on a concrete slab 1121. The housing unit 1100 may be any shape, including, but not limited to, domed, spherical, cylindrical, truncated cylindrical, or prismed and may be corrugated, galvanized, or sand-blasted to provide durability and protection. The entire housing unit 1100 and attached framework, which may be attached to the interior or exterior of the panels 1102, made up of supports 1110 and 1111 may have components attached to provide options for portability and transportation if necessary and may be installed in or underneath existing homes. The framework may be composed of one or more supports 110 and 1111 and may only have beam supports 1111. The supports 1110 and 1111 may be made of multiple materials. The housing unit 1100 may be built elsewhere and transported and installed at the desired location. This particular embodiment shows the housing unit 1100, stairwell 1160, air filtration system 1170, escape tunnel 1130 embedded in the ground 1127 before being covered with earth cover. The escape tunnel 1130 may also have an escape pocket 740A (see FIG. 7) which may be able to house debris inside of it. By housing debris inside the escape pocket 740A of the escape tunnel 1130, the escape tunnel 1130 may more easily be hidden. An escape hatch 740 (see FIG. 7) may be located at the base of the escape pocket 740A that opens inward into the interior of the escape tunnel 1130 to allow an escapee to remove the debris housed in the escape pocket 740A to facilitate the escape.

The housing unit 1100 may be accessible through more than one entry room that may be made of durable material that may also be rigid, waterproof, bulletproof, or fireproof. The entry room may also include a stairwell 1160 with steps, ladders, or other devices that provide ingress or egress in the presence of an elevation differential. Elements of the interior of the housing unit 1100, such as stairs, may be galvanized to prevent rust or made from materials such as wood, plastic, cloth, etc. The exterior of stairwell 1160 may be made of the same materials that make up the rest of the housing unit 1100.

The housing unit 1100 may be equipped with an air filtration system 1170 that brings fresh surface air into the housing unit 1100. If underground, the air filtration system 1170 may contain at least one surface intake pipe 1113, which draws surface air into one or more slanted air pipes 1117 that ideally has a non-zero grade. The slanted air pipe 1117, which is preferably slanted at a two-degree angle or higher, reduces condensation and allows for dryer air to move into the housing unit 1100. The slanted air pipe 1117 may also attach to one or more pipes. The slanted air pipe 1117 or other pipes may connect to the housing unit 1100 and move air into the housing unit 1100. Air may leave the housing unit 1100 through one or more exhaust pipes 1119 that leads the air back to the surface. The intake pipes 1113 and exhaust pipes 1119 may be curved in a way that prevents tampering at the surface such that the pipe opening faces the surface instead of towards the sky. In this example, the intake pipe 1113 and exhaust pipe 1119 are curved to form a "candy-cane" shape; in other words, the intake pipe 1113 and exhaust pipe 1119 are curved 180 degrees about the z-axis such that the surface ends of the intake pipe 1113 and exhaust pipe 1119 point down.

The air filtration system 1170 may be battery-powered, solar-powered, generator-powered, fuel-powered, grid-powered, powered by kinetic energy using a hand crank, or powered through other power sources. The air filtration system 1170 may also use a combination of different power sources and have various back-up power systems in place. The pipes may be made of plastic, polyvinyl chloride (PVC), metal, or any other material capable of channeling air into a system while minimizing the air's interaction to the environment surrounding the pipe. Some embodiments use Schedule 40 pipe, but Schedule 40 is not required. Pipes and valves may also be attached to each other through a variety of ways, including but not limited to, glue, welding, threaded coupling, and fastening.

The escape tunnel 1130 may allow users to egress from the housing unit 100 when users are unable to exit through an entry. Users access the escape tunnel 1130 through an vertical tunnel 1127, which may or may not be concealed by an interior entrance barrier such as a door, hatch, or curtain. The escape tunnel 1130 may include escape exterior handles 1132 and may include ladder rungs, bars, handholds, footholds, or other devices configured to help users leave the tunnel. The escape exterior handles 1132 may be made from a rigid material such as metal, plastic, or wood, or may be made from a flexible material such as cloth or rope. At least one example of the escape tunnel 1130 includes a horizontal tunnel 1129 that is connects the vertical tunnel 1127 to the exit aperture on the escape tunnel 1130, which contains escape exterior handles 1132. If the housing unit 1100 is underground, one example allows the escape tunnel 1130 to be concealed by burying the escape tunnel 1130 in a coarse material such as sand, then using a funnel component of the escape tunnel 1300 to empty the coarse material into the escape tunnel 1300. Once enough coarse material has funneled into the escape tunnel 600 from the surface, users may egress through to the surface. In this example, a user would then climb through horizontal tunnel 1129 through the sand, then traverse through vertical tunnel 1127 to egress from the tunnel. The escape tunnel 1130 may be made from a variety of metals or plastics and would ideally be rigid, waterproof, bulletproof, fireproof, or able to support a person or pet during egress. The escape tunnel 1130 may also have lights and power outlets for electronic equipment. The lights may be automatic or switched on and off manually through something such as a light switch.

Additionally, the housing unit 1100 may possess the ability to receive and use electricity through a generator, solar panels, mechanical energy, the power grid, or other power sources. The power source available to the housing unit 1100 may be separate from the power source that the air filtration system 1170 utilizes. The housing unit 1100 may also possess the ability to receive water for use in areas such as a flushable toilet, decontamination shower, and sinks as well as the ability to transport sewage away from the housing unit 1100. The housing unit 1100 would also preferably be equipped with radio antenna and antenna cables. An auxiliary pipe 1177 may be used for transporting fluids such as air, water, or fuel to or from the generator pod 1178. The housing unit 1100 may also have connection points (not shown). The connection points may be hooks, latches or hoops that allow for a cable to be secured to the housing unit 1100. By attaching one or more cables to the housing unit 1100, the housing unit 1100 may be able to be raised and lowered by a crane.

While this disclosure has been particularly shown and described with reference to preferred embodiments, it will be understood by those skilled in the art that various changes in form and detail may be made therein without departing from the spirit and scope of the invention. The investors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments but should be defined only in accordance with any claims and their equivalents issuing from this disclosure. Furthermore, the above advantages and features are provided in described embodiments but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called filed. Further, a description of a technology as background information is not to be construed as an admission that certain technology is prior art to any embodiments) in this disclosure. Neither is the "Brief Summary" to be considered as a characterization of the embodiments(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of the such claims shall be considered on their own merits in light of this disclosure but should not be constrained by the headings set forth herein.

I claim:

1. An underground shelter comprising:
  a housing unit having of at least two panels, wherein one of the panels is a base panel connected to a bottom of the housing unit, wherein the at least two panels are affixed to each other along an interface, and wherein the at least two panels encompass an interior of the housing unit;
  at least one entry port into the housing unit, wherein the at least one entry port allows access into the interior of the housing unit;
  a framework attached to the housing unit comprising at least two beam supports and each beam support traverses across one of the at least two panels, and wherein the at least two beam supports interface with each other and are perpendicular to each other; and
  at least one of the two beam supports having a notch at an area where the at least one of the at least two support beams interfaces with another of the at least two support beams, and where one panel of the at least two panels interfaces with another panel of the at least two panels, further comprising a straight weld line along the interface between the one panel and the another panel and within the notch.

2. The underground shelter of claim 1 wherein said framework is structured to permit lifting of the housing unit via at least one cable connectable to the framework.

3. The underground shelter of claim 1 further comprising:
  the housing unit having at least one generator pod, wherein the at least one generator pod houses at least one generator, and wherein the at least one generator provides power for the housing unit.

4. The underground shelter of claim 1 further comprising:
  the housing unit having at least one escape tunnel having an escape pocket, wherein the escape pocket is configured to house debris so that that an entirety of the escape pocket may be buried; and
  the escape pocket having an escape hatch, wherein the escape hatch opens inward, away from an exit barrier into an interior of the escape hatch.

5. The underground shelter of claim 1 further comprising:
  the housing unit having a floor, wherein the floor is located above and parallel to the base panel in the interior of the housing unit, wherein the floor is supported by one or more joists;
  the floor having at least one storage hatch, wherein the at least one storage hatch opens to allow for access to a storage space in between the floor and the base panel.

6. The underground shelter of claim 1 further comprising:
  an entry room having at least two entry panels, wherein one of the entry panels is a base entry panel connected to the bottom of the entry room, wherein pairs of the at least two entry panels are affixed to each other along an interface, and wherein the pairs of the at least two entry panels at least partially encompass an interior of the entry room;
  the entry room having a secondary entrance allowing access to the interior of the entry room, wherein the entry room is affixed to the housing unit adjacent to the at least one entry port, wherein the secondary entrance is at least partially covered by a secondary removable hatch, wherein the entry port is at least partially covered by an entry removable hatch, and wherein a pressure port is located on the one of the entry panels having the entry port to the housing unit, wherein the pressure port allows for the creation of a pressure differential between the air pressure in the interior of the entry room and an air pressure in the interior of the housing unit.

7. The underground shelter of claim 6 further comprising:
  a stairwell having at least two stairwell panels, wherein one of the stairwell panels is a base stairwell panel connected to a bottom of the stairwell, wherein pairs of the at least two stairwell panels are affixed to each other along an interface, and wherein the at least two stairwell panels at least partially encompass an interior of the stairwell;
  the stairwell having a primary entrance allowing for access to the interior of the stairwell, wherein at least one of the stairwell panels is angled upward and lined with stairs, wherein the stairwell is affixed to the entry room adjacent to the at least one secondary entrance, wherein the primary entrance is at least partial covered by a primary removable hatch, and wherein the stairwell is perpendicular to the entry room.

8. An underground shelter comprising:
a housing unit having a plurality of panels, wherein at least one of the panels is a base panel defining a bottom of the housing unit, wherein one or more of the plurality of panels are affixed to the at least one base panel along an interface with the at least one base panel, and wherein the one or more of the plurality of panels encompass an interior of the housing unit;
at least one entry port into the housing unit, wherein the at least one entry port allows access into an interior of the housing unit, wherein the at least one entry port is at least partially covered by a removable entry hatch;
a framework attached to the housing unit comprising a plurality of beam supports, wherein at least one of the beam supports traverses across a corresponding one of the one or more of the plurality of panels and the base panel, and wherein one beam support coupled to the at least one base panel interfaces with one beam support coupled to one of the one or more of the plurality of panels and are angularly aligned to each other, wherein each such interface comprises a notch and a straight weld line along such interface and within the notch; and
the housing unit having a floor, wherein the floor is located above the base panel defining the bottom of the housing unit, wherein the floor having at least one storage hatch allowing access to a storage space in between the floor and the base panel.

9. The underground shelter of claim 8 further comprising:
the housing unit having at least one escape tunnel having an escape pocket, wherein the escape pocket is configured to house debris so that that an entirety of the escape pocket may be buried; and
the escape pocket having an escape hatch, wherein the escape hatch opens inward, away from an exit barrier into an interior of the escape hatch.

10. The underground shelter of claim 8 further comprising:
an entry room having at least two entry panels, wherein one of the entry panels is a base entry panel connected to a bottom of the entry room, wherein pairs of the at least two entry panels are affixed to each other along an interface, and wherein the pairs at least two entry panels at least partially encompass an interior of the entry room;
the entry room having a secondary entrance allowing access to the interior of the entry room, wherein the entry room is affixed to the housing unit adjacent to the at least one entry port, wherein the secondary entrance is at least partially covered by a secondary removable hatch, wherein the entry port is at least partially covered by an entry removable hatch, and wherein a pressure port is located on the one of the entry panels having the entry port to the housing unit, wherein the pressure port allows for the creation of a pressure differential between the air pressure in the interior of the entry room and an air pressure in the interior of the housing unit.

11. The underground shelter of claim 10 further comprising:
a stairwell having at least two stairwell panels, wherein one of the stairwell panels is a base stairwell panel connected to a bottom of the stairwell, wherein pairs of the at least two stairwell panels are affixed to each other along an interface, and wherein the at least two stairwell panels at least partially encompass an interior of the stairwell;
the stairwell having a primary entrance allowing for access to the interior of the stairwell, wherein at least one of the stairwell panels is angled upward and lined with stairs, wherein the stairwell is affixed to the entry room adjacent to the at least one secondary entrance, wherein the primary entrance is at least partial covered by a primary removable hatch, and wherein the stairwell is perpendicular to the entry room.

12. The underground shelter of claim 8 wherein the angular alignment is perpendicular.

13. The underground shelter of claim 8 further comprising an air intake system comprising:
an at least one surface intake pipe connected to a corresponding sloped intake pipe which is connected to a corresponding vertical intake pipe, wherein the vertical intake pipe is attached to the exterior of an underground shelter, and wherein the sloped intake pipe is angled downward away from the point at which the corresponding vertical intake pipe is connected to the corresponding sloped intake pipe such that condensation that forms in the sloped intake pipe is caused to drain away from the corresponding vertical intake pipe and into the corresponding surface intake pipe, and wherein the located above ground, outside of the underground shelter, is caused to traverse through the at least one surface intake pipe, through the corresponding vertical sloped intake pipe, and through the corresponding vertical intake pipe to enter the interior of the underground shelter; and
an at least one vertical exhaust pipe connected to a corresponding surface exhaust pipe, wherein the vertical exhaust pipe is attached to the exterior of the underground shelter, and wherein air located in the interior of the underground shelter is caused to traverse through the at least one vertical exhaust pipe and through the corresponding surface exhaust pipe to egress out of the interior of the underground shelter.

14. The underground shelter of claim 13, wherein the sloped intake air pipe is sloped at an angle greater than two degrees.

15. The underground shelter of claim 13, wherein the distal end of the at least one surface intake pipe is positioned above ground, away from the distal end of the at least one surface exhaust pipe that is also has its distal end located above ground, wherein the least one surface intake pipe does not receive air that just egressed out of the at least one surface exhaust pipe.

16. The underground shelter of claim 13 further comprising:
the at least one surface intake pipe having at least one lower disposal pipe segment, wherein the at least one lower disposal pipe segment protrudes downward away from the point on the corresponding surface intake pipe at which the corresponding sloped intake pipe is connected to the surface intake pipe;
the at least one lower disposal pipe segment having at least one check valve, wherein the at least one check valve is connected to the at least one lower disposal pipe at its distal end, wherein the at least one check value is arranged to allow for condensation received from the corresponding sloped intake pipe to egress out of the at least one lower disposal pipe segment but air is inhibited from entering into the corresponding surface intake pipe through the at least one check valve.

17. The underground shelter of claim 13 further comprising:
- the at least one vertical exhaust pipe having at least one lower disposal pipe segment, wherein the at least one lower disposal pipe segment protrudes downward away from the point on the corresponding vertical exhaust pipe at which the corresponding vertical exhaust pipe is connected to the underground shelter;
- the at least one lower disposal pipe segment having at least one check valve, wherein the at least one check valve is connected to the at least one lower disposal pipe at its distal end, wherein the at least one check value is arranged to allow for condensation received from the corresponding air exhaust pipe to egress out of the at least one lower disposal pipe segment but air is inhibited from entering into the corresponding vertical exhaust pipe through the at least one check valve.

18. The underground shelter of claim 13 further comprising:
- the at least one vertical intake pipe having at least one lower disposal pipe segment, wherein the at least one lower disposal pipe segment protrudes downward away from the point on the corresponding vertical intake pipe at which the corresponding vertical intake pipe is connected to the underground shelter;
- the at least one lower disposal pipe segment having at least one check valve, wherein the at least one check valve is connected to the at least one lower disposal pipe segment at its distal end, wherein the at least one check value is arranged to allow for condensation received from the corresponding vertical air intake pipe to egress out of the at least one lower disposal pipe segment but air is inhibited from entering into the corresponding vertical air intake pipe through the at least one check valve.

19. An underground shelter comprising:
- a housing unit having at least six panels, wherein one of the panels is a base panel connected to a bottom of the housing unit, wherein the at least six panels are affixed to each other along an interface, and wherein the at least six panels encompass an interior of the housing unit;
- at least one entry port into the housing unit, wherein the at least one entry port allows access into an interior of the housing unit, wherein the at least one entry port is at least partially covered by a removable entry hatch;
- a framework attached to the housing unit comprising at least two beam supports, wherein each beam support traverses across a corresponding one of the at least six panels, and wherein two of the at least two beam supports interface with each other and are perpendicular to each other;
- at least one of the two beam supports having a notch at an area where the two of the at least two support beams interface and each of the at least six panels interface with each other, wherein the notch allows for a straight weld line along the interface between the at least six panels;
- the housing unit having at least one connect point, wherein the at least one connect point allows for the housing unit to be connected to at least one cable to facilitate moving the entire housing unit;
- the housing unit having a floor, wherein the floor is located above the base panel in the interior of the housing unit, wherein the floor is supported by one or more joists;
- the floor having at least one storage hatch, wherein the at least one storage hatch opens to allow for access to a storage space in between the floor and the base panel;
- an air intake system comprising:
- at least one air intake pipe connected to a corresponding sloped intake air pipe connected to a corresponding vertical intake pipe, wherein the vertical intake pipe is attached to an exterior of an underground shelter, and wherein the sloped intake air pipe is angled downward away from the point at which the corresponding vertical intake pipe is connected to the corresponding sloped intake pipe, wherein the sloped intake pipe is configured such that condensation that forms in the sloped intake pipe drains away from the corresponding vertical intake pipe and into the corresponding air intake pipe, and wherein the air intake pipe is configured such that air located above ground, outside of the underground shelter, traverses through the at least one air intake pipe, through a corresponding vertical sloped intake air pipe, and through a corresponding vertical intake pipe to enter the interior of the underground shelter;
- at least one vertical exhaust pipe connected to a corresponding surface exhaust pipe, wherein the at least one vertical exhaust pipe is attached to an exterior of the underground shelter, and wherein the at least one vertical exhaust pipe is configured such that air located in the interior of the underground shelter traverses through the at least one vertical exhaust pipe and through the corresponding surface exhaust pipe to egress out of the interior of the underground shelter;
- the at least one surface intake pipe, the at least one vertical intake pipe, and the at least one vertical exhaust pipe each have a corresponding lower disposal pipe segment, wherein the corresponding lower disposal pipe segments protrude downward toward a distal end of the corresponding pipes; and
- each lower disposal pipe segment having at least one check valve, wherein the at least one check valve is connected to the corresponding lower disposal pipe at a distal end of the corresponding lower dispoal pipe, wherein the at least one check value is configured to allow received condensation to egress out of the corresponding lower disposal pipe segments, while air is inhibited from entering through the at least one check valve.

* * * * *